US012008670B2

(12) United States Patent
Lundberg

(10) Patent No.: US 12,008,670 B2
(45) Date of Patent: *Jun. 11, 2024

(54) ANALYTICS GENERATION FOR PATENT PORTFOLIO MANAGEMENT

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,553

(22) Filed: Jul. 29, 2022

(65) Prior Publication Data

US 2023/0018572 A1    Jan. 19, 2023

Related U.S. Application Data

(63) Continuation of application No. 14/281,513, filed on May 19, 2014, now Pat. No. 11,461,862, which is a
(Continued)

(51) Int. Cl.
*G06Q 50/18* (2012.01)
*G06Q 10/10* (2023.01)
*G06Q 40/06* (2012.01)

(52) U.S. Cl.
CPC ........... *G06Q 50/184* (2013.01); *G06Q 10/10* (2013.01); *G06Q 40/06* (2013.01)

(58) Field of Classification Search
USPC ........................................................ 705/310
See application file for complete search history.

(56) References Cited

U.S. PATENT DOCUMENTS 4,807,154 A    2/1989 Scully et al.
4,868,733 A    9/1989 Fujisawa et al.
(Continued)

FOREIGN PATENT DOCUMENTS

EP    0638870 A1    2/1995
GB    2156112 A     10/1985
(Continued)

OTHER PUBLICATIONS

K. Kasravi and M. Risov, "Multivariate Patent Similarity Detection," 2009 42nd Hawaii International Conference on System Sciences, 2009, pp. 1-8, doi: 10.1109/HICSS.2009.318 (Year: 2009).*

(Continued)

*Primary Examiner* — Michael Young
(74) *Attorney, Agent, or Firm* — Schwegman Lundberg & Woessner, P.A.

(57) ABSTRACT

Systems and methods for patent portfolio management and generation of analytics are described. A system comprises, for example, one or more modules. A first module is configured to combine data received from an official government source and from a docketing system. The data received may pertain to one or more assets of a patent portfolio. A second module is configured to generate a metric of the patent portfolio based on the combined data. The metric may measure a characteristic of the patent portfolio. A third module is configured to receive a request from a client device to display the metric. A fourth module is configured to, in response to the request to display the metric, display the metric in a user interface that includes one or more filtering elements that are selectable to request a filtering of the displayed metric.

20 Claims, 61 Drawing Sheets

Related U.S. Application Data continuation-in-part of application No. 13/956,162, filed on Jul. 31, 2013, now abandoned.

(60) Provisional application No. 61/814,937, filed on Apr. 23, 2013, provisional application No. 61/814,073, filed on Apr. 19, 2013, provisional application No. 61/691,182, filed on Aug. 20, 2012.

(56) References Cited

U.S. PATENT DOCUMENTS

| | | |
|---|---|---|
| 5,297,039 A | 3/1994 | Kanaegami et al. |
| 5,329,447 A | 7/1994 | Leedom, Jr. |
| 5,333,272 A | 7/1994 | Capek et al. |
| 5,404,506 A | 4/1995 | Fujisawa et al. |
| 5,410,646 A | 4/1995 | Tondevold et al. |
| 5,495,567 A | 2/1996 | Iizawa et al. |
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,696,916 A | 12/1997 | Yamazaki et al. |
| 5,699,528 A | 12/1997 | Hogan |
| 5,706,502 A | 1/1998 | Foley et al. |
| 5,721,910 A | 2/1998 | Unger et al. |
| 5,745,745 A | 4/1998 | Tada et al. |
| 5,754,840 A | 5/1998 | Rivette et al. |
| 5,758,328 A | 5/1998 | Giovannoli |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Greibenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,953,726 A | 9/1999 | Carter et al. |
| 5,991,756 A | 11/1999 | Wu |
| 5,991,780 A | 11/1999 | Rivette et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,182,062 B1 | 1/2001 | Fujisawa et al. |
| 6,182,078 B1 | 1/2001 | Whitmyer, Jr. |
| 6,216,128 B1 | 4/2001 | Di-Criescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,434,580 B1 | 8/2002 | Takano et al. |
| 6,453,312 B1 | 9/2002 | Goiffon et al. |
| 6,499,026 B1 | 12/2002 | Rivette et al. |
| 6,502,081 B1 | 12/2002 | Wiltshire, Jr. et al. |
| 6,556,992 B1 | 4/2003 | Barney et al. |
| 6,574,632 B2 | 6/2003 | Fox et al. |
| 6,662,178 B2 | 12/2003 | Lee |
| 6,665,670 B2 | 12/2003 | Winer et al. |
| 6,675,159 B1 | 1/2004 | Lin et al. |
| 6,678,692 B1 | 1/2004 | Hyatt |
| 6,694,315 B1 | 2/2004 | Grow |
| 6,694,331 B2 | 2/2004 | Lee |
| 6,751,621 B1 | 6/2004 | Calistri-Yeh et al. |
| 6,766,315 B1 | 7/2004 | Bratsos et al. |
| 6,789,092 B1 | 9/2004 | Oppedahl et al. |
| 6,847,966 B1 | 1/2005 | Sommer et al. |
| 6,847,979 B2 | 1/2005 | Allemang et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,221,016 B2 | 5/2007 | Inoue |
| 7,231,384 B2 | 6/2007 | Wu et al. |
| 7,231,386 B2 | 6/2007 | Nonomura et al. |
| 7,281,008 B1 | 10/2007 | Lawrence et al. |
| 7,293,018 B2 | 11/2007 | Hattori et al. |
| 7,296,015 B2 | 11/2007 | Poltorak |
| 7,305,625 B1 | 12/2007 | Zilka et al. |
| 7,369,701 B2 | 5/2008 | Lundberg |
| 7,395,261 B1 | 7/2008 | Atzel |
| 7,444,589 B2 | 10/2008 | Zellner et al. |
| 7,493,253 B1 | 2/2009 | Ceusters et al. |
| 7,523,126 B2 | 4/2009 | Rivette et al. |
| 7,536,446 B2 | 5/2009 | Blumberg |
| 7,680,733 B1 | 3/2010 | Lundberg |
| 7,716,226 B2 | 5/2010 | Barney |
| 7,716,581 B2 | 5/2010 | Tran |
| 7,734,545 B1 | 6/2010 | Fogliano et al. |
| 7,792,832 B2 | 9/2010 | Poltorak |
| 7,823,061 B2 | 10/2010 | Chan |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,041,739 B2 | 10/2011 | Glasgow |
| 8,078,545 B1 | 12/2011 | Zilka et al. |
| 8,095,581 B2 | 1/2012 | Stobbs et al. |
| 8,131,701 B2 | 3/2012 | Barney |
| 8,160,306 B1 | 4/2012 | Neustel et al. |
| 8,161,025 B2 | 4/2012 | Lundberg et al. |
| 8,196,030 B1 | 6/2012 | Wang et al. |
| 8,204,816 B2 | 6/2012 | Brodsky et al. |
| 8,254,692 B2 | 8/2012 | Ramachandrula et al. |
| 8,275,708 B1 | 9/2012 | Dennes et al. |
| 8,335,998 B1 | 12/2012 | Rubinger et al. |
| 8,380,548 B2 | 2/2013 | Ng et al. |
| 8,600,900 B2 | 12/2013 | Lundberg |
| 9,135,211 B2 | 9/2015 | Stern et al. |
| 9,767,190 B2 | 9/2017 | Lundberg et al. |
| 10,579,662 B2 | 3/2020 | Lundberg et al. |
| 11,354,344 B2 | 6/2022 | Lundberg et al. |
| 11,461,862 B2 | 10/2022 | Lundberg |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0082778 A1 | 6/2002 | Barnett et al. |
| 2002/0091541 A1 | 7/2002 | Lundberg |
| 2002/0091542 A1 | 7/2002 | Grainger |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0116363 A1 | 8/2002 | Grainger |
| 2002/0138384 A1 | 9/2002 | Malackowski |

(56) References Cited

U.S. PATENT DOCUMENTS

| | | |
|---|---|---|
| 2002/0138465 A1 | 9/2002 | Lee et al. |
| 2002/0138474 A1 | 9/2002 | Lee |
| 2002/0138475 A1 | 9/2002 | Lee |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0046307 A1 | 3/2003 | Rivette et al. |
| 2003/0050915 A1 | 3/2003 | Allemang et al. |
| 2003/0074354 A1 | 4/2003 | Lee et al. |
| 2003/0115191 A1 | 6/2003 | Copperman et al. |
| 2003/0167181 A1 | 9/2003 | Lundberg et al. |
| 2003/0191654 A1 | 10/2003 | Panchal et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0220891 A1 | 11/2003 | Fish |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0059994 A1 | 3/2004 | Fogel et al. |
| 2004/0078192 A1 | 4/2004 | Poltorak |
| 2004/0078365 A1 | 4/2004 | Poltorak |
| 2004/0083206 A1 | 4/2004 | Wu et al. |
| 2004/0088332 A1 | 5/2004 | Lee et al. |
| 2004/0103112 A1 | 5/2004 | Colson et al. |
| 2004/0122841 A1 | 6/2004 | Goodman et al. |
| 2004/0133566 A1 | 7/2004 | Ishiguro et al. |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186738 A1 | 9/2004 | Reisman |
| 2004/0199400 A1 | 10/2004 | Lundberg |
| 2004/0236646 A1 | 11/2004 | Wu et al. |
| 2004/0260569 A1 | 12/2004 | Bell et al. |
| 2005/0004806 A1 | 1/2005 | Lin et al. |
| 2005/0005239 A1 | 1/2005 | Richards et al. |
| 2005/0060303 A1 | 3/2005 | Wu et al. |
| 2005/0060306 A1 | 3/2005 | Hattori et al. |
| 2005/0071284 A1 | 3/2005 | Courson et al. |
| 2005/0080723 A1 | 4/2005 | Burchetta et al. |
| 2005/0090911 A1 | 4/2005 | Ingargiola et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0182755 A1 | 8/2005 | Tran |
| 2005/0198026 A1 | 9/2005 | Dehlinger et al. |
| 2005/0210008 A1 | 9/2005 | Tran et al. |
| 2005/0210009 A1 | 9/2005 | Tran |
| 2005/0216898 A1 | 9/2005 | Powell, Jr. et al. |
| 2005/0234738 A1 | 10/2005 | Hodes |
| 2005/0246194 A1 | 11/2005 | Lundberg |
| 2005/0256734 A1 | 11/2005 | Clikeman |
| 2005/0261927 A1 | 11/2005 | Bilak et al. |
| 2006/0026174 A1 | 2/2006 | Lundberg et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106847 A1 | 5/2006 | Eckardt, III et al. |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212402 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0277212 A1 | 12/2006 | Error |
| 2006/0287971 A1 | 12/2006 | Armstrong |
| 2007/0005575 A1 | 1/2007 | Dai et al. |
| 2007/0057967 A1 | 3/2007 | Armstrong |
| 2007/0067297 A1 | 3/2007 | Kublickis |
| 2007/0073625 A1 | 3/2007 | Shelton |
| 2007/0073748 A1 | 3/2007 | Barney |
| 2007/0136116 A1 | 6/2007 | Germeraad et al. |
| 2007/0136373 A1 | 6/2007 | Piasecki |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0219853 A1 | 9/2007 | Van Luchene et al. |
| 2007/0219854 A1 | 9/2007 | Mueller et al. |
| 2007/0220041 A1 | 9/2007 | Van Luchene et al. |
| 2007/0239705 A1 | 10/2007 | Hunt et al. |
| 2007/0288256 A1 | 12/2007 | Speier |
| 2007/0288856 A1 | 12/2007 | Butlin et al. |
| 2008/0005103 A1 | 1/2008 | Ratcliffe et al. |
| 2008/0016069 A1 | 1/2008 | Holt |
| 2008/0046862 A1 | 2/2008 | Sattler et al. |
| 2008/0097931 A1 | 4/2008 | Grotto |
| 2008/0154767 A1 | 6/2008 | D'agostino |
| 2008/0154848 A1 | 6/2008 | Haslam et al. |
| 2008/0183518 A1 | 7/2008 | Jiang et al. |
| 2008/0195568 A1 | 8/2008 | Chen et al. |
| 2008/0216013 A1 | 9/2008 | Lundberg. et al. |
| 2008/0281748 A1 | 11/2008 | Newman |
| 2009/0012827 A1 | 1/2009 | Avrunin |
| 2009/0030713 A1 | 1/2009 | Venkatachalam |
| 2009/0055721 A1 | 2/2009 | Kahn |
| 2009/0070301 A1 | 3/2009 | McLean et al. |
| 2009/0083049 A1 | 3/2009 | Sciarrino et al. |
| 2009/0112642 A1 | 4/2009 | Uekane et al. |
| 2009/0150326 A1 | 6/2009 | Sheets |
| 2009/0248468 A1 | 10/2009 | Cronin et al. |
| 2009/0254399 A1 | 10/2009 | Cristol |
| 2009/0259459 A1 | 10/2009 | Ceusters et al. |
| 2009/0259506 A1 | 10/2009 | Barney |
| 2009/0265274 A1 | 10/2009 | Hahn-carlson et al. |
| 2009/0282054 A1 | 11/2009 | Casey |
| 2010/0005094 A1 | 1/2010 | Poltorak |
| 2010/0030680 A1 | 2/2010 | Malackowski et al. |
| 2010/0049769 A1 | 2/2010 | Chen et al. |
| 2010/0057533 A1 | 3/2010 | Martinez Ruiz et al. |
| 2010/0082395 A1 | 4/2010 | De Andrade |
| 2010/0106752 A1 | 4/2010 | Eckardt, III et al. |
| 2010/0131513 A1 | 5/2010 | Lundberg et al. |
| 2010/0153282 A1 | 6/2010 | Graham |
| 2010/0174698 A1 | 7/2010 | Odland et al. |
| 2010/0191564 A1 | 7/2010 | Lee et al. |
| 2010/0191622 A1 | 7/2010 | Reiss et al. |
| 2010/0235337 A1 | 9/2010 | Shanahan et al. |
| 2010/0250340 A1* | 9/2010 | Lee ............ G06Q 50/18 715/833 |
| 2010/0250479 A1 | 9/2010 | Carter |
| 2010/0287478 A1 | 11/2010 | Avasarala et al. |
| 2010/0324949 A1 | 12/2010 | Huang |

(56) References Cited

U.S. PATENT DOCUMENTS

| | | |
|---|---|---|
| 2011/0029476 A1 | 2/2011 | Kasravi et al. |
| 2011/0072014 A1 | 3/2011 | Lundberg et al. |
| 2011/0093449 A1 | 4/2011 | Belenzon et al. |
| 2011/0119134 A1 | 5/2011 | Zivkovic et al. |
| 2011/0145823 A1 | 6/2011 | Rowe et al. |
| 2011/0153509 A1 | 6/2011 | Lundberg et al. |
| 2011/0191310 A1 | 8/2011 | Liao et al. |
| 2011/0191314 A1 | 8/2011 | Howes et al. |
| 2011/0231449 A1 | 9/2011 | Ashley et al. |
| 2011/0246473 A1 | 10/2011 | Stec |
| 2011/0288984 A1 | 11/2011 | Thomas |
| 2011/0307499 A1 | 12/2011 | Elias et al. |
| 2011/0320367 A1 | 12/2011 | Kan et al. |
| 2012/0016859 A1 | 1/2012 | Sears |
| 2012/0096027 A1 | 4/2012 | Coult |
| 2012/0102427 A1 | 4/2012 | Fenster et al. |
| 2012/0130773 A1 | 5/2012 | Abu-ghazalah et al. |
| 2012/0130993 A1 | 5/2012 | Lundberg et al. |
| 2012/0174017 A1 | 7/2012 | Tidwell et al. |
| 2012/0191757 A1 | 7/2012 | Gross et al. |
| 2012/0221580 A1 | 8/2012 | Barney |
| 2012/0254155 A1 | 10/2012 | Heim et al. |
| 2012/0278244 A1 | 11/2012 | Lee et al. |
| 2012/0284199 A1 | 11/2012 | Lundberg |
| 2012/0290487 A1 | 11/2012 | Lee et al. |
| 2012/0317041 A1 | 12/2012 | Shaffer et al. |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0282599 A1 | 10/2013 | Kang et al. |
| 2014/0052650 A1 | 2/2014 | Lundberg et al. |
| 2014/0052667 A1 | 2/2014 | Lundberg et al. |
| 2014/0108273 A1 | 4/2014 | Lundberg et al. |
| 2014/0258146 A1 | 9/2014 | Lundberg et al. |
| 2014/0258147 A1 | 9/2014 | Lundberg et al. |
| 2014/0258148 A1 | 9/2014 | Lundberg et al. |
| 2014/0258149 A1 | 9/2014 | Lundberg et al. |
| 2014/0258150 A1 | 9/2014 | Lundberg et al. |
| 2014/0258151 A1 | 9/2014 | Lundberg et al. |
| 2014/0258153 A1 | 9/2014 | Lundberg |
| 2014/0317000 A1 | 10/2014 | Lundberg et al. |
| 2014/0317125 A1 | 10/2014 | Lundberg et al. |
| 2014/0324711 A1 | 10/2014 | Lundberg et al. |
| 2018/0060425 A1 | 3/2018 | Lundberg et al. |
| 2020/0242149 A1 | 7/2020 | Lundberg et al. |
| 2021/0027405 A1 | 1/2021 | Lundberg et al. |
| 2021/0407025 A1 | 12/2021 | Lundberg et al. |
| 2022/0350831 A1 | 11/2022 | Lundberg et al. |

FOREIGN PATENT DOCUMENTS

| | | |
|---|---|---|
| GB | 2260007 A | 3/1993 |
| WO | WO-9816890 A1 | 4/1998 |
| WO | WO-0243306 A2 | 5/2002 |
| WO | WO-02080039 A1 | 10/2002 |
| WO | WO-03071466 A1 | 8/2003 |
| WO | WO 2003071466 A1 * | 8/2003 |
| WO | WO-2006015110 A2 | 2/2006 |
| WO | WO-2006015110 A3 | 2/2006 |
| WO | WO-2007014341 A2 | 2/2007 |
| WO | WO-2007014341 A3 | 2/2007 |
| WO | WO-2007014341 C2 | 2/2007 |
| WO | WO-2010098864 A2 | 9/2010 |
| WO | WO-2011123131 A1 | 10/2011 |

OTHER PUBLICATIONS

"U.S. Appl. No. 10/710,656, Non Final Office Action dated Jan. 17, 2007", 16 pgs.

"U.S. Appl. No. 10/710,656, Response filed Nov. 13, 2006 to Restriction Requirement dated Oct. 13, 2006", 6 pgs.

"U.S. Appl. No. 10/710,656, Restriction Requirement dated Oct. 13, 2006", 9 pgs.

"U.S. Appl. No. 10/915,265, Final Office Action dated Jul. 10, 2007", 26 pgs.

"U.S. Appl. No. 10/915,265, Final Office Action dated Jul. 14, 2008", 23 pgs.

"U.S. Appl. No. 10/915,265, Non-Final Office Action dated Apr. 13, 2009", 27 pgs.

"U.S. Appl. No. 10/915,265, Non-Final Office Action dated Jun. 2, 2010", 29 pgs.

"U.S. Appl. No. 10/915,265, Non-Final Office Action dated Nov. 5, 2008", 27 pgs.

"U.S. Appl. No. 10/915,265, Non-Final Office Action dated Dec. 28, 2007", 25 pgs.

"U.S. Appl. No. 10/915,265, Response filed Feb. 5, 2009 to Non-Final Office Action dated Nov. 5, 2008", 11 pgs.

"U.S. Appl. No. 10/915,265, Response filed Apr. 28, 2008 to Non-Final Office Action dated Dec. 28, 2007", 14 pgs.

"U.S. Appl. No. 10/915,265, Response filed Jul. 18, 2008 to Final Office Action dated Jul. 14, 2008", 17 pgs.

"U.S. Appl. No. 10/915,265, Response filed Sep. 1, 2010 to Non Final Office Action dated Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 11/494,278, Final Office Action dated Mar. 23, 2009", 21 pgs.

"U.S. Appl. No. 11/494,278, Final Office Action dated Apr. 1, 2010", 20 pgs.

"U.S. Appl. No. 11/494,278, Non Final Office Action dated Oct. 8, 2009", 21 pgs.

"U.S. Appl. No. 11/494,278, Non-Final Office Action dated Mar. 5, 2008", 14 pgs.

"U.S. Appl. No. 11/494,278, Notice of Allowance dated May 3, 2011", 12 pgs.

"U.S. Appl. No. 11/494,278, Notice of Allowance dated Dec. 15, 2011", 14 pgs.

"U.S. Appl. No. 11/494,278, Preliminary Amendment filed Oct. 30, 2007", 6 pgs.

"U.S. Appl. No. 11/494,278, Response filed Feb. 10, 2010 to Non Final Office Action dated Oct. 8, 2009", 8 pgs.

"U.S. Appl. No. 11/494,278, Response filed Jun. 2, 2010 to Final Office Action dated Apr. 1, 2010", 7 pgs.

"U.S. Appl. No. 11/494,278, Response filed Jun. 5, 2008 to Non-Final Office Action dated Mar. 5, 2008", 12 pgs.

"U.S. Appl. No. 11/494,278, Response filed Jun. 23, 2009 to Final Office Action dated Mar. 23, 2009", 8 pgs.

(56) References Cited

OTHER PUBLICATIONS

"U.S. Appl. No. 11/888,632, Amendment filed Jun. 12, 2012", 8 pgs.
"U.S. Appl. No. 11/888,632, Decision on Pre-Appeal Brief mailed Mar. 9, 2012", 2 pgs.
"U.S. Appl. No. 11/888,632, Final Office Action dated Oct. 19, 2011", 9 pgs.
"U.S. Appl. No. 11/888,632, Non Final Office Action dated Jan. 19, 2011", 12 pgs.
"U.S. Appl. No. 11/888,632, Response filed Jul. 19, 2011 to Non Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 12/605,030, Final Office Action dated May 21, 2012", 10 pgs.
"U.S. Appl. No. 12/605,030, Non Final Office Action dated Oct. 7, 2011", 12 pgs.
"U.S. Appl. No. 12/605,030, Response filed Feb. 7, 2012 to Non Final Office Action dated Oct. 7, 2011", 9 pgs.
"U.S. Appl. No. 12/605,030, Response filed Oct. 22, 2012 to Final Office Action dated May 21, 2012", 8 pgs.
"U.S. Appl. No. 12/658,113, Non Final Office Action dated Feb. 28, 2011", 26 pgs.
"U.S. Appl. No. 12/958,113, Final Office Action dated Aug. 8, 2011", 26 pgs.
"U.S. Appl. No. 12/958,113, Response filed May 20, 2011 to Non Final Office Action dated Feb. 28, 2011", 13 pgs.
"U.S. Appl. No. 13/109,080, Response filed Mar. 28, 2013 to Final Office Action dated Nov. 5, 2012", 10 pgs.
"U.S. Appl. No. 13/253,801, Final Office Action dated Jul. 18, 2013", 39 pgs.
"U.S. Appl. No. 13/253,801, Final Office Action dated Oct. 1, 2012", 41 pgs.
"U.S. Appl. No. 13/253,801, Non Final Office Action dated Apr. 10, 2013", 37 pgs.
"U.S. Appl. No. 13/253,801, Non Final Office Action dated Aug. 2, 2012", 42 pgs.
"U.S. Appl. No. 13/253,801, Preliminary Amendment filed Oct. 5, 2011", 4 pgs.
"U.S. Appl. No. 13/253,801, Response filed Mar. 20, 2013 to Final Office Action dated Oct. 1, 2012", 16 pgs.
"U.S. Appl. No. 13/253,801, Response filed Jul. 5, 2013 to Non Final Office Action dated Apr. 10, 2013", 18 pgs.
"U.S. Appl. No. 13/253,801, Response filed Sep. 7, 2012 to Non Final Office Action dated Aug. 2, 2012", 17 pgs.
"U.S. Appl. No. 13/253,811, Final Office Action dated Jul. 2, 2013", 12 pgs.
"U.S. Appl. No. 13/253,811, Non Final Office Action dated Oct. 18, 2012", 12 pgs.
"U.S. Appl. No. 13/253,811, Preliminary Amendment filed Oct. 5, 2011", 4 pgs.
"U.S. Appl. No. 13/253,811, Response filed Mar. 18, 2013 to Non Final Office Action dated Oct. 18, 2012", 13 pgs.
"U.S. Appl. No. 13/253,825, Examiner Interview Summary dated Aug. 13, 2013", 3 pgs.
"U.S. Appl. No. 13/253,825, Final Office Action dated Aug. 14, 2013", 35 pgs.
"U.S. Appl. No. 13/253,825, Final Office Action dated Nov. 21, 2012", 33 pgs.
"U.S. Appl. No. 13/253,825, Non Final Office Action dated Apr. 25, 2013", 32 pgs.
"U.S. Appl. No. 13/253,825, Non Final Office Action dated Aug. 3, 2012", 32 pgs.
"U.S. Appl. No. 13/253,825, Preliminary Amendment filed Oct. 5, 2011", 4 pgs.
"U.S. Appl. No. 13/253,825, Response filed Mar. 20, 2013 to Final Office Action dated Nov. 21, 2012", 17 pgs.
"U.S. Appl. No. 13/253,825, Response filed Jul. 18, 2013 to Non Final Office Action dated Apr. 25, 2013", 16 pgs.
"U.S. Appl. No. 13/253,846, Final Office Action dated Jun. 19, 2013", 21 pgs.
"U.S. Appl. No. 13/253,846, Non Final Office Action dated Oct. 29, 2012", 12 pgs.
"U.S. Appl. No. 13/253,846, Response filed Mar. 26, 2013 to Non Final Office Action dated Oct. 29, 2012", 17 pgs.
"U.S. Appl. No. 13/253,931, Final Office Action dated Jun. 20, 2013", 11 pgs.
"U.S. Appl. No. 13/253,931, Non Final Office Action dated Nov. 28, 2012", 13 pgs.
"U.S. Appl. No. 13/253,931, Response filed Mar. 26, 2013 to Non Final Office Action dated Nov. 28, 2012", 13 pgs.
"U.S. Appl. No. 13/253,936, Final Office Action dated Jun. 24, 2013", 13 pgs.
"U.S. Appl. No. 13/253,936, Non Final Office Action dated Nov. 28, 2012", 11 pgs.
"U.S. Appl. No. 13/253,936, Response filed Mar. 27, 2013 to Non Final Office Action dated Nov. 28, 2012", 11 pgs.
"U.S. Appl. No. 13/253,941, Final Office Action dated Jun. 6, 2013", 16 pgs.
"U.S. Appl. No. 13/253,941, Non Final Office Action dated Nov. 15, 2012", 14 pgs.
"U.S. Appl. No. 13/253,941, Response filed Apr. 15, 2013 to Non Final Office Action dated Nov. 15, 2012", 13 pgs.
"U.S. Appl. No. 13/255,825, Response filed Oct. 30, 2012 to Non Final Office Action dated Aug. 3, 2012", 18 pgs.
"U.S. Appl. No. 13/275,707, Examiner Interview Summary dated Jul. 29, 2013", 3 pgs.
"U.S. Appl. No. 13/275,707, Final Office Action dated Jul. 30, 2013", 90 pgs.
"U.S. Appl. No. 13/275,707, Non Final Office Action dated Dec. 12, 2012", 39 pgs.
"U.S. Appl. No. 13/275,707, Response filed Apr. 9, 2013 to Non Final Office Action dated Dec. 12, 2012", 14 pgs.
"U.S. Appl. No. 13/309,039, Advisory Action dated Apr. 16, 2013", 3 pgs.
"U.S. Appl. No. 13/309,039, Examiner Interview Summary dated Oct. 23, 2012", 3 pgs.
"U.S. Appl. No. 13/309,039, Final Office Action dated Jan. 2, 2013", 11 pgs.
"U.S. Appl. No. 13/309,039, Non Final Office Action dated Sep. 11, 2012", 9 pgs.
"U.S. Appl. No. 13/309,039, Pre-Appeal Brief Request filed May 6, 2013", 5 pgs.
"U.S. Appl. No. 13/309,039, Response filed Apr. 1, 2013 to Final Office Action dated Jan. 2, 2013", 13 pgs.
"U.S. Appl. No. 13/309,039, Response filed Oct. 22, 2012 to Non Final Office Action dated Sep. 11, 2012", 13 pgs.
"U.S. Appl. No. 13/309,060, Final Office Action dated Dec. 7, 2012", 10 pgs.
"U.S. Appl. No. 13/309,060, Non Final Office Action dated May 30, 2013", 11 pgs.
"U.S. Appl. No. 13/309,060, Non Final Office Action dated Aug. 1, 2012", 8 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non Final Office Action dated May 30, 2013", 10 pgs.
"U.S. Appl. No. 13/309,060, Response filed Sep. 20, 2012 to Non Final Office Action dated Aug. 1, 2012", 8 pgs.
"U.S. Appl. No. 13/309,080, Examiner Interview Summary dated Sep. 5, 2012", 3 pgs.
"U.S. Appl. No. 13/309,080, Examiner Interview Summary dated Dec. 17, 2012", 3 pgs.
"U.S. Appl. No. 13/309,080, Final Office Action dated Nov. 5, 2012", 8 pgs.
"U.S. Appl. No. 13/309,080, Non Final Office Action dated Jun. 10, 2013", 12 pgs.
"U.S. Appl. No. 13/309,080, Non Final Office Action dated Jul. 30, 2012", 8 pgs.

(56) References Cited

OTHER PUBLICATIONS

"U.S. Appl. No. 13/309,080, Response filed Aug. 15, 2013 to Non Final Office Action dated Jun. 10, 2013", 14 pgs.
"U.S. Appl. No. 13/309,080, Response filed Aug. 29, 2012 to Non Final Office Action dated Jul. 30, 2012", 11 pgs.
"U.S. Appl. No. 13/309,102, Final Office Action dated Dec. 10, 2012", 10 pgs.
"U.S. Appl. No. 13/309,102, Non Final Office Action dated May 30, 2013", 13 pgs.
"U.S. Appl. No. 13/309,102, Non Final Office Action dated Aug. 6, 2012", 7 pgs.
"U.S. Appl. No. 13/309,102, Response filed Apr. 9, 2013 to Final Office Action dated Dec. 10, 2012", 13 pgs.
"U.S. Appl. No. 13/309,102, Response filed Sep. 25, 2012 to Non Final Office Action dated Aug. 6, 2012", 10 pgs.
"U.S. Appl. No. 13/309,127, Final Office Action dated Oct. 10, 2012", 18 pgs.
"U.S. Appl. No. 13/309,127, Non Final Office Action dated Apr. 25, 2013", 19 pgs.
"U.S. Appl. No. 13/309,127, Non Final Office Action dated Jun. 25, 2012", 15 pgs.
"U.S. Appl. No. 13/309,127, Response filed Mar. 25, 2013 to Final Office Action dated Oct. 10, 2012", 13 pgs.
"U.S. Appl. No. 13/309,127, Response filed Jul. 24, 2013 to Non Final Office Action dated Apr. 25, 2013", 11 pgs.
"U.S. Appl. No. 13/309,127, Response filed Aug. 1, 2012 to Non Final Office Action dated Jun. 25, 2012", 15 pgs.
"U.S. Appl. No. 13/309,166, Non Final Office Action dated Feb. 22, 2013", 9 pgs.
"U.S. Appl. No. 13/309,166, Non Final Office Action dated May 23, 2013", 9 pgs.
"U.S. Appl. No. 13/309,166, Response filed May 14, 2013 to Non Final Office Action dated Feb. 22, 2013", 10 pgs.
"U.S. Appl. No. 13/309,166, Response filed Aug. 15, 2013 to Non Final Office Action dated May 23, 2013", 11 pgs.
"U.S. Appl. No. 13/309,200, Non Final Office Action dated Jul. 2, 2013", 14 pgs.
"U.S. Appl. No. 13/309,200, Non Final Office Action dated Sep. 10, 2012", 12 pgs.
"U.S. Appl. No. 13/309,200, Response filed Mar. 11, 2013 to Non Final Office Action dated Sep. 10, 2012", 13 pgs.
"U.S. Appl. No. 13/310,279, Non Final Office Action dated Jun. 17, 2013", 12 pgs.
"U.S. Appl. No. 13/310,322, Non Final Office Action dated Jul. 2, 2013", 16 pgs.
"U.S. Appl. No. 13/310,368, Non Final Office Action dated Jun. 17, 2013", 17 pgs.
"U.S. Appl. No. 13/310,417, Non Final Office Action dated Jun. 17, 2013", 13 pgs.
"U.S. Appl. No. 13/310,452, Non Final Office Action dated Jul. 10, 2013", 14 pgs.
"U.S. Appl. No. 13/351,533, Final Office Action dated Jan. 23, 2013", 33 pgs.
"U.S. Appl. No. 13/351,533, Non Final Office Action dated May 25, 2012", 20 pgs.
"U.S. Appl. No. 13/351,533, Non Final Office Action dated Sep. 6, 2012", 26 pgs.
"U.S. Appl. No. 13/351,533, Response filed Apr. 10, 2013 to Final Office Action dated Jan. 23, 2013", 12 pgs.
"U.S. Appl. No. 13/351,533, Response filed Jun. 8, 2012 to Non Final Office Action dated May 25, 2012", 12 pgs.
"U.S. Appl. No. 13/351,533, Response filed Nov. 20, 2012 to Non Final Office Action dated Sep. 6, 2012", 14 pgs.
"U.S. Appl. No. 13/365,062, Non Final Office Action dated Nov. 30, 2012", 19 pgs.
"U.S. Appl. No. 13/365,062, Non-Final Office Action dated Jul. 3, 2012", 20 pgs.
"U.S. Appl. No. 13/365,062, Response filed Oct. 3, 2012 to Non Final Office Action dated Jul. 3, 2012", 8 pgs.
"U.S. Appl. No. 13/408,877, Non Final Office Action dated Feb. 28, 2013", 22 pgs.
"U.S. Appl. No. 13/408,877, Response filed May 16, 2013 to Non Final Office Action dated Feb. 28, 2013", 17 pgs.
"U.S. Appl. No. 13/408,917, Non Final Office Action dated Mar. 5, 2013", 18 pgs.
"U.S. Appl. No. 13/408,917, Response filed Jun. 3, 2013 to Non Final Office Action dated Mar. 5, 2013", 16 pgs.
"U.S. Appl. No. 13/409,189, Non Final Office Action dated Feb. 28, 2013", 20 pgs.
"U.S. Appl. No. 13/409,189, Response filed May 28, 2013 to Non Final Office Action dated Feb. 28, 2013", 16 pgs.
"U.S. Appl. No. 13/422,750, Final Office Action dated Aug. 7, 2013", 29 pgs.
"U.S. Appl. No. 13/422,750, Non Final Office Action dated Apr. 12, 2013", 19 pgs.
"U.S. Appl. No. 13/422,750, Response filed Jul. 12, 2013 to Non Final Office Action dated Apr. 12, 2013", 14 pgs.
"U.S. Appl. No. 13/424,682, Non Final Office Action dated Apr. 11, 2013", 6 pgs.
"U.S. Appl. No. 13/424,682, Notice of Allowance dated Jul. 30, 2013", 13 pgs.
"U.S. Appl. No. 13/424,682, Response filed Jul. 5, 2013 to Non Final Office Action dated Apr. 11, 2013", 10 pgs.
"U.S. Appl. No. 13/424,705, Non Final Office Action dated Apr. 12, 2013", 14 pgs.
"U.S. Appl. No. 13/424,705, Response filed Jul. 12, 2013 to Non Final Office Action dated Apr. 12, 2013", 11 pgs.
"U.S. Appl. No. 13/452,400, Final Office Action dated Jul. 5, 2013", 25 pgs.
"U.S. Appl. No. 13/452,400, Non Final Office Action dated Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action dated Oct. 5, 2012", 12 pgs.
"U.S. Appl. No. 13/553,572 Response filed Jun. 3, 2013 to Non-Final Office Action dated Mar. 7, 2013", 17 pgs.
"U.S. Appl. No. 13/553,572, Final Office Action dated Jul. 2, 2013", 12 pgs.
"U.S. Appl. No. 13/553,572, Non Final Office Action dated Mar. 7, 2013", 14 pgs.
"U.S. Appl. No. 13/553,572, Preliminary Amendment filed Sep. 17, 2012", 7 pgs.
"U.S. Appl. No. 13/594,002, Final Office Action dated Jul. 31, 2013", 24 pgs.
"U.S. Appl. No. 13/594,002, Non Final Office Action dated Feb. 27, 2013", 21 pgs.
"U.S. Appl. No. 13/594,002, Response filed May 14, 2013 to Non Final Office Action dated Feb. 27, 2013", 11 pgs.
"U.S. Appl. No. 13/679,830, Non Final Office Action dated Jun. 14, 2013", 21 pgs.
"U.S. Appl. No. 13/956,162, Final Office Action dated Aug. 13, 2019", 55 pgs.
"U.S. Appl. No. 13/956,162, Final Office Action dated Aug. 27, 2018", 50 pgs.
"U.S. Appl. No. 13/956,162, Non Final Office Action dated Jan. 14, 2019", 55 pgs.
"U.S. Appl. No. 13/956,162, Non Final Office Action dated Jun. 11, 2020", 53 pgs.
"U.S. Appl. No. 13/956,162, Non Final Office Action dated Nov. 17, 2017", 44 pgs.
"U.S. Appl. No. 13/956,162, Response filed Feb. 13, 2020 to Final Office Action dated Aug. 13, 2019", 20 pgs.
"U.S. Appl. No. 13/956,162, Response filed Apr. 15, 2019 to Non Final Office Action dated Jan. 14, 2019", 17 pgs.
"U.S. Appl. No. 13/956,162, Response filed Apr. 17, 2018 to Non Final Office Action dated Nov. 17, 2017", 22 pgs.
"U.S. Appl. No. 13/956,162, Response filed Dec. 27, 2018 to Final Office Action dated Aug. 27, 2018", 18 pgs.
"U.S. Appl. No. 13/971,349, Final Office Action dated Jan. 7, 2019", 28 pgs.

(56) References Cited

OTHER PUBLICATIONS

"U.S. Appl. No. 13/971,349, Final Office Action dated Dec. 19, 2017", 26 pgs.

"U.S. Appl. No. 13/971,349, Non Final Office Action dated May 31, 2018", 27 pgs.

"U.S. Appl. No. 13/971,349, Non Final Office Action dated Dec. 12, 2019", 18 pgs.

"U.S. Appl. No. 13/971,349, Response filed Apr. 8, 2019 to Final Office Action dated Jan. 7, 2019", 18 pgs.

"U.S. Appl. No. 13/971,349, Response Filed May 21, 2018 to Final Office Action dated Dec. 19, 2017", 15 pgs.

"U.S. Appl. No. 13/971,349, Response filed Nov. 22, 2017 to Non Final Office Action dated Jun. 23, 2017", 12 pgs.

"U.S. Appl. No. 13/971,349, Response to Non Final Office Action filed Oct. 1, 2018 to Non Final Office Action dated May 31, 2018", 23 pgs.

"U.S. Appl. No. 14/257,118, Final Office Action dated Jun. 3, 2019", 32 pgs.

"U.S. Appl. No. 14/257,118, Final Office Action dated Jun. 12, 2017", 55 pgs.

"U.S. Appl. No. 14/257,118, Final Office Action dated Aug. 6, 2018", 55 pgs.

"U.S. Appl. No. 14/257,118, Non Final Office Action dated Sep. 13, 2019", 32 pgs.

"U.S. Appl. No. 14/257,118, Non Final Office Action dated Nov. 1, 2016", 58 pgs.

"U.S. Appl. No. 14/257,118, Non Final Office Action dated Nov. 20, 2018", 60 pgs.

"U.S. Appl. No. 14/257,118, Non Final Office Action dated Nov. 22, 2017", 49 pgs.

"U.S. Appl. No. 14/257,118, Response filed Apr. 22, 2019 to Non Final Office Action dated Nov. 10, 2018", 17 pgs.

"U.S. Appl. No. 14/257,118, Response filed May 1, 2017 to Non Final Office Action dated Nov. 1, 2016", 32 pgs.

"U.S. Appl. No. 14/257,118, Response filed May 22, 2018 to Non Final Office Action dated Nov. 22, 2017", 12 pgs.

"U.S. Appl. No. 14/257,118, Response filed Sep. 3, 2019 to Final Office Action dated Jun. 3, 2019", 15 pgs.

"U.S. Appl. No. 14/257,118, Response fled Nov. 6, 2018 to Final Office Action dated Aug. 6, 2018", 19 pgs.

"U.S. Appl. No. 14/259,900, Advisory Action dated Jan. 10, 2017", 3 pgs.

"U.S. Appl. No. 14/259,900, Final Office Action dated Sep. 30, 2016", 12 pgs.

"U.S. Appl. No. 14/259,900, Non Final Office Action dated Feb. 8, 2016", 9 pgs.

"U.S. Appl. No. 14/259,900, Notice of Allowance dated May 18, 2017", 7 pgs.

"U.S. Appl. No. 14/259,900, Response filed Aug. 8, 2016 to Non Final Office Action dated Feb. 8, 2016", 16 pgs.

"U.S. Appl. No. 14/259,900, Response filed Dec. 30, 2016 to Final Office Action dated Sep. 30, 2016", 15 pgs.

"U.S. Appl. No. 14/264,571, Final Office Action dated Jul. 26, 2017", 36 pgs.

"U.S. Appl. No. 14/264,571, Final Office Action dated Oct. 21, 2019", 50 pgs.

"U.S. Appl. No. 14/264,571, Final Office Action dated Nov. 29, 2018", 43 pgs.

"U.S. Appl. No. 14/264,571, Non Final Office Action dated Mar. 21, 2018", 35 pgs.

"U.S. Appl. No. 14/264,571, Non Final Office Action dated Jun. 10, 2019", 49 pgs.

"U.S. Appl. No. 14/264,571, Non Final Office Action dated Dec. 20, 2016", 24 pgs.

"U.S. Appl. No. 14/264,571, Response filed Jan. 26, 2018 to Final Office Action dated Jul. 26, 2018", 15 pgs.

"U.S. Appl. No. 14/264,571, Response filed Aug. 21, 2018 to Non Final Office Action dated Mar. 21, 2018", 16 pgs.

"U.S. Appl. No. 14/264,571, Response filed Mar. 29, 2019 to Final Office Action dated Nov. 29, 2018", 21 pgs.

"U.S. Appl. No. 14/264,571, Response filed Sep. 10, 2019 to Non-Final Office Action dated Jun. 10, 2019", 24 pgs.

"U.S. Appl. No. 14/267,122, Final Office Action dated May 7, 2020", 53 pgs.

"U.S. Appl. No. 14/267,122, Final Office Action dated Jul. 26, 2017", 36 pgs.

"U.S. Appl. No. 14/267,122, Final Office Action dated Nov. 29, 2018", 43 pgs.

"U.S. Appl. No. 14/267,122, Non Final Office Action dated Mar. 21, 2018", 34 pgs.

"U.S. Appl. No. 14/267,122, Non Final Office Action dated May 28, 2019", 49 pgs.

"U.S. Appl. No. 14/267,122, Non Final Office Action dated Dec. 23, 2016", 25 pgs.

"U.S. Appl. No. 14/267,122, Preliminary Amendment filed May 27, 2014", 6 pgs.

"U.S. Appl. No. 14/267,122, Response filed Jan. 26, 2018 to Final Office Action dated Jul. 26, 2017", 15 pgs.

"U.S. Appl. No. 14/267,122, Response filed May 23, 2017 to Non Final Office Action dated Dec. 23, 2016", 15 pgs.

"U.S. Appl. No. 14/267,122, Response filed Aug. 21, 2018 to Non Final Office Action dated Mar. 21, 2018", 20 pgs.

"U.S. Appl. No. 14/267,122, Response filed Dec. 17, 2019 to Non Final Office Action dated May 28, 2019", 24 pgs.

"U.S. Appl. No. 14/267,122, Response filed Mar. 29, 2019 to Final Office Action dated Nov. 29, 2018", 21 pgs.

"U.S. Appl. No. 14/267,122, Response filed Sep. 30, 2019 to Non-Final Office Action dated May 28, 2019", 24 pgs.

"U.S. Appl. No. 14/267,398, Final Office Action dated Jul. 27, 2017", 36 pgs.

"U.S. Appl. No. 14/267,398, Final Office Action dated Oct. 21, 2019", 50 pgs.

"U.S. Appl. No. 14/267,398, Final Office Action dated Nov. 29, 2018", 42 pgs.

"U.S. Appl. No. 14/267,398, Non Final Office Action dated Mar. 21, 2018", 35 pgs.

"U.S. Appl. No. 14/267,398, Non Final Office Action dated Jun. 10, 2019", 49 pgs.

"U.S. Appl. No. 14/267,398, Non Final Office Action dated Dec. 23, 2016", 25 pgs.

"U.S. Appl. No. 14/267,398, Preliminary Amendment filed May 27, 2014", 6 pgs.

"U.S. Appl. No. 14/267,398, Response filed Mar. 29, 2019 to Final Office Action dated Nov. 29, 2018", 21 pgs.

"U.S. Appl. No. 14/267,398, Response filed May 23, 2017 to Non Final Office Action dated Dec. 23, 2016", 15 pgs.

"U.S. Appl. No. 14/267,398, Response filed Aug. 21, 2018 to Non Final Office Action dated Mar. 21, 2018", 20 pgs.

"U.S. Appl. No. 14/267,398, Response filed Dec. 27, 2017 to Final Office Action dated Jul. 27, 2017", 15 pgs.

"U.S. Appl. No. 14/267,398, Response filed Sep. 10, 2019 to Non-Final Office Action dated Jun. 10, 2019", 24 pgs.

"U.S. Appl. No. 14/267,416, Final Office Action dated Jul. 27, 2017", 37 pgs.

"U.S. Appl. No. 14/267,416, Final Office Action dated Oct. 21, 2019", 50 pgs.

"U.S. Appl. No. 14/267,416, Final Office Action dated Nov. 29, 2018", 42 pgs.

"U.S. Appl. No. 14/267,416, Non Final Office Action dated Mar. 19, 2020", 47 pgs.

"U.S. Appl. No. 14/267,416, Non Final Office Action dated Mar. 21, 2018", 35 pgs.

"U.S. Appl. No. 14/267,416, Non Final Office Action dated Jun. 26, 2019", 49 pgs.

"U.S. Appl. No. 14/267,416, Non Final Office Action dated Dec. 23, 2016", 25 pgs.

"U.S. Appl. No. 14/267,416, Preliminary Amendment filed May 27, 2014", 6 pgs.

"U.S. Appl. No. 14/267,416, Response filed Feb. 24, 2020 to Final Office Action dated Oct. 21, 2019", 19 pgs.

"U.S. Appl. No. 14/267,416, Response filed May 23, 2017 to Non Final Office Action dated Dec. 23, 2016", 15 pgs.

(56) References Cited

OTHER PUBLICATIONS

"U.S. Appl. No. 14/267,416, Response filed Aug. 21, 2018 to Non Final Office Action dated Mar. 21, 2018", 19 pgs.
"U.S. Appl. No. 14/267,416, Response filed Dec. 27, 2017 to Final Office Action dated Jul. 27, 2017", 15 pgs.
"U.S. Appl. No. 14/267,416, Response filed Mar. 29, 2019 to Final Office Action dated Nov. 29, 2018", 21 pgs.
"U.S. Appl. No. 14/267,416, Response filed Sep. 26, 2019 to Non-Final Office Action dated Jun. 26, 2019", 24 pgs.
"U.S. Appl. No. 14/269,284, Amendment and Response filed Mar. 13, 2019 to Final Office Action dated Dec. 13, 2018", 21 pgs.
"U.S. Appl. No. 14/269,284, Amendment and Response filed Aug. 9, 2018 to Non Final Office Action dated Apr. 9, 2018", 16 pgs.
"U.S. Appl. No. 14/269,284, Final Office Action dated Jul. 26, 2017", 36 pgs.
"U.S. Appl. No. 14/269,284, Final Office Action dated Oct. 3, 2019", 49 pgs.
"U.S. Appl. No. 14/269,284, Final Office Action dated Dec. 13, 2018", 43 pgs.
"U.S. Appl. No. 14/269,284, Non Final Office Action dated Feb. 3, 2017", 26 pgs.
"U.S. Appl. No. 14/269,284, Non Final Office Action dated Apr. 9, 2018", 34 pgs.
"U.S. Appl. No. 14/269,284, Non Final Office Action dated May 16, 2019", 47 pgs.
"U.S. Appl. No. 14/269,284, Preliminary Amendment filed May 27, 2014", 6 pgs.
"U.S. Appl. No. 14/269,284, Response filed Jan. 26, 2018 to Final Office Action dated Jul. 26, 2017", 15 pgs.
"U.S. Appl. No. 14/269,284, Response filed Jun. 5, 2017 to Non Final Office Action dated Feb. 3, 2017", 20 pgs.
"U.S. Appl. No. 14/269,284, Response filed Sep. 16, 2019 to Non-Final Office Action dated May 16, 2019", 24 pgs.
"U.S. Appl. No. 14/272,665, Final Office Action dated Jul. 27, 2017", 39 pgs.
"U.S. Appl. No. 14/272,665, Final Office Action dated Oct. 3, 2019", 52 pgs.
"U.S. Appl. No. 14/272,665, Final Office Action dated Nov. 29, 2018", 45 pgs.
"U.S. Appl. No. 14/272,665, Non Final Office Action dated Feb. 3, 2017", 26 pgs.
"U.S. Appl. No. 14/272,665, Non Final Office Action dated Mar. 21, 2018", 36 pgs.
"U.S. Appl. No. 14/272,665, Non Final Office Action dated Jun. 6, 2019", 51 pgs.
"U.S. Appl. No. 14/272,665, Preliminary Amendment filed May 27, 2014", 6 pgs.
"U.S. Appl. No. 14/272,665, Response filed Jun. 5, 2017 to Non Final Office Action dated Feb. 3, 2017", 20 pgs.
"U.S. Appl. No. 14/272,665, Response filed Aug. 21, 2018 to Non Final Office Action dated Mar. 21, 2018", 19 pgs.
"U.S. Appl. No. 14/272,665, Response filed Sep. 16, 2019 to Non Final Office Action dated Jun. 6, 2019", 24 pgs.
"U.S. Appl. No. 14/272,665, Response filed Dec. 27, 2017 to Final Office Action dated Jul. 27, 2017", 15 pgs.
"U.S. Appl. No. 14/272,665, Response filed Mar. 29, 2019 to Final Office Action dated Nov. 29, 2018", 21 pgs.
"U.S. Appl. No. 14/272,674, Final Office Action dated Jul. 27, 2017", 37 pgs.
"U.S. Appl. No. 14/272,674, Final Office Action dated Oct. 21, 2019", 49 pgs.
"U.S. Appl. No. 14/272,674, Final Office Action dated Nov. 29, 2018", 42 pgs.
"U.S. Appl. No. 14/272,674, Non Final Office Action dated Mar. 21, 2018", 35 pgs.
"U.S. Appl. No. 14/272,674, Non Final Office Action dated Jun. 10, 2019", 49 pgs.
"U.S. Appl. No. 14/272,674, Non Final Office Action dated Dec. 20, 2016", 25 pgs.

"U.S. Appl. No. 14/272,674, Response filed May 22, 2017 to Non Final Office Action dated Dec. 20, 2016", 22 pgs.
"U.S. Appl. No. 14/272,674, Response filed Aug. 21, 2018 to Non Final Office Action dated Mar. 21, 2018", 19 pgs.
"U.S. Appl. No. 14/272,674, Response filed Dec. 27, 2017 to Final Office Action dated Jul. 27, 2017", 15 pgs.
"U.S. Appl. No. 14/272,674, Response filed Mar. 29, 2019 to Final Office Action dated Nov. 29, 2018", 21 pgs.
"U.S. Appl. No. 14/272,674, Response filed Sep. 10, 2019 to Non-Final Office Action dated Jun. 10, 2019", 24 pgs.
"U.S. Appl. No. 14/281,513, Appeal Brief filed Jun. 15, 2020", 23 pgs.
"U.S. Appl. No. 14/281,513, Appeal Decision dated Oct. 21, 2021", 12 pgs.
"U.S. Appl. No. 14/281,513, Final Office Action dated Jan. 28, 2020", 38 pgs.
"U.S. Appl. No. 14/281,513, Final Office Action dated Oct. 6, 2017", 24 pgs.
"U.S. Appl. No. 14/281,513, Final Office Action dated Dec. 13, 2018", 35 pgs.
"U.S. Appl. No. 14/281,513, Non Final Office Action dated Mar. 27, 2017", 16 pgs.
"U.S. Appl. No. 14/281,513, Non Final Office Action dated May 15, 2019", 36 pgs.
"U.S. Appl. No. 14/281,513, Non-Final Office Action dated May 10, 2018", 29 pgs.
"U.S. Appl. No. 14/281,513, Notice of Allowance dated Apr. 29, 2022", 10 pgs.
"U.S. Appl. No. 14/281,513, Notice of Allowance dated Nov. 23, 2021", 9 pgs.
"U.S. Appl. No. 14/281,513, Reply Brief filed Oct. 21, 2020", 5 pgs.
"U.S. Appl. No. 14/281,513, Response filed Jan. 30, 2018 to Final Office Action dated Oct. 6, 2017", 11 pgs.
"U.S. Appl. No. 14/281,513, Response filed Jun. 27, 2017 to Non Final Office Action dated Mar. 27, 2017", 9 pgs.
"U.S. Appl. No. 14/281,513, Response filed Aug. 10, 2018 to Non Final Office Action dated May 10, 2018", 17 pgs.
"U.S. Appl. No. 14/281,513, Response filed Oct. 15, 2019 to Non-Final Office Action dated May 15, 2019", 13 pgs.
"U.S. Appl. No. 14/281,513, Response filed Mar. 12, 2019 to Final Office Action dated Dec. 13, 2018", 13 pgs.
"U.S. Appl. No. 15/691,642, Non Final Office Action dated Jun. 26, 2019", 9 pgs.
"U.S. Appl. No. 15/691,642, Notice of Allowance dated Oct. 21, 2019", 7 pgs.
"U.S. Appl. No. 15/691,642, Preliminary Amendment filed Nov. 13, 2017", 11 pgs.
"U.S. Appl. No. 15/691,642, Response filed Sep. 26, 2019 to Non-Final Office Action dated Jun. 26, 2019", 12 pgs.
"U.S. Appl. No. 16/777,656, Non Final Office Action dated Oct. 13, 2021", 8 pgs.
"U.S. Appl. No. 16/777,656, Notice of Allowance dated Feb. 3, 2022", 7 pgs.
"U.S. Appl. No. 16/777,656, Preliminary Amendment filed Feb. 18, 2020", 11 pgs.
"U.S. Appl. No. 16/777,656, Response filed Jan. 13, 2022 to Non Final Office Action dated Oct. 13, 2021", 11 pgs.
"U.S. Appl. No. 17/069,464, Non Final Office Action mailed Oct. 8, 2021", 16 pgs.
"Australian Application Serial No. 2006272510, Office Action dated Oct. 22, 2010", 3 pgs.
"Casefinder Manual, Ch. 1: Overview; Ch. 8: Hyperlinking", [Online]. Retrieved from the Internet: < URL: http://web.archive.org/web/20040419155315/http://www.casefinder.com/downloads/manual-5.00.pdf>, (Archived Apr. 19, 2004), 13 pgs.
"ClaimMaster Software User Guide", ClaimMaster Software LLP, (2009), 36 pgs.
"Darn Those Pop-Up Ads! They're Maddening, But Do They Work?", Inc.com, [Online] Retrieved from the Internet: <https://www.inc.com/articles/2003/08/popup.html>, (Aug. 2003), 9 pgs.
"Definition of Pop-Up, Techterms", [Online] Retrieved from the Internet: <URL: https://techterms.com/definition/popup>, (Oct. 7, 2008), 1 pg.

(56) References Cited

OTHER PUBLICATIONS

"East Text Search Training", (Jan. 2000), 155 pgs.

"European Application Serial No. 05775617.3, Extended European Search Report dated Mar. 24, 2009", 8 pgs.

"European Application Serial No. 06800464.7, Extended European Search Report dated Aug. 24, 2010", 8 pgs.

"Google Definition: System", [Online] Retrieved from the Internet: <URL: http://www.google.com>, (Retrieved Aug. 13, 2012), 3 pgs.

"International Application Serial No. PCT/US2005/026768, Demand dated Mar. 7, 2007", 9 pgs.

"International Application Serial No. PCT/US2005/026768, International Preliminary Report on Patentability dated Mar. 29, 2007", 8 pgs.

"International Application Serial No. PCT/US2005/026768, International Search Report dated Mar. 7, 2007", 5 pgs.

"International Application Serial No. PCT/US2005/026768, Written Opinion dated Mar. 7, 2007", 5 pgs.

"International Application Serial No. PCT/US2006/029456, International Preliminary Report on Patentability dated Feb. 7, 2008", 9 pgs.

"International Application Serial No. PCT/US2006/029456, International Search Report dated Oct. 1, 2007", 5 pgs.

"International Application Serial No. PCT/US2006/029456, Written Opinion dated Oct. 1, 2007", 7 pgs.

"Lesson 5: Patent and Patent Citations", Loet Leydesdorff, Amsterdam School of Communications Research (ASCoR), [Online] Retrieved from the Internet on May 25, 2018: <URL: https://web.archive.org/web/20110207072432/https://www.leydesdorff.net/indicators/lesson5.htm>, (2011), 7 pgs.

"Module", Dictionary.com, [Online] Retrieved from Internet: <URL: http://dictionary.reference.com/browse/module>, (Retrieved Aug. 13, 2012), 5 pgs.

"Notice from the European Patent Office dated Oct. 1, 2007 concerning business methods", Official Journal of the European Patent Office, 30(11), (Nov. 1, 2007), 592-593.

"PatentOptimizer", LexisNexis, (2009), 2 pgs.

"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.

"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.

"What is PAIR?", USPTO, [Online]. Retrieved from the Internet: <URL: http://web.archive.org/web/20040606224528/pair.uspto.gov/cgi-bin/final/help.pl>, (Archived Jun. 6, 2004), 9 pgs.

Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.

Davis, Lee, "The Strategic Use of Patents in International Business", The 28th Annual EIBA Conference, Athens, Greece, (Dec. 2002), 27 pgs.

East, T. W, "Patent Claims—How to Keep Track of Them", IEEE Aerospace and Electronic Systems Magazine, 10(8), (Aug. 1995), 32-33.

Fall, C.J., et al., "Literature Survey: Issue to be considered in the automatic classifications of patents", World Intellectual Property Organization, (Oct. 2002), 64 pgs.

Friedman, Vitaly, "Should Links Open In New Windows?", Smashing Magazine, [Online] Retrieved from the Internet: <URL: https://www.smashingmagazine.com/2008/07/should-links-open-in-new-windows/>, (Jul. 1, 2008), 10 pgs.

Hoover, A. E, "Electronic Filing Top 10 Wish List", IP Today, (Jul. 2006), 2 pgs.

Hutzell, Paula, "Image File Wrapper (IFW) Processing", USPTO PPT Presentation, (May 8, 2003), 25 pgs.

Jagalla, Christopher, "Searching USPTO Assignments on the Web", (Nov. 20, 2010), 4 pgs.

Kasravi, K, et al., "Multivariate Patent Similarity Detection", 42nd Hawaii International Conference on System Sciences, (2009), 1-8.

Larkey, L. S, "A Patent Search and Classification System", Proc. of the 4th ACM Conference of Digital Libraries, (1999), 179-187.

Larkey, Leah S, et al., "Collection Selection and Results Merging with Topically Organized U.S. Patents and TREC Data", Proc. of the 9th Int'l Conference on Information and Knowledge Management, (2000), 8 pgs.

Luo, Si, et al., "A Semisupervised Learning Method to Merge Search Engine results", ACM Transactions on Information Systems, vol. 21, No. 4, (Oct. 2002), 35 pgs.

Mahesh, K., "Ontology Development for Machine Translation: Ideology and Methodology", Technical Report MCCS-96-292, Computing Research Laboratory, New Mexico State University, (1996), 87 pgs.

Mase, H., et al., "Proposal of Two-Stage Patent Retrieval Method Considering the Claim Structure", ACM Transactions on Asian Language Information Processing (TALIP), 4(2), (Jun. 2005), 190-206.

Park, Y, et al., "Patent analysis for promoting technology transfer in multi-technology industries: the Korean aerospace industry case", Journal of Technology Transfer, vol. 37, (3), (Jun. 2012), 355-374.

Sheremetyeva, S., et al., "Generating Patent Claims from Interactive Input", Proc. of the 8th International Workshop on Natural Language Generation (INLG), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proc. of the ACL—2003 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Woods, W. A, "Conceptual Indexing: A Better Way to Organize Knowledge", Sun Microsystems, Inc., (1997), 99 pgs.

"U.S. Appl. No. 13/422,750, Final Office Action dated Jun. 15, 2016", 37 pgs.

"U.S. Appl. No. 13/422,750, Non Final Office Action dated Apr. 1, 2014", 32 pgs.

"U.S. Appl. No. 13/422,750, Non Final Office Action dated Oct. 31, 2014", 32 pgs.

"U.S. Appl. No. 13/422,750, Response filed Jan. 30, 2014 to Final Office Action dated Aug. 7, 2013", 13 pgs.

"U.S. Appl. No. 13/422,750, Response filed Feb. 2, 2015 to Non Final Office Action dated Oct. 31, 2014", 11 pgs.

"U.S. Appl. No. 13/422,750, Response filed Sep. 2, 2014 to Non Final Office Action dated Apr. 1, 2014", 10 pgs.

"U.S. Appl. No. 13/424,705, Advisory Action dated Nov. 29, 2013", 3 pgs.

"U.S. Appl. No. 13/424,705, Final Office Action dated Sep. 11, 2015", 28 pgs.

"U.S. Appl. No. 13/424,705, Final Office Action dated Sep. 19, 2013", 11 pgs.

"U.S. Appl. No. 13/424,705, Non Final Office Action dated Jun. 16, 2014", 21 pgs.

"U.S. Appl. No. 13/424,705, Non Final Office Action dated Jul. 23, 2014", 21 pgs.

"U.S. Appl. No. 13/424,705, Response filed Nov. 19, 2013 to Final Office Action dated Sep. 19, 2013", 11 pgs.

"U.S. Appl. No. 13/424,705, Response filed Nov. 24, 2014 to Non Final Office Action dated Jul. 23, 2014", 14 pgs.

"U.S. Appl. No. 13/679,830, Final Office Action dated Jan. 31, 2014", 27 pgs.

"U.S. Appl. No. 13/679,830, Final Office Action dated Apr. 23, 2015", 36 pgs.

"U.S. Appl. No. 13/679,830, Non Final Office Action dated Jan. 4, 2016", 61 pgs.

"U.S. Appl. No. 13/679,830, Non Final Office Action dated Nov. 6, 2014", 36 pgs.

"U.S. Appl. No. 13/679,830, Response filed Feb. 6, 2015 to Non Final Office Action dated Nov. 6, 2014", 12 pgs.

"U.S. Appl. No. 13/679,830, Response filed Jun. 12, 2014 to Final Office Action dated Jan. 31, 2014", 16 pgs.

"U.S. Appl. No. 13/679,830, Response filed Jul. 5, 2016 to Non Final Office Action dated Jan. 4, 2016", 11 pgs.

(56) References Cited

OTHER PUBLICATIONS

"U.S. Appl. No. 13/679,830, Response filed Sep. 23, 2015 to Final Office Action dated Apr. 23, 2015", 14 pgs.
"U.S. Appl. No. 13/679,830, Response filed Nov. 14, 2013 to Non Final Office Action dated Jun. 14, 2013", 14 pgs.
"U.S. Appl. No. 13/956,162, Final Office Action dated Mar. 18, 2016", 42 pgs.
"U.S. Appl. No. 13/956,162, Final Office Action dated May 5, 2017", 52 pgs.
"U.S. Appl. No. 13/956,162, Non Final Office Action dated Sep. 11, 2015", 44 pgs.
"U.S. Appl. No. 13/956,162, Non Final Office Action dated Oct. 3, 2016", 44 pgs.
"U.S. Appl. No. 13/956,162, Preliminary Amendment filed Jan. 10, 2014", 7 pgs.
"U.S. Appl. No. 13/956,162, Response filed Jan. 3, 2017 to Non Final Office Action dated Oct. 3, 2016", 22 pgs.
"U.S. Appl. No. 13/956,162, Response filed Feb. 11, 2016 to Non Final Office Action dated Sep. 11, 2016", 28 pgs.
"U.S. Appl. No. 13/956, 162, Response filed Jul. 18, 2016 to Final Office Action dated Mar. 18, 2016", 18 pgs.
"U.S. Appl. No. 13/956,162, Response filed Aug. 7, 2017 to Final Office Action dated May 5, 2017", 15 pgs.
"U.S. Appl. No. 13/969,384, Final Office Action dated Jan. 3, 2020", 39 pgs.
"U.S. Appl. No. 13/969,384, Final Office Action dated Jul. 5, 2017", 45 pgs.
"U.S. Appl. No. 13/969,384, Final Office Action dated Dec. 18, 2015", 39 pgs.
"U.S. Appl. No. 13/969,384, Final Office Action dated Dec. 19, 2018", 42 pgs.
"U.S. Appl. No. 13/969,384, Non Final Office Action dated Mar. 22, 2018", 36 pgs.
"U.S. Appl. No. 13/969,384, Non Final Office Action dated May 28, 2019", 43 pgs.
"U.S. Appl. No. 13/969,384, Non Final Office Action dated Jun. 2, 2015", 25 pgs.
"U.S. Appl. No. 13/969,384, Non Final Office Action dated Sep. 22, 2016", 45 pgs.
"U.S. Appl. No. 13/969,384, Response filed Mar. 22, 2017 to Non Final Office Aciton dated Sep. 22, 2016", 22 pgs.
"U.S. Appl. No. 13/969,384, Response filed Apr. 18, 2016 to Final Office Action dated Dec. 18, 2015", 21 pgs.
"U.S. Appl. No. 13/969,384, Response filed Aug. 22, 2018 to Non Final Office Action dated Mar. 22, 2018", 15 pgs.
"U.S. Appl. No. 13/969,384, Response filed Sep. 2, 2015 to Non Final Office Action dated Jun. 2, 2015", 23 pgs.
"U.S. Appl. No. 13/969,384, Response filed Nov. 26, 2019 to Non Final Office Action dated May 28, 2019", 19 pgs.
"U.S. Appl. No. 13/969,384, Response filed Dec. 5, 2017 to Final Office Action dated Jul. 5, 2017".
"U.S. Appl. No. 13/969,384, Response filed Mar. 19, 2019 to Final Office Action dated Dec. 19, 2018", 17 pgs.
"U.S. Appl. No. 13/971,349, Final Office Action dated Feb. 9, 2017", 32 pgs.
"U.S. Appl. No. 13/971,349, Non Final Office Action dated Jun. 23, 2017", 31 pgs.
"U.S. Appl. No. 13/971,349, Non Final Office Action dated Jun. 29, 2016", 24 pgs.
"U.S. Appl. No. 13/971,349, Response filed Jun. 9, 2017 to Final Office Action dated Feb. 9, 2017", 14 pgs.
"U.S. Appl. No. 13/971,349, Response Filed Nov. 29, 2016 to Non Final Office Action dated Jun. 29, 2016", 19 pgs.
"U.S. Appl. No. 17/745,869, Non Final Office Action dated Apr. 21, 2023", 15 pgs.
"U.S. Appl. No. 17/745,869, Non Final Office Action dated Sep. 7, 2023", 21 pgs.
"U.S. Appl. No. 17/745,869, Preliminary Amendment filed Jul. 22, 2022", 9 pgs.
"U.S. Appl. No. 17/745,869, Response filed Jul. 21, 2023 to Non Final Office Action dated Apr. 21, 2023", 14 pgs.
"Google Alerts", Archived at the Internet Archive Wayback Machine, [Online] Retrieved from the Internet: < URL: http://www.google.com/alerts>, (Jul. 2005), 1 pg.
"M.P.E.P. 1705 Examiner Docket, Time, and Activity Recordation", USPTO, [Online] Retrieved from the Internet on Sep. 4, 2015: <URL: http://www.uspto.gov/web/offices/pac/mpep/s1705.html>, archived by Internet Archive Wayback Machine <http://web.archive.org/web/20121106033401/http://www.uspto.gov/web/offices/pac/mpep/s1705.html>, (Nov. 6, 2012), 3 pgs.
"Now you can search for U.S. patents", Google Patents, (Dec. 13, 2006), 5 pgs.
"Patent Rank: A Network-Dominant Logic for Innovation", Submitted to Marketing Science, manuscript MKSC-Oct 10-0356, (Oct. 2010), 36 pgs.
"Schuts Technical Notes and Recommendations", Archived at the Internet Archive Wayback Machine, [Online] Retrieved from the Internet: <URL: https://web.archive.org/web/20111231075436/http://notes.jschutz.net/internet-search-technologies/list-of-google-patents>, (Retrieved on Jun. 1, 2012), 78 pgs.
Bitlaw, "37 CFR 1.53 Application Number, Filing Date, and Completion of Application", URL:<http://www.bitlaw.com/source/37cfr/1_53.html>, (Nov. 11, 2012), archived by Internet Archive Wayback Machine, URL:<https://web.archive.Org/web/20071111220937/http://www.bitlaw.com/source/37cfr/1_53.html>, (viewed Sep. 9, 2016), 7 pgs.
Brinn, Michael W, et al., "Investigation of forward citation count as a patent analysis method", Proceedings of the 2003 Systems and Information Engineering Design Symposium, (2003), 6 pgs.
Swami, L R, "Types of Patent Applications", [Online]. Retrieved from the Internet: <http://www.lrswami.com/page/types-of-patent-applications>, (Feb. 25, 2011), 7 pgs.
Terry, Jon, "Pawel Brodzinksi: Portfolio Management with Kanban", [Online] Retrieved from the Internet on Sep. 4, 2015: <URL: http://leankit.com/blog/2012/06/the-benefits-of-portfolio-management-with-kanban>, (Jun. 19, 2012), 6 pgs.
U.S. Appl. No. 13/971,349, filed Aug. 20, 2013, System and Method for Patent Portfolio Management.
U.S. Appl. No. 14/257,118, filed Apr. 21, 2014, System and Method for Management of a Patent Portfolio.
U.S. Appl. No. 17/069,464, filed Oct. 13, 2020, System and Method for Management of a Patent Portfolio.
U.S. Appl. No. 14/259,900 U.S. Pat. No. 9,767,190, filed Apr. 23, 2014, Patent Claim Scope Evaluator.
U.S. Appl. No. 15/691,642 U.S. Pat. No. 10,579,662, filed Aug. 30, 2017, Patent Claim Scope Evaluator.
U.S. Appl. No. 16/777,656 U.S. Pat. No. 11,354,344, filed Jan. 30, 2020, Patent Claim Scope Evaluator.
U.S. Appl. No. 17/745,869, filed May 17, 2022, Patent Claim Scope Evaluator.
U.S. Appl. No. 13/956,162, filed Jul. 31, 2013, Systems and Methods for Patent Portfolio Management and Generation of Analytics.
U.S. Appl. No. 17/373,493, filed Jul. 12, 2021, Systems and Methods for Patent Portfolio Management and Generation of Analytics.
U.S. Appl. No. 14/264,571, filed Apr. 29, 2014, Systems and Methods for Patent Portfolio Management and Generation of Analytics.
U.S. Appl. No. 14/267,122, filed May 1, 2014, Systems and Methods for Patent Portfolio Management and Generation of Analytics.
U.S. Appl. No. 14/267,398, filed May 1, 2014, Systems and Methods for Patent Portfolio Management and Generation of Analytics.
U.S. Appl. No. 14/267,416, filed May 1, 2014, Systems and Methods for Patent Portfolio Management and Generation of Analytics.
U.S. Appl. No. 14/269,284, filed May 5, 2014, Systems and Methods for Patent Portfolio Management and Generation of Analytics.
U.S. Appl. No. 14/272,665, filed May 8, 2014, Systems and Methods for Patent Portfolio Management and Generation of Analytics.
U.S. Appl. No. 14/272,674, filed May 8, 2014, Systems and Methods for Patent Portfolio Management and Generation of Analytics.

(56) References Cited

OTHER PUBLICATIONS

U.S. Appl. No. 17/343,393, filed Jun. 9, 2021, Systems and Methods for Patent Portfolio Management and Generation of Analytics.
U.S. Appl. No. 14/281,513 U.S. Pat. No. 11,461,862, filed May 19, 2014, Analytics Generation for Patent Portfolio Management.
U.S. Appl. No. 17/745,869, Response filed Dec. 7, 2023 to Non Final Office Action dated Sep. 7, 2023, 17 pgs.

* cited by examiner

FIG. 3

MY MATTERS — 302

PATENT WATCHES — 304
COMPANY WATCHES — 306

START AUG 1, 2011 — 308
END AUG 31, 2011 — 310
AMOUNT DUE FOR PERIOD $0.00 — 312

PORTFOLIO: SELECT — 314
SHOW DUE MATTERS ONLY — 316
ALL — 318
GO — 320

MATTERS

| PATENT/APP # COUNTRY | FILE # | TITLE | ▽ DUE DATE | ▽ AMOUNT DUE | FILING DATE ISSUE DATE | DETAIL |
|---|---|---|---|---|---|---|

— 322

300

THE MAIN PORTFOLIO

PORTFOLIO: MEDTRONIC                                                          DISPLAY RESULTS FOR: MEDTRONIC

| 7252 | 1559 | 4192 | APRIL 30, 2013 |
|---|---|---|---|
| TOTAL US APPLICATIONS FILED | TOTAL US APPLICATIONS PENDING | TOTAL US PATENTS GRANTED | MOST RECENT PUBLICATION |

PUBLICATIONS/PATENTS IN MY PORTFOLIO

REFINE & FILTER ▸

SHOWING 1 TO 20 OF 7252 RESULTS                                    « ‹ 1 2 3 4 5 6 7 8 9 10 › »

| PUB/PATENT# | SERIAL NO | TITLE | FILING DATE | PUBLICATION DATE▾ |
|---|---|---|---|---|
| 8,433,396 | 10/418,856 | METHODS AND APPARATUS FOR ATRIOVENTRICULAR SEARCH | APR 18, 2003 | APR 30, 2013 |
| 8,433,422 | 11/737,927 | IMPLANTABLE MEDICAL ELECTRICAL LOAD AND CONNECTOR ASSEMBLY | APR 20, 2007 | APR 30, 2013 |
| 8,430,852 | 12/415,311 | THERAPEUTIC SLEEVE FOR IMPLANTABLE MEDICAL DEVICE | MAR 31, 2009 | APR 30, 2013 |
| 8,430,927 | 12/364,246 | MULTIPLE ORIFICE IMPLANTABLE HEART VALVE AND METHODS OF IMPLANTATION | FEB 2, 2009 | APR 30, 2013 |

FIG. 5

THE MAIN PORTFOLIO-SLICE

PORTFOLIO: MEDTRONIC

| 7252 | 1559 | 4192 | DISPLAY RESULTS FOR: MEDTRONIC ▸ |
|---|---|---|---|
| TOTAL US APPLICATIONS FILED | TOTAL US APPLICATIONS PENDING | TOTAL US PATENTS GRANTED | |

| MEDTRONIC | ▸ |
|---|---|
| MEDTRONIC | |
| MEDTRONIC SPINE | |
| MEDTRONIC NAVIGATION | |
| ETHICON, INC. | |
| ADVANCED PIONEERS LLC | |

PUBLICATIONS/PATENTS IN MY PORTFOLIO

REFINE & FILTER ▸

SHOWING 1 TO 20 OF 7252 RESULTS

« ‹ ☐ 2 3 4 5 6 7 8 9 10 › »

| PUB/PATENT# | SERIAL NO | TITLE | FILING DATE | PUBLICATION DATE ▾ |
|---|---|---|---|---|
| 8,433,396 | 10/418,856 | METHODS AND APPARATUS FOR ATRIOVENTRICULAR SEARCH | APR 18, 2003 | APR 30, 2013 |
| 8,433,422 | 11/737,927 | IMPLANTABLE MEDICAL ELECTRICAL LOAD AND CONNECTOR ASSEMBLY | APR 20, 2007 | APR 30, 2013 |
| 8,430,852 | 12/415,311 | THERAPEUTIC SLEEVE FOR IMPLANTABLE MEDICAL DEVICE | MAR 31, 2009 | APR 30, 2013 |
| 8,430,927 | 12/364,246 | MULTIPLE ORIFICE IMPLANTABLE HEART VALVE AND METHODS OF IMPLANTATION | FEB 2, 2009 | APR 30, 2013 |

FIG. 6

MAIN PORTFOLIO SLICE DRILL DOWN

| PORTFOLIO: MEDTRONIC SPINE | | | DISPLAY RESULTS FOR: MEDTRONIC SIGNE ▼ |
|---|---|---|---|
| 53 | 0 | 29 | NOVEMBER 05, 2009 |
| TOTAL US APPLICATIONS FILED | TOTAL US APPLICATIONS PENDING | TOTAL US PATENTS GRANTED | MOST RECENT PUBLICATION |

PUBLICATIONS/PATENTS IN MY PORTFOLIO

REFINE & FILTER ▸

SHOWING 1 TO 20 OF 53 RESULTS                                    « ‹ ☐ 2 3 › »

| PUB/PATENT# | SERIAL NO | TITLE | FILING DATE | PUBLICATION DATE▼ |
|---|---|---|---|---|
| 2009/0275,954 | 12/112,658 | APPARATUS AND METHODS FOR INSERTING FACET SCREWS | APR 30, 2008 | NOV 5, 2009 |
| 2009/0275,992 | 12/112,650 | APPARATUS AND METHODS FOR INSERTING FACET SCREWS | APR 30, 2008 | NOV 5, 2009 |

FIG. 7

| UNPUBLISHED APPLICATIONS IN MY PORTFOLIO | | |
|---|---|---|
| 8,438,039 | 11/115,626 | USER CUSTOMIZBLE WORKFLOW PREFERENCES FOR REMOTE PATIENT MANAGEMENT |
| 8,435,185 | 11/380,842 | METHOD AND APPARATUS FOR DETECTING ARRHYTHMIAS IN A MEDICAL DEVICE |
| 8,437,837 | 11/536,946 | METHOD AND APPARATUS FOR INDUCED T-WAVE ALTERNANS ASSESSMENT |
| 8,437,861 | 12/433,858 | POSTURE STATE REDIFINITION BASED ON POSTURE DATA AND THERAPY ADJUSTMENTS |
| 8,437,864 | 12/626,984 | MEDICAL ELECTRICAL LEAD WITH EMBEDDED ELECTRODE SUB-ASSEMBLY |

FIG. 8

PUBLICATIONS/PATENTS IN MY PORTFOLIO

REFINE & FILTER ▾

ISSUE & PUBLICATION DATE: [FROM] [TO]

TYPE: ⦿ ALL ○ PATENTS ○ APPLICATIONS

PATENT STATUS: ⦿ ALL ○ IN FORCE ○ EXPIRED

APPLICATION STATUS: ⦿ ALL ○ ABANDONED ○ PUBLISHED ○ GRANTED

SORT BY: ○ FILING ⦿ PUBLICATION ○ PUBLICATION ○ NUMBER OF FORWARD ○ CLASS
DATE  DATE  NUMBER  CITES

TITLE: [ ]

INVENTOR: [ ]

SERIAL NO.: [ ]

PATENT/PUBLICATION NO.: [ ]

ABSTRACT CONTAINS: [ ]

TAG NAME: [ ]

[SEARCH] [RESET]

FIG. 9

PUBLICATIONS/PATENTS IN MY PORTFOLIO

REFINE & FILTER ▸

SHOWING 1 TO 20 OF 1547 RESULTS

DRILL DOWN BY TYPE-PUBLICATION

« ◂ ☐ 2 3 4 5 6 7 8 9 10 ▸ »

| PUB/PATENT# | SERIAL NO | TITLE | FILING DATE | PUBLICATION DATE▾ |
|---|---|---|---|---|
| 2013/0079,600 | 13/246,613 | BATTERY AND CAPACITOR ARRANGMENT FOR AN IMPLANTABLE MEDICAL DEVICE | SEP 27, 2011 | MAR 28, 2013 |
| 2013/0079,646 | 13/614,004 | PHYSIOLOGICAL PERTURBATIONS FOR MEASURING HEART FAILURE | SEP 13, 2012 | MAR 28, 2013 |
| 2013/0079,654 | 13/245,585 | EPISODE CLASSIFIER ALGORITHM | SEP 26, 2011 | MAR 28, 2013 |

FIG. 10

DRILL DOWN BY LAW FIRM-TAG

PUBLICATIONS/PATENTS IN MY PORTFOLIO

REFINE & FILTER▸

SHOWING 1 TO 20 OF 1547 RESULTS     « ‹ [1] 2 3 4 5 6 7 8 9 10 › »

| PUB/PATENT# | SERIAL NO | TITLE | REPRESENTATION |
|---|---|---|---|
| 8,438,039 | 11/115,628 | USER CUSTOMIZABLE WORKFLOW PREFERENCES FOR REVOTE PATIENT MANAGEMENT | LOW FYM X |
| 8,435,285 | 11/380,842 | METHOD AND APPARATUS FOR DETECTING ARRHYTHMIAS IN A MEDICAL DEVICE | LOW FYM X |
| 8,437,837 | 11/338,948 | METHOD AND APPARATUS FOR INDUCED T-WAVE ALTERNANS ASSESSMENT | LOW FYM X |
| 8,437,861 | 12/628,628 | POSTURE STATE REDEFINITION BASED ON POSTURE DATA AND THERAPY ADJUSTMENTS | LOW FYM X |
| 8,437,864 | 12/626,984 | MEDICAL ELECTRICAL LEAD WITH EMBEDDED ELECTRODE SUB-ASSEMBLY | LOW FYM X |
| 8,436,251 | 12/499,329 | MISSING CONNECTING ELECTRICAL COMPONENTS | LOW FYM X |
| 8,435,186 | 12/826,758 | QUANTIFYING AUTONOMIC TONE WITH THORACIC IMPEDANCE | LOW FYM X |
| 8,437,842 | 12/768,917 | METHOD AND APPARATUS FOR DETECTING AND DISCRIMINATING TACHYCARDIA | LOW FYM X |
| 8,437,851 | 12/912,449 | DIAGNOSIS AND THERAPY OF ????? AND FREQUENT PREMATURE CONTRACTIONS | LOW FYM X |
| 8,437,856 | 13/301,387 | MULTI-POLAR ELECTRICAL MEDICAL LEAD CONNECTOR SYSTEM | LOW FYM X |
| 8,437,862 | 13/74,143 | MAGNETIC FIELD DETECTION USING MAGNETIC HYDRODYNAMIC EFFECT | LOW FYM X |
| 8,437,840 | 13/245,652 | EPISODE CLASSIFIER ALGORYTHM | LOW FYM X |

DATA DE-IDENTIFIED

FIG. 11

THE MAIN PORTFOLIO DETAIL

PORTFOLIO: MEDTRONIC    DISPLAY RESULTS FOR: MEDTRONIC

| 7252 | 1559 | 4192 | APRIL 30, 2013 |
|---|---|---|---|
| TOTAL US APPLICATIONS FILED | TOTAL US APPLICATIONS PENDING | TOTAL US PATENTS GRANTED | MOST RECENT PUBLICATION |

PUBLICATIONS/PATENTS IN MY PORTFOLIO

REFINE & FILTER▼

SHOWING 1 TO 60 OF 112 RESULTS                                                        ◂◂ ☐ 2 3 4 5 6 ▸ ▸▸

| PUB/PATENT# | SERIAL NO | TITLE | FILING DATE | PUBLICATION DATE▼ |
|---|---|---|---|---|
| 2008/0228,263 | 12/70,380 | DELIVERY SYSTEMS AND METHODS OF IMPLANTATION FOR REPLACEMENT PROSTHETIC HEART VALVES | FEB 15, 2008 | SEP 18, 2008 |
| 2008/0213,349 | 12/46,346 | LIPOSOME COMPLEXES CONTAINING PHARMACEUTICAL AGENTS AND METHODS | MAR 11, 2008 | SEP 4, 2008 |
| 2008/0215,110 | 12/57,562 | METHOD AND APPARATUS FOR IDENTIFYING LEAD-RELATED CONDITIONS USING PREDICTION AND DETECTION CRITERIA | MAR 28, 2008 | SEP 4, 2008 |
| 2008/0215,118 | 11/999,722 | USER INTERFACE WITH TOOLBAR FOR PROGRAMMING ELECTRICAL STIMULATION THERAPY | DEC 6, 2007 | SEP 4, 2008 |
| 2008/0208,020 | 12/39,263 | IMPLANTABLE TISSUE PERFUSION SENSING SYSTEM AND METHOD | FEB 28, 2008 | AUG 28, 2008 |
| 2008/0208,166 | 11/680,194 | PRE-FORMED DELIVERY CATHETERS | FEB 28, 2007 | AUG 28, 2008 |

FIG. 12

DRILL DOWN TO PATENT LEVEL DETAIL

US PATENT APPLICATION NO: 2008/0208,020
IMPLANTABLE TISSUE PERFUSION SENSING SYSTEM AND METHOD

◁ BACK TO PORTFOLIO

[⬇ DOWNLOAD AS PDF]

| AUG 28, 2008 PUBLICATION DATE | FEB 28, 2008 FILING DATE | 12/39,263 SERIAL NO | PUBLISHED STATUS |

| PATENT ANALYTICS | PTO FILE (PAIR) |

IMPORTANCE

OVERALL  ○—○—○—○—○

FIG. 13

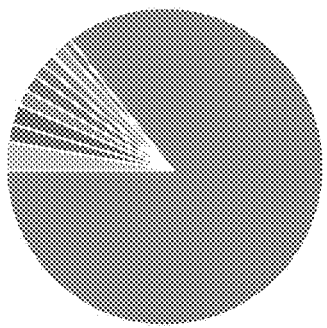
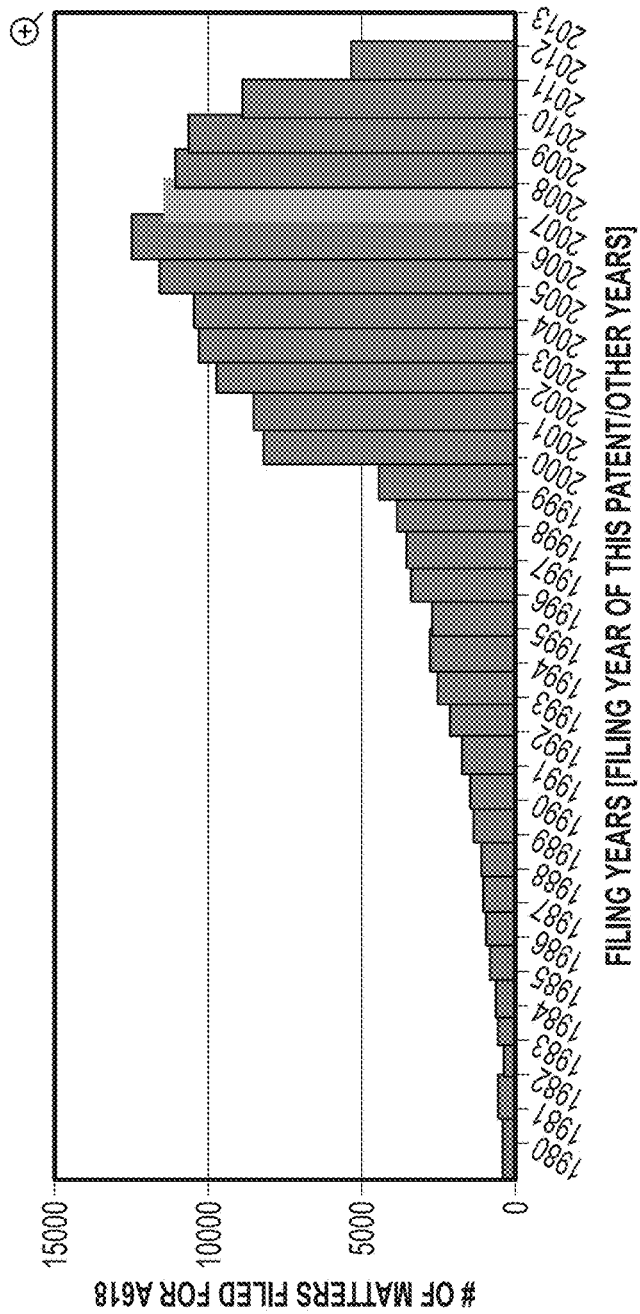
FIG. 17

| 12/39,263 | FEB 28, 2008 | UTILITY |
|---|---|---|
| APP NUMBER | FILING DATE | APP TYPER |

DRILL DOWN TO PAIR

RESPONSE TO NON-FINAL OFFICE ACTION ENTERED AND FORWARDED TO EXAMINER
STATUS

| SKBSKY, ANNA EXAMINER NAME | P0031790.00L/G10126 ATTORNEY DOCKET NUMBER |
|---|---|
| 1631 GROUP ART UNIT | 702/019000 CLASS/SUBCLASS |
| 7170 CONFIRMATION NUMBER | CINBIS, CAN FIRST NAMED INVENTOR |

TRANSACTION HISTORY

| DATE | TRANSACTION DESCRIPTION |
|---|---|
| 2012-02-18 | DATE FORWARDED TO EXAMINER |
| 2012-02-15 | RESPONSE AFTER NON-FINAL ACTION |
| 2011-11-15 | ELECTRONIC REVIEW |
| 2011-11-15 | EMAIL NOTIFICATION |
| 2011-11-15 | MAIL NON-FINAL REJECTION |

FIG. 18

DETAILS

| 17874 | TOTAL CITATION COUNT | 722 | EXPIRED COUNT | 796 | ABANDONED COUNT |

TECHNOLOGIES (MY PORTFOLIO)

| INTL CLASS | TECHNOLOGY | # OF PATENTS | % OF CLASS |
|---|---|---|---|
| A61N | ELECTROTHERAPY; MAGNOTOTHERAPY; RADIATION THERAPY; ULTRASOUND THERAPY<br>SUBCLASSES    TOP OWNERS | 3353 | 25.103 |
| A61B | DIAGNOSIS; SURGERY; IDENTIFICATION<br>SUBCLASSES    TOP OWNERS | 1600 | 3.003 |
| A61M | DEVICES FOR INTRODUCING MEDIA INTO, OR ONTO, THE BODY<br>SUBCLASSES    TOP OWNERS | 802 | 3.574 |
| A61F | FILTERS IMPLANTABLE INTO BLOOD VESSELS, PROSTHESES, DEVICES PROVIDING PATENTCY TO, OR PREVENTING COLLAPSING OF TUBULAR STRUCTURES OF THE BODY. EG., STENTS, CATHARTIC NURSING OR CONTRACEPTIVE DEVICES, FORMENTATION TREATMENT OR PROTECTION OF EYES EARS, BANDAGDES, DRESSINGS, OR ABSORBMENT PADS; FIRSTAID KITS.<br>SUBCLASSES    TOP OWNERS | 564 | 1.650 |
| A61K | PREPARATIONS FOR MEDICAL, DENTAL, OR TOILET PORPOSES<br>SUBCLASSES    TOP OWNERS | 251 | 0.355 |

FIG. 20

TECHNOLOGIES

MY PORTFOLIO (TOP OWNERS)

◂ BACK

| A61N | ELECTROTHERAPY; MAGNETOTHERAPY; RADIATION THERAPY; ULTRASOUND THERAPY | # OF PATINETS | RANK |
|---|---|---|---|
| ▆ | MEDTRONIC, INC. | 1955 | 1 |
| ▆ | CARDIAC PACEMAKERS, INC. | 1569 | 2 |
| ▃ | PACESETTER, INC | 1099 | 3 |
| ▂ | BOSTON SCIENTIFIC NEUROMODULATION CORPORATION | 321 | 4 |
| ▁ | ADVANCED NEUROMODULATION SYSTEMS, INC. | 189 | 5 |

FIG. 21

TOP PATENTS (BY CITATION)

| PATENT # | TITLE | FILING DATE | ISSUE DATE | INT'L CLASS | CITED # |
|---|---|---|---|---|---|
| 5,464,650 | INTRAVASCULAR STENT AND METHOD | APR 26, 93 | NOV 07, 95 | [B05D] | 709 |
| 5,190,546 | MEDICAL DEVICES INCORPORATING SIM ALLOY ELEMENTS | APR 09, 91 | MAR 02, 93 | [A61B] | 507 |
| 5,624,411 | INTRAVASCULAR STENT AND METHOD | JUN 07, 95 | APR 29, 97 | [A61M] | 480 |
| 5,262,823 | INTRAVASCULAR RADIALLY EXPANDABLE STENT | MAR 19, 92 | FEB 01, 94 | [A61M] | 464 |
| 5,331,966 | SUBCUTANEOUS MULTI-ELECTRODE SENSING SYSTEM, METHOD AND PACER | DEC 16, 93 | JUL 26, 94 | [A61B] | 462 |
| 5,807,395 | METHOD AND APPARATUS FOR RF ABLATION AND HYPERTHEMIA | APR 22, 97 | SEP 15, 98 | [A61B] | 438 |

FIG. 23

TOP INVENTORS IN PORTFOLIO

| INVENTOR NAME | ADDRESS | # OF PATIENTS |
|---|---|---|
| GERBER MARTIN T | MAPLE GROVE, MN | 157 |
| THOMPSON DAVID L | FRIDLEY, MN | 133 |
| GOETZ STEVEN M | BROOKLYN CENTER, MN | 121 |
| MIESED KEITH A | ST. PAUL, MN | 102 |
| HERUTH KENNETH T | EDNA, MN | 96 |

FIG. 24

MARTIN T GERBER
INVENTOR

FOLLOWING   ⓘ 2 STATUS UPDATES

| 80 TOTAL PATENTS ISSUED | 224 TOTAL PATENTS FILED | APR 26, 2012 MOST RECENT FILING | THIS IS OFFICIAL USPTO RECORD DATA |

DETAILS

- 80 ISSUED PATENTS
- 224 FILED PATENTS
- 2255 TOTAL CITATION COUNT
- APR 26, 2012 MOST RECENT FILING
- JUL 11, 1990 EARLIEST FILING

WORK HISTORY

| PATENT OWNER | APPLICATIONS FILED | YEAR |
|---|---|---|
| ROCHE DIAGNOSTICS OPERATIONS, INC. | 2 | 1993 |
|  | 1 | 2000 |
| ANALYTECON S.A. | 1 | 2006 |
| BOEHRINGER MANNHEIM GMGH | 1 | 1990 |
| THD S.P.A | 3 | 2003 |
| ROCHE DIAGNOSTICS CORPORATION | 2 | 1990 |
|  | 1 | 1994 |
| MEDTRONIC, INC. | 1 | 2000 |
|  | 4 | 2001 |
|  | 5 | 2002 |
|  | 11 | 2003 |
|  | 19 | 2004 |
|  | 28 | 2005 |
|  | 56 | 2006 |
|  | 37 | 2007 |
|  | 10 | 2008 |

FIG. 25

INVENTOR ADDRESSES

| ADDRESS | DURATION |
|---|---|
| CARMEL, IN | FEB 10, 92 - JUL 01, 02 |
| MAPLE GROVE, MN | SEP 26, 01 - DEC 08, 08 |
| MAPLE GROVE, MN, US | DEC 31, 08 - JUN 03, 13 |

TECHNOLOGY PROFILE

| TECHNOLOGY | # OFF PATENTS |
|---|---|
| A61B: DIAGNOSIS; SURGERY; IDENTIFICATION | 37 |
| A61F: FILTERS IMPLANTABLE INTO BLOOD VESSEIES; PROSTHESES; DEVICES PROVIDING PATENCY TO, OR PREVENTING COLLAPSING OF, TUBULAR STRUCTURES OF THE BODY, E.G. STENTS; ORTHOPAEDIC, NURSING OR CONTRACEPTIVE DEVICES; FORMENTATION; TREATMENT OR PROTECTION OF EYES OR EARS; BANDAGES, DRESSINGS OR ABSORBENT PADS; FIRST-AID KITS | 5 |
| A61K: PREPARATIONS FOR MEDICAL, DENTAL, OR TOILET PURPOSES | 6 |

SEE MORE...

PATENTS / PUBLICATION

| PATENTS / PUBLICATION # | YEAR OF PUBLICATION / ISSUED | TITLE | CITATIONS |
|---|---|---|---|
| 8,457,763 | 2013 | IMPLANTABLE MEDICAL ELECTRICAL STIMULATION LEAD FIXATION METHOD AND APPARATUS | 0 |
| 8,457,750 | 2013 | THERAPY CONTROL USING RELATIVE MOTION BETWEEN SENSORS | 0 |
| 8,447,413 | 2013 | CONFIGURATION STIMULATION THERAPY USING STIMULATION INTENSITY | 0 |
| 8,423,146 | 2013 | ELECTRICAL STIMULATION TO ALLEVIATE CHRONIC PELVIC PAIN | 0 |
| 8,417,346 | 2013 | ELECTRICAL STIMULATION OF ILIOHYPOGASTRIC NERVE TO ALLEVIATE CHRONIC PELVIC PAIN | 0 |

SEE MORE...

FIG. 26

| | |
|---|---|
| ■ PACESTTER, INC. (1108) | × |
| ■ CARDIAC PACEMAKERS, INC. (1025) | × |
| ■ BOSTON SCIENTIFIC SCIMED, INC. (590) | × |
| ■ EDWARDS LIFESCIENCES CORPORATION (306) | × |
| ■ CORDIS CORPORATION (255) | × |
| ■ ADVANCED CARDIOVASCULAR SYSTEMS, INC. (238) | × |

FIG. 28

- ■ CARDIAC PACEMAKERS, INC. (2056) ×
- ■ BOSTON SCIENTIFIC SCIMED, INC. (1717) ×
- ■ PACESETTER, INC. (1316) ×
- ■ ADVANCED CARDIOVACULAR SYSTEM, INC. (819) ×
- ■ COVIDIEN LP (473) ×

FIG. 30

285 MATTERS IN PROSECUTION WITH FIRST OFFICE ACTION RECEIVED

RESET FILTER ✕

SHOWING 1 TO 20 OF 285 RESULTS      « ‹ [1] 2 3 4 5 6 7 8 9 10 › »

| PUB/PATENT # | SERIAL NO. | TITLE | FILING DATE | PUBLICATION DATE ▼ |
|---|---|---|---|---|
| 2013/0079,654 | 13/245,585 | EPISODE CLASSIFIER ALGORITHM | SEP 26, 2011 | MAR 28, 2013 |
| 2013/0079,600 | 13/246,613 | BATTERY AND CAPACITOR ARRANGEMENT FOR AN IMPLANTABLE MEDICAL DEVICE | SEP 27, 2011 | MAR 28, 2013 |
| 2013/0072,926 | 13/585,477 | SYSTEMS AND METHODS FOR TRANSMURAL ABLATION | AUG 14, 2012 | MAR 21, 2013 |
| 2013/0060,303 | 13/665,675 | GENERATION OF PROPORTIONAL POSTURE INFORMATION OVER MULTIPLE TIME INTERVALS | OCT 31, 2012 | MAR 7, 2013 |
| 2013/0060,313 | 13/336,195 | SURGICAL LEAD PADDLE | DEC 23, 2011 | MAR 7, 2013 |
| 2013/0053,716 | 13/222,176 | SYSTEM AND METHOD FOR PROFILING A PATIENTS HEMODYNAMIC RESPONSE BASED ON HEART SOUND | AUG 31, 2011 | FEB 28, 2013 |

FIG. 33

66 MATTERS IN PROSECUTION WITH SIX AND MORE OFFICE ACTIONS RECEIVED

RESET FILTER ✕

SHOWING 1 TO 20 OF 66 RESULTS ≪ ◁ [1] 2 3 4 ▷ ≫

| PUB/PATENT # | SERIAL NO. | TITLE | FILING DATE | PUBLICATION DATE ▾ |
|---|---|---|---|---|
| 2009/0264,478 | 12/105,375 | SULFASALAZINE FORMULATIONS IN A BIODEGRADABLE POLYMER CARRIER | APR 18, 2008 | OCT 22, 2009 |
| 2008/0280,843 | 11/439,858 | METHODS AND KITS FOR LINKING POLYMORPHIC SEQUENCES TO EXPANDED REPEAT MUTATIONS | MAY 24, 2006 | NOV 13, 2008 |
| 2008/0269,863 | 11/739,787 | LEAD OR LEAD EXTENSION HAVING A CONDUCTIVE BODY AND CONDUCTIVE BODY CONTACT | APR 25, 2007 | OCT 30, 2008 |
| 2008/0228,234 | 11/687,465 | METHODS AND APPARATUS FOR IMPROVED IPG RATE RESPONSE USING SUBCUTANEOUS ELECTRODES DIRECTLY COUPLED TO AN IMPLANTABLE MEDICAL DEVICE (IMD) | MAR 16, 2007 | SEP 18, 2008 |

FIG. 34

220 MATTERS WITH FIRST OFFICE ACTION RESPONSE

RESET FILTER ✕

SHOWING 1 TO 20 OF 220 RESULTS

« ‹ ☐ 2 3 4 5 6 7 8 9 10 › »

| PUB/PATENT # | SERIAL NO. | TITLE | FILING DATE | PUBLICATION DATE ▼ |
|---|---|---|---|---|
| 2013/0053,911 | 13/221,617 | SHORT CIRCUIT FAULT-TOLERANCE IN AN IMPLANTABLE MEDICAL DEVICE | AUG 30, 2011 | FEB 28, 2013 |
| 2013/0053,921 | 13/219,279 | HOLDING MEMBERS FOR IMPLANTABLE CARDIAC STIMULATIONS DEVICE | AUG 26, 2011 | FEB 28, 2013 |
| 2013/0053,716 | 13/222,176 | SYSTEM AND METHOD FOR PROFILING A PATIENTS HEMODYNAMIC RESPONSE BASED ON HEART SOUNDS | AUG 31, 2011 | FEB 28, 2013 |

FIG. 36

25 MATTERS WERE ALLOWED AFTER FIRST OFFICE ACTION RESPONSE (LAST 12 MONTHS)

RESET FILTER ✕

SHOWING 1 TO 20 OF 25 RESULTS

« ‹ ☐ 2 › »

| PUB/PATENT # | SERIAL NO. | TITLE | FILING DATE | PUBLICATION DATE ▽ |
|---|---|---|---|---|
| 8,449,449 | 12/330,033 | METHODS AND APPARATUS PROVIDING SUCTION-ASSISTED TISSUE ENGAGEMENT THROUGH A MINIMALLY INVASIVE INCISION | DEC 8, 2008 | MAY 28, 2013 |
| 8,442,646 | 12/781,181 | FORMING CONDUCTIVE COUPLINGS IN MEDICAL ELECTRICAL LEADS | MAY 17, 2010 | MAY 14, 2013 |
| 8,442,651 | 12/718,897 | MEDICAL DEVICE WITH SELF-HEALING MATERIAL | MAR 5, 2010 | MAY 14, 2013 |

FIG. 38

ADD OWNER TO COMPARE
◀GO BACK

SEARCH BY NAME OF OWNER:
[ETHICON          ⊗] [SEARCH]

SEARCH RESULTS FOR 'ETHICON'...

| PATENT OWNER NAME | ADDRESS | TOTAL PATENT# | SELECT OWNER |
|---|---|---|---|
| ETHICON ENDO-SURGERY,INC. | CINCINNATI, OH | 1313 | IN COMPARISON LIST |
| ETHICON GMBH | NORDERSTEDT | 13 | COMPARE |
| ETHICON, INC. | SOMERVILLE, NJ | 1560 | COMPARE |
| ETHICON, LLC | GUAYNABO | 31 | COMPARE |

FIG. 45

COMPARE OWNERS

OWNERS TO COMPARE

COMPARE: [PATENTS ▶]

| OWNER | | # OF PATENTS* | PRIMARY |
|---|---|---|---|
| ▬▬▬ | MY PORTFOLIO | 4233 | PRIMARY ✕ |
| ▬ | ETHICON ENDO-SURGERY, INC. | 1290 | MAKE PRIMARY ✕ |
| ▬ | PACESETTER, INC. | 1591 | MAKE PRIMARY ✕ |
| ▪ | UNIVERSITY OF UTAH | 640 | MAKE PRIMARY ✕ |
| | | | ADD ANOTHER OWNER |

*IN-FORCE ONLY

FIG. 46

PTO FILE (PAIR) UPDATES     VIEW PATENTS/APPLICATIONS BEING FOLLOWED

[MY PORTFOLIO] ALL

| US PATENT NO | PATENT TITLE | PATENT OWNER |
|---|---|---|
| 8461681 | LAYERED STRUCTURE FOR CORROSION RESISTANT INTERCONNECT CONTACTS | MEDTRONIC, INC. |
| 8463345 | DEVICE AND METHOD FOR MONITORING OF ABSOLUTE OXYGEN SATURATION AND TOTAL HEMOGLOBIN CONCENTRATION | MEDTRONIC, INC. |
| 8463346 | ABSOLUTE CALIBRATED TISSUE OXYGEN SATURATION AND TOTAL HEMOBLOBIN VOLUME FRACTION | MEDTRONIC, INC. |
| 8463382 | IMPLANTABLE LEAD FUNCTIONAL STATUS MONITOR AND METHOD | MEDTRONIC, INC. |
| 8463343 | OPTICAL SENSOR FOR MEDICAL DEVICE | MEDTRONIC, INC. |

SEE ALL...

FIG. 48

PATENTS/APPLICATIONS STATUS UPDATES     VIEW PATENTS/APPLICATIONS BEING FOLLOWED

MY PORTFOLIO | ALL

| US PATENT NO | PATENT TITLE | PATENT OWNER |
|---|---|---|
| 8467852 | METHOD AND APPARATUS FOR PERFORMING A NAVIGATED PROCEDURE | MEDTRONIC, INC. |
| *THIS PATENT CITED MY PORTFOLIO PATENT: 20010014820* | | |
| 8461744 | ROTATING TRANSDUCER MOUNT FOR ULTRASONIC SURGICAL INSTRUMENTS | ETHICON ENDO-SURGERY INC. |
| *THIS PATENT CITED MY PORTFOLIO PATENT: 20010039419* | | |

FIG. 49

INVENTORS STATUS UPDATES

[MY PORTFOLIO] ALL  VIEW INVENTORS BEING FOLLOWED

| US PATENT NO | PATENT TITLE | INVENTOR NAME |
|---|---|---|
| D683138 | ORAL CARE IMPLEMENT | LEE DAVID; ZUCK BRENDA; |
| D683320 | ELECTRICAL CONTROLLER | STROTHER ROBERT B; SAKAI JONATHAN L; BOGGS, II JOSEPH W; STAGER KATHRYN W; BENNETT MARIA E; |

FIG. 50

PATENT OWNERS STATUS UPDATES

VIEW PATENT OWNERS BEING FOLLOWED

[ALL]

| OWNER NAME | RECENT APPLICATION COUNT | RECENT PATENT COUNT |
|---|---|---|
| CARDIAC PACEMAKERS, INC. | 17 | 21 |
| ST. JUDE MEDICAL, ATRIAL FIBRILLATION DIVISION, INC. | 5 | 8 |
| UNIVERSITY OF UTAH | 4 | 0 |

FIG. 51

TECHNOLOGY CLASS STATUS UPDATES

[MY PORTFOLIO] ALL    VIEW TECHNOLOGY CLASSES BEING FOLLOWED

G06F: ELECTRIC DIGITAL DATA PROCESSING(+)
VIEW 1690 RESULT(S) FOR LAST 7 DAYS

H01L: SEMICONDUCTOR DEVICES; ELECTRIC SOLID STATE DEVICES NOT OTHERWISE PROVIDED FOR(+)
VIEW 738 RESULT(S) FOR LAST 7 DAYS

TECHNOLOGY SUBCLASS STATUS UPDATES

[MY PORTFOLIO] ALL    VIEW TECHNOLOGY SUBCLASSES BEING FOLLOWED

G06F 17/30: DIGITAL COMPUTING OR DATA PROCESSING EQIPMENT OR METHODS, SPECIALLY ADAPTED FOR SPECIFIC FUNCTIONS INFORMATION RETRIEVAL; DATABASE STRUCTURES THEREFOR
VIEW 192 RESULT(S) FOR LAST 7 DAYS

G06F 15/16: DIGITAL COMPUTERS IN GENERAL(+)
VIEW 146 RESULT(S) FOR LAST 7 DAYS

FIG. 52

CARDIAC PACEMAKERS, INC.
PATENT OWNER

[FOLLOWING] [COMPARE] ⓘ 45 STATUS UPDATES

| 2,462 | 2,433 | JUN 12, 2013 |
|---|---|---|
| TOTAL PATENTS ISSUED | TOTAL APPS PUBLISHED | MOST RECENT PUBLICATION |

DETAILS (2,462) ISSUED PATENTS          (59,781) TOTAL CITATION COUNT
(924) ISSUED IN LAST 3 YEARS    (MAY 31, 1979) EARLIEST FILING
(343) PUBLISHED IN LAST 3 YEARS (123) EXPIRED/ABANDONED/WITHDRAWN PATENTS

TECHNOLIGIES

[OWNER PORFOLIO]

| INTL CLASS | TECHNOLOGY | # OF PATENTS | RANK |
|---|---|---|---|
| A61N | ELECTROTHERAPY; MAGNETOTHERAPY; RADIATION THERAPY; ULTRASOUND THERAPY<br>SUBCLASSES   TOP OWNERS | 1569 | 2 |
| A61B | DIAGNOSIS; SURGERY; IDENTIFICATION<br>SUBCLASSES   TOP OWNERS | 487 | 12 |
| H01G | CAPACITORS; CAPACITORS, RECTIFIERS, DETECTORS, SWITCHING DEVICES, LIGHT-SENSITIVE OR TEMPERATURE- SENSITIVE DEVICES OF THE ELECTROLYTIC TYPE<br>SUBCLASSES   TOP OWNERS | 65 | 14 |

| UPDATE SUMMARY | PORTFOLIO(S) | PORTFOLIO ANALYTICS | SEARCH | COMPARISONS |
|---|---|---|---|---|
| PATENTS PATENT OWNERS | INVENTORS | TECHNOLOGIES | U.S. PATENT ATTORNEYS | PATENT FIRMS/DEPTS |

JOERG HOLENZ
INVENTOR

[ FOLLOW ]  [ EXPAND ANALYTICS ]

| 22 | 54 | AUG 21, 2013 |
|---|---|---|
| TOTAL PATENTS ISSUED | TOTAL PATENTS FILED | MOST RECENT FILING |

THIS IS OFFICIAL USPTO RECORD DATA

[AUG 21, 2013] MOST RECENT FILING
[DEC 24, 2003] EARLIEST FILING

DETAILS
[22] ISSUED PATENTS
[54] FILED PATENTS
[38] TOTAL CITATION COUNT

FIG. 56

RELATED PUBLICATIONS                                    US FAMILY ANALYTICS

| COUNTRY | KIND | PUBLICATION NO. | FILING DATE | TITLE |
|---------|------|-----------------|-------------|-------|
| US | A1 | US20060047127 | OCT 29, 2004 | SIGMA RECEPTOR INHIBITORS |
| US | A1 | US20070232585 | AUG 29, 2005 | SIGMA RECEPTOR INHIBITORS |
| US | A1 | US20110015183 | SEP 29, 2010 | SUBSTITUTED PYRAZOLE SIGMA RECEPTOR ANTAGONISTS |

ANALYTICS GENERATION FOR PATENT PORTFOLIO MANAGEMENT

CLAIMS OF PRIORITY

This application is a continuation application and claims the benefit of priority, under 35 U.S.C. Section 120, of U.S. patent application Ser. No. 14/281,513 filed May 19, 2014, which is a continuation-in-part application and claims the benefit of priority, under 35 U.S.C. Section 120, of U.S. patent application Ser. No. 13/956,162 filed Jul. 31, 2013 ("SYSTEMS AND METHODS FOR PATENT PORTFOLIO MANAGEMENT AND GENERATION OF ANALYTICS"), which claims the benefit of priority, under 35 U.S.C. Section 119(e), to U.S. Provisional patent application Ser. No. 61/691,182 filed Aug. 20, 2012 ("SYSTEM AND MANAGEMENT FOR PATENT PORTFOLIO MANAGEMENT"), and which claims the benefit of priority, under 35 U.S.C. Section 119(e), to U.S. Provisional patent application Ser. No. 61/814,073 filed Apr. 19, 2013 ("SYSTEM AND METHOD FOR MANAGEMENT OF A PATENT PORTFOLIO"), and which claims the benefit of priority, under 35 U.S.C. Section 119(e), to U.S. Provisional patent application Ser. No. 61/814,937 filed Apr. 23, 2013 ("PATENT CLAIM SCOPE EVALUATOR"), the contents of each of which are incorporated herein by reference in their entireties.

BACKGROUND

The management of a patent portfolio involves multiple stages. Initially, a decision is made as to what inventions are worth the investment of filing a patent application. Then, each filed patent application goes through prosecution with the patent office. Finally, for each patent that is allowed, maintenance fees must be paid at a variety of intervals to keep the patent in force.

BRIEF DESCRIPTION OF DRAWINGS

Some embodiments are illustrated by way of example and not limitation in the figures of the accompanying drawings in which:

FIG. 3 is a user interface, according to some example embodiments.

FIGS. 4-53 illustrate sample aspects of user interfaces of a patent portfolio management system, according to some example embodiments.

FIG. 55 illustrates a sample confirmation message confirming the creation of a new patent portfolio related to a patent owner, according to some example embodiments.

FIG. 56 illustrates sample aspects of a user interface for creating a new patent portfolio related to an inventor, according to some example embodiments.

DETAILED DESCRIPTION

Figure 1:
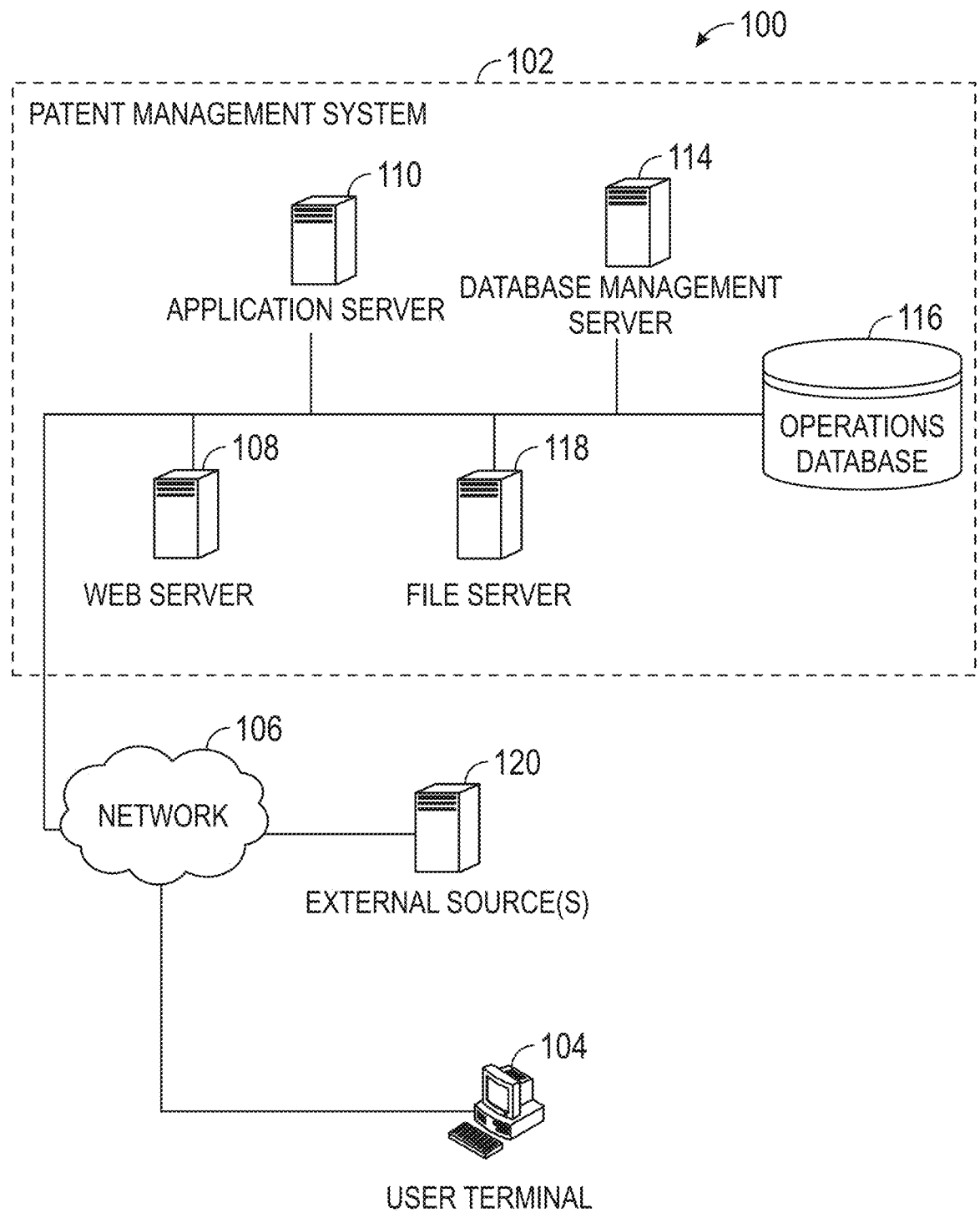
FIG. 1 is a system component diagram, according to some example embodiments.

The life cycle of a patent may include multiple stages. These stages generally include, but are not limited to, invention, filing a patent application on the invention, prosecuting the patenting application to allowance or abandonment, determining whether to file any continuing applications, and paying maintenance fees on the allowed patent.

At each stage, one or more parties may determine the best course of action to take with respect to the invention. For example, when determining whether or not to file a patent, the inventor may know which products in the technology area of the invention have been released to the public, a business manager may know how the invention may align with a company's goals, and a patent attorney may have researched existing patents or applications in the technology area(s) of the patent. One or more of these parties may ultimately make the decision whether it is worth the initial investment of filing a patent application on the invention and then, at each future stage, may determine the next course of action.

By performing analysis of a whole portfolio of patent-related data, such as issued patents, filed patent applications, unfiled patent applications, and invention disclosures (collectively referred to as an "innovation estate"), a full picture of a patent portfolio can be viewed and understood with greater clarity from both a quantitative and qualitative sense. To understand a patent portfolio, the published, unpublished, and unfiled patent applications (e.g., "disclosures") may be viewable in both combined and combined segregated modes. The combined segregated mode is a portfolio-viewing mode that may allow the viewing of all disclosures, applications, and patents; in some embodiments, the data for the disclosures, applications, and patents may be overlaid in relation to each other. Bibliographic evidence that may be used to describe statistical views of a portfolio may be described as quantitative analysis. Examples of bibliographic data include but are not limited to class codes/ estimated class codes, topical classifications (comprising key word, support vector, and hand-classified data sets), priority dates, statistical claim information, and other bibliographic data.

In various embodiments, a patent portfolio management system (hereinafter also "patent management system", "portfolio management system", or simply "system") may include tools to help the parties involved in the patenting process make decisions at each stage of a patent asset's life. These tools may also be used for general research by parties not immediately involved with the patenting of the invention. Additionally, these tools may be used as standalone tools, in combination with other tools, or in combination with other patent portfolio management systems. Examples of tools include, but are not limited to, prosecution analytics, reference management, prior art analytics, docketing management, claim mapping, claim analytics, portfolio analytics, internal (e.g., docketing system) and external database (e.g., PAIR) analytics, annuity management, market analysis, user interfaces (also known as "UIs"), competitive analysis, and strategic monitoring.

In some example embodiments, a user interface (e.g., a dashboard tool) may be used to display various metrics (e.g., prosecution metrics) for a particular matter in a patent portfolio, for "slices" (e.g., selectively segmented data) of the portfolio, or for an entire portfolio. The dashboard may show, for example, views of bibliographic data in a) time-ranked analytics, b) quantity-ranked analytics, or c) other ranked analytics (e.g., assignee, class code, topical, or claim axis in relation to the other quantitative information available). The dashboard may also allow slicing of the portfolio to determine groupings of the innovation estate that may include a) old technology innovation that may be ready to sunset, sell, or abandon, b) current innovation covering current and near future products and/or services, and ideation covering future plans and strategy of the company. This qualitative analysis may require further classification by human or statistical means to arrive at patent mappings that reflect the breadth of the patent claims (e.g., as defined by Claimbot® mapping techniques, or patent file history summarizations showing limitations accepted in prosecution.)

The complete view (or the sliced view) of a portfolio may be then contrasted and overlaid with a portfolio held by a competitor or held by the marketplace of the products covered by the portfolio. Because the dashboard may slice data from PAIR/Docket information of both competitor and the present portfolio, the dashboard may be used for more accurate research and development ("R&D") budget planning, litigation response strategy, competitive technology analysis, acquisition analysis, portfolio maintenance cost management, or licensing revenue evaluation, among other uses. By allowing the overlay of multiple layers and complexities of data, the dashboard may also allow visualization of the innovation estate performance, technological innovation monitoring, and technological forecasting. In addition, the dashboard may be used to determine where to leverage a company's decision-making process (e.g., where/when to invest) and to communicate (e.g., to a user of the dashboard) a need for effective defensive tactics.

In some example embodiments, a system comprises, for example, one or more modules. A first module is configured to combine data received from an official government source and from a docketing system. The data received may pertain to one or more assets of a patent portfolio. A second module is configured to generate a metric of the patent portfolio based on the combined data. The metric may measure a characteristic of the patent portfolio. A third module is configured to receive a request from a client device to display the metric. A fourth module is configured to, in response to the request to display the metric, display the metric in a user interface that includes one or more filtering elements that are selectable to request a filtering of the displayed metric.

In various example embodiments, one or more modules of the system are configured to receive a filtering request to filter the displayed metric, the filtering request including an identifier of a filtering criterion; identify one or more discoverable features of the metric based on applying the filtering criterion to the combined data; and display the one or more discoverable features of the metric in response to the filtering request.

FIG. 1 is a schematic view of computer network system 100 according to various example embodiments. The computer network system 100 includes patent management system 102 (hereinafter also "patent portfolio management system 102" or "portfolio management system 102") and user terminal 104 communicatively coupled via network 106. In some example embodiments, patent management system 102 includes web server 108, application server 110, and database management server 114, which may be used to manage at least operations database 116 and file server 118. Patent management system 102 may be implemented as a distributed system. For example, one or more elements of the patent management system 102 may be located across a wide-area network from other elements of patent management system 102. As another example, a server (e.g., web server 108, file server 118, or database management server 114) may represent a group of two or more servers cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth®) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web server 108 may communicate with file server 118 to publish or serve files stored on file server 118. Web server 108 may also communicate or interface with application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the tools of patent management system 102. Application server 110 may also provide some or the entire interface for web server 108 to communicate with one or more of the other servers in patent management system 102 (e.g., database management server 114).

Web server 108, either alone or in conjunction with one or more other computers in the patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript®, XML (Extensible Markup Language), XSLT (Extensible Stylesheet Language Transformations), AJAX (Asynchronous JavaScript® and XML), Java®, JFC (Java® Foundation Classes), and Swing (an Application Programming Interface for Java®).

User terminal 104 may be a personal computer or mobile device. In some example embodiments, user terminal 104 includes a client program to interface with patent management system 102. The client program may include commercial software, custom software, open source software, freeware, shareware, or other types of software packages. In some example embodiments, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that, when viewed as a compilation, represent an "operations database." Sub-databases in such a configuration may include a matter database, a portfolio database, a user database, a mapping database, and an analytics database. Operations database 116 may be implemented as a relational database, a centralized database, a distributed database, an object-oriented database, or a flat database, in various embodiments.

In various embodiments, the tools of the patent portfolio management system share a common framework. The framework may have a base organization unit of a matter. In various example embodiments, a matter is an issued patent or patent application that includes one or more patent claims. In some example embodiments, a matter is generally identified by its patent number or publication number. Identification may mean either identification as it relates to a user of the patent portfolio management system or within the patent portfolio management system. Thus, a user may see a matter listed as its patent number, while internally a database of the patent portfolio management system may identify it by a random number. One or more matters may be associated with prior art or cited references stored in a reference or prior art database.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio the matter is associated with. In other embodiments, one or more patent reference documents may be associated with a patent by creating multiple entries in the patent database, for example. The structure of the database and the formats and names of the data fields are for illustration purposes only, and other structures, names, and formats may be used. Additionally, further associations between data stored in the databases may be created as discussed further herein.

During operation of patent management system 102, data from multiple data sources (internal and/or external) is imported into or accessed by the operations database 116. Internal sources may include data from the various tools of the patent management system (e.g., an internal docketing system). External sources 120 may include websites or databases associated with foreign and domestic patent offices, assignment databases, WIPO, and INPADOC, among others. In various embodiments, if the data is unavailable through a database, the data is scraped and parsed from the websites. The data may be gathered using API calls to the sources when available. The data may be imported and stored in the operations database on a scheduled basis, such as weekly, monthly, quarterly, or some other regular or periodic interval. Alternatively, the data may be imported on-demand. In some example embodiments, the data may be received as raw HTML, as part of a data feed, or a spreadsheet.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats). In some example embodiments, subsets (e.g., portions) of the data received from external an internal sources are comingled to facilitate the functionality of one or more tools of the system.

Figure 2:
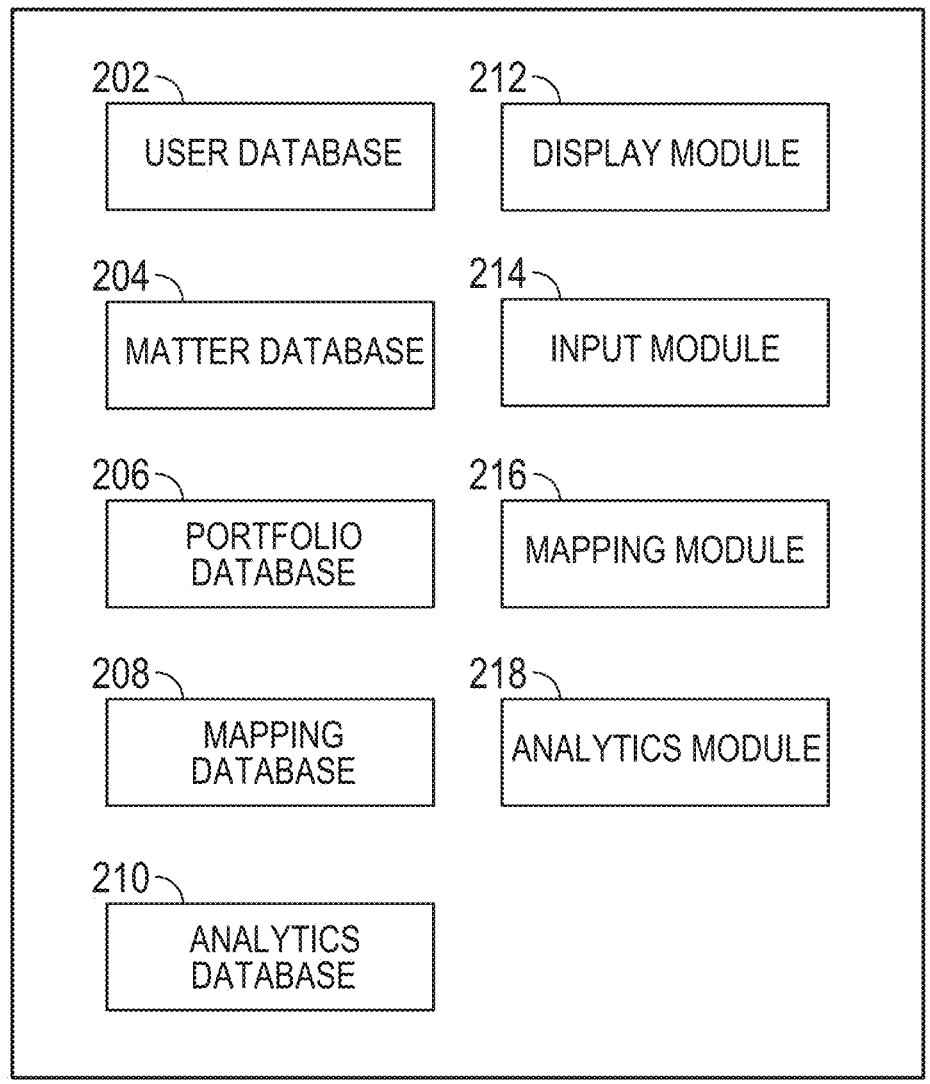
FIG. 2 is a block diagram of a patent portfolio management system, according to some example embodiments.

FIG. 2 is a block diagram of patent management system 102, according to some example embodiments. Illustrated are user database 202, matter database 204, portfolio database 206, mapping database 208, analytics database 210, display module 212, input module 214, mapping module 216, and analytics module 218. In various embodiments, the data stored in databases 202, 204, 206, 208, and 210 may be in the same or multiple physical locations. For example, portfolio database 206 may be stored in one or more computers associated with a portfolio management service. In various embodiments, patent management system 102 mirrors databases stored in other locations. In some example embodiments, when a request is made to access data stored in the databases, patent management system 102 determines where the data is located and directs the request to the appropriate location. Similarly, modules 212-218 may be executed across multiple computer systems.

In certain example embodiments, user database 202 stores data representing users of patent management system 102. The data may include data fields of user credentials, including user ID and password, and access rights with respect to patent management system 102. User IDs may be common across the tools of the patent management system. In this manner, access rights of a user with respect to the tools of the patent portfolio management system may follow across the various tools of the patent management system. In some example embodiments, different access rights are granted to a user ID between the various tools.

In various embodiments, each user ID has access rights to one or more matters. Similarly, a user ID may have portfolio level access rights. Access rights may be defined according to at least two parameters: read access and write access. Thus, when a user logs into patent management system 102, the user is presented with access only to the matters/portfolios that have been associated with the user ID. More (e.g., additional contact information) or fewer data fields associated with a user may be included in a user entry stored in user database 202. In some example embodiments, matter database 204 stores data representing matters. Each matter may be associated with one or more portfolios. In some embodiments, a matter is associated with no portfolios. In various embodiments, a matter is a foreign or domestic patent or patent application. A matters may also be an invention that has not yet been filed (e.g., as may be the case within a docketing system). In some example embodiments, a matter entry includes data fields representing a matter ID, patent number, publication number, serial number, docketing number, title (e.g., the name of the patent or patent application), type of the matter (e.g., patent application, issued patent, PCT patent application), status of the matter (e.g., issued, abandoned, allowed), a link to the patent office where the matter was filed, a link to a PDF download of the matter, abstract of the matter, one or more claims of the matter, one or more drawings of the matter, inventor(s) of the matter, current owner(s) of the matter, cited references on the face of the matter, filed date, issue date, docket number, various prosecution metrics (e.g., number of office actions received, number of examiner interviews held, or number of Requests for Continued Examination (also known as "RCE(s)") filed), and annuity information (e.g., due date, country, and amount due). In some embodiments, other patent reference documents or prior art in any form may be stored and associated with one or more matters. More or fewer data fields associated with a patent may be included in a matter entry stored in matter database 204. In an example embodiment, matter database 204 may store a patent matter database, wherein this database includes data about the patent matters. The data may include, for at least one patent matter, a claim set or statement of invention and a priority date for the claim set or statement of invention. Matter database 204 may also store a database of prior art documents (also known as "references"), wherein the prior art database includes data about the prior art documents. The data may include, for at least one prior art document, a priority date or publication date of the document. One or more of the prior art documents may be associated with a first patent matter in the patent matter database.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited, and associated with related family matters, for example.

Portfolio database 206, in an example embodiment, stores data representing portfolios of one or more matters. Data stored in portfolio database 206 may have been previously generated by a tool of patent management system 102. In various embodiments, a portfolio may be generated by a user using patent management 102. For example, a user interface (e.g., a dashboard) may be presented to the user requesting a name for the portfolio and identifiers of matters to be included in the portfolio. In an embodiment, a portfolio entry in portfolio database 206 includes data fields of portfolio ID and a portfolio name. Additionally, a data field for a matter ID may also be included in an entry in the portfolio database. Thus, each portfolio may be associated with one or more matters through the use of the matter ID data field. More or fewer data fields associated with a portfolio may be included in a portfolio entry of portfolio database 206.

In an example embodiment, mapping database 208 includes mappings of scope concepts, technology categories, and keywords to one or more matters. In an embodiment, a scope concept is a textual description of at least one concept, to which a patent claim is limited. Thus, if a claim comprises concepts A, B, and C, a scope concept may be A. In various embodiments, a scope concept for the claim may be broader than A because the claim will still be limited to the broader scope concept. In an embodiment, the mapping database stores mappings between claims and scope concepts. A technology category mapping may indicate that a claim is in a certain technology area. A keyword mapping may indicate that there is an exact match between the keyword and a subset (e.g., a word) of the claim language.

In various embodiments, analytics database 210 stores data representing analytics calculated based on data stored within patent management system 102 or external data sources. In various embodiments, analytics are organized according to an individual matter, portfolio, family, company, or product. The calculated analytics may be based on information gathered from multiple sources such as databases of patent management system 102 (e.g., a database related to the internal docketing system) and PAIR.

In various embodiments, information for an individual matter may include status (e.g., disclosure received, drafting, filed, completed-waiting examination, in prosecution, allowed, or issued), cited prior art, list and type of rejections (e.g., 35 U.S.C. § 101, § 102, or § 103), number of claims allowed, office action count, interviews held, IDS statements filed, attorney fees to date, and PTO fees to date. Further metrics for an individual matter stored in analytics database 210 may include time metrics and/or efficiency metrics such as time from disclosure to assignment, time from assignment to filing, total time from disclosure to filing, total time from disclosure to issue, time between the receipt of an office action and the filing of a response to the office action, time waiting for examiner (e.g., a decision of the examiner), total time in examination, time waiting for PTO while in examination, and time on appeal. Additional prosecution details for a matter may include upcoming docket dates (e.g., due dates for office action, IDS due dates, etc.). A claim prosecution history chart may also be stored in analytics database 210 for each matter. The prosecution history may include a history of claim amendments and arguments made in prosecution.

In various embodiments, portfolio and family analytics information may be stored in analytics database 210 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between current metrics and, for example, metrics calculated a year ago (or other time period).

Aggregated metrics may be generated for a number (e.g., some or all) of the patents and applications in a portfolio based on a number of variety of criteria, such as pending or awaiting examination, in prosecution with no claims allowed, in prosecution with some claims allowed, appealed, notice of allowance received, or issued. These metrics may be compiled for both US and international matters in the portfolio. Additional information may include the international portfolio distribution by country. An age distribution of the portfolio may also be compiled. For example, the portfolio may be broken down by less than one-year-old, 1 to 3 years old, 3 to 5 years old, 5 to 10 years old, 10 to 20 years old, and 20 or more years old. Recent filing and issue activity as well as upcoming Ford filing deadlines may be stored in analytics database 210.

In various embodiments, prosecution metrics across a portfolio, a portfolio segment (also known as "slice"), or family are determined and stored in analytics database 210. This data may include matters waiting for examination, matters in examination, matters under appeal, and matters that are allowed but that have not yet issued. Analytics based on office actions may also be compiled and stored. For example, the cases that received a notice of allowance after a first office action response, a second response, etc., may be stored in analytics database 210. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of matters in prosecution with a particular number of office action received, matters in prosecution with a particular number of RCE(s) filed, matters in prosecution with an examiner interview held after a particular office action, recently allowed cases, recently appealed cases, stalled cases (e.g., applications that received six or more office actions), and recently abandoned cases may also be stored for each portfolio, portfolio slice, or family in analytics database 210.

In various embodiments, the results of keyword analysis on one or more matters and/or prior art references may be stored in analytics database 210. The keyword analysis may be based on the occurrences of the keywords in the matter or references to derive a score or keyword overlap.

In various embodiments, data stored in the database for a group of matters in a portfolio, portfolio slice, or family is analyzed to determine the top (e.g., ten) most cited patents, the top inventors (e.g., the inventors with the largest number of matters in a portfolio, portfolio slice, or family), the top most cited inventors, top most cited prior art owners (e.g., according to assignment documents on the face of the patent), newly (e.g., within the last 60 days) cited prior art owners, and top most cited prior art inventors. This information may be stored in analytics database 210.

In an embodiment, display module 212 is configured to display user interfaces and information retrieved from one or more databases 202-210. If a user is accessing patent management system 102 remotely (e.g., through a web browser or an application of a mobile device) display module 212 may be configured to transmit data representing a user-interface through a network to a user terminal. In various embodiments, display module 212 is configured to generate one or more charts of data stored in databases 202-210. For example, display module 212 may generate a pie chart of the top 10 inventors within a portfolio or a pie chart of the distribution of patents or patent applications in a class of technology based on assignee names.

In various embodiments, input module 214 receives data from multiple sources where it may be further processed by one or more other modules and stored in one or more of databases 202-210. For example, input module 214 may be configured to utilize one or more APIs to access or receive data from one or more patent data stores (e.g., public PAIR, private PAIR, INPADOC, foreign patent offices, patent docketing systems, portfolio management systems, etc.) The data may include published patent documents, patent applications, office actions or other patent office correspondence, prior art references, claim mappings, dockets dates, and annuity payment data.

In various embodiments, input module 214 is configured to receive input from one or more user interface elements. For example patent management system 102 may present multiple user interfaces to a user. These user interfaces may enable users to input data directly into databases 202-210, instruct the patent management system 102 to retrieve data from patent data stores, and instruct the patent management system to perform various operations on the data (e.g., generation, analysis, or presentation of metrics) in databases 202-210.

Additionally, input module 214 may be configured to determine the selection of one or more user interface elements by a user and initiate the action associated with (e.g., corresponding to) the selected user interface element. For example, a user interface element may include a drop-down menu to select a portfolio. Input module 214 may be configured to receive the selection of the portfolio by the user. Then, input module 214 may pass the selection to one or more other modules for further processing. For example, display module 214 may update the drop-down menu or another area of the user interface to indicate the selection of the portfolio or display some or all of the data pertaining to the selected portfolio.

In various embodiments, input module 214 processes the data that has been inputted and formats the inputted data according to the data fields of databases 202-210, as discussed above. In various example embodiments, processing is completed using a parsing module (not shown). For example, consider a patent publication that a user has directed to be inputted into one or more of the databases. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). In some example embodiments, a user of patent management system 102 may then examine the flagged data and manually enter the information which is then stored in the appropriate database.

The resulting data that has been parsed by the parsing module may then be entered as an entry in one or more of databases 202-210. This may be accomplished by, for example, formulating an insert SQL query with the parsed information. In various embodiments, the parsing module may parse multiple piece of information before generating a database entry. For example, input module 214 may receive a docket number for an issued patent. The docket number may be combined with the information parsed from the issued patent to form an entry in matter database 204.

In various embodiments, mapping module 216 is configured to facilitate mappings of scope concept, technology categories, and keywords to patent claims of a matter. In an embodiment, mapping signifies association. For example, in conjunction with display module 212 and input module 214, mapping module 216 may present a user interface of patent claims stored in matter database 204 and scope concepts stored in mapping database 208. Input module 214 may receive a selection of one or more patent claims and one or more scope concepts and pass them to mapping module 216. Mapping module 216 may then formulate an SQL query to associate the one or more patents claims with the one or more scope concepts. When executed, the SQL query, may update the mapping database 208 with the associations. In various embodiments, mapping module 216 also allows the creation of new scope concepts, technology categories, and keywords that may be mapped to one or more patent claims. Furthermore, mapping module may present user interfaces that allow a user to rank and rate matters stored in matter database 204.

Mapping module 216 may also allow the generation of claim charts of a plurality of cells. A claim chart may include one or more scope concepts, technology categories, and keywords on one axis and claims of matters in a portfolio on the other axis. The claim chart may include a variety of levels of granularity of scope concepts. Some claims may be mapped to all of the scope concepts while others may not be mapped to any scope concepts. At the cell intersection between a scope concept (or technology category or keyword) and a claim, an indication of the mapping may be presented by changing the format of the cell. For example, the cell may be colored blue when a scope concept is mapped and red when not mapped.

In various embodiments, analytics module 218 is configured to examine and run calculations on the data stored in the databases 202-210 to generate the analytics discussed previously. For example, analytics module 218 may formulate an SQL query that retrieves the number of times that a prior art reference has been cited within a portfolio. This query may be run for each prior art cited within the portfolio to determine a list of the most cited (e.g., the top ten) prior art references with a portfolio. In some example embodiments, the queries are formulated and run as requested by a user. In certain example embodiments, the analytics are generated in response to a certain triggering event (e.g., based on one or more alerts). In an embodiment, once the analytics information has been determined, it is stored within analytics database 210. In various embodiments, queries are formulated and run on a periodic basis (e.g., nightly) and entries in analytics database 210 may be updated to reflect any changes.

In various embodiments, the analytics module 218 is configured to receive input identifying a pool of keywords for a first patent matter in matter database 206 and associated prior art documents in matter database 206. The term keyword is intended to include individual keywords as well as a number of keywords grouped together making up a key phrase, for example. The module 218 may be further configured to perform a keyword analysis on the first patent matter and associated prior art documents based on occurrences of the keywords in the first patent matter and associated prior art documents. The module 218 may be further configured to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

In various embodiments, a filtering module is configured to filter a set of matters according to a user preference. For example, a user may activate a check box that indicates only pending matters should be shown in a user interface. The filtering module may formulate a query consistent with retrieving only pending matters. The results of the query may then be shared with display module 212 where the user interface may be updated. Examples of other filtering criteria that may be used with the portfolio management system are described below.

In various embodiments, a payment module is configured to receive selections by the user of which annuities to pay for matters in a portfolio. Additionally, the payment module may receive user preferences related to the payment of the annuities. The payment module may receive payment information from a user and forward the payment information to the appropriate agency/office. In some embodiments, annuity management system 102 organizes payment of the annuity on behalf of the user and the user pays annuity management system 102.

FIG. 3 is an example user interface 300 of patent management system 102, which may be used to facilitate the methods, tools and systems described herein. User interface 300 is illustrated with multiple user interface elements. In some example embodiments, a user interface element is a graphical or textual element that a user may interact with to cause an application to perform an assigned action for the interface element. Data representing user interface 300 may be transmitted via network 106 and presented on a display of user terminal 104, for example, through the use of a web browser. A user (e.g., manager of a patent portfolio) may interact with the user interface elements of user interface 300 by using an input device (e.g., stylus, cursor, mouse, finger, or voice) of the user terminal. In certain example embodiments, a user selection is based on the coordinates of the input device as it makes contact with the display, or the location of a user's mouse "clicks". The coordinates are compared to the coordinates of the user input element to determine the selection. The type of user elements, names, and layout depicted in FIG. 3 are intended to be an illustration of an example user interface of patent management system 102. Other types of user elements, names, and layouts may be used, as shown in the example illustrations below.

The user interface elements may include my matters 302, patent watches 304, and company watches 306. These elements may be used to select a context/view of the patent management system. For example, my matters lists the patents included within a portfolio of a user, patent watches lists information on patents that the user has indicated the patent management system is to watch, and company watches lists information on companies that the user has indicated the system should watch. Further details of each of these are included herein.

Date boxes 308 and 310 are user elements that allow a user to select a time period. Amount due box 312 displays the amount due with respect to annuities for patents in the portfolio of the user within the period indicated by date boxes 308 and 310. Upon activating (e.g., clicking) one of the date boxes, a user may be presented with a calendar which allows the selection of a date. Upon selecting a date, the date boxes will update to reflect the user's choice.

Drop-down menu 314 includes a list of portfolios that a user of the patent management system is authorized to view. For example, before user interface 300 is displayed, a login screen that requests a user ID and password may be presented to the user. In various embodiments, the user ID is associated with one or more portfolios. In turn, each portfolio is associated with one or more matters. Matters may include US and foreign issued patents, pending patents, abandoned patents, and not yet filed applications. Thus, upon selection of a portfolio using drop-down menu 314, user interface 300 is populated with matters associated with the portfolio.

Checkbox 316 is an option to display only matters that currently have an annuity due. Drop-down menu 318 allows further filtering of matters. For example, the matters may be filtered by US patents only, US patent applications, or foreign patent/patent applications only.

In various embodiments, activation of button 320 updates user interface 300 to reflect the choices made by the user with respect to date boxes 308 and 310, checkbox 316, and drop-down menu 318. For example, amount due box 312 will be updated to reflect the amount due within the new period and the matters listed under column headings 322 may be filtered. In various embodiments, user interface 300 is updated as the user selections are made with respect to elements 308 to 318 without activating button 320.

Various tools may be implemented using the system described above. In various example embodiments, a tool for dynamic management of a patent portfolio may be used with patent management system 102. Example users of the tool for dynamic portfolio management are a law firm, a client of a law firm, or a company's legal department. The portfolio management tool allows a user (e.g., a portfolio manager) to manage a portfolio (e.g., by generating and presenting analytics) by law firm, by portfolio, or by portfolio slice. The tool may allow a user to identify stuck or stale applications, determine competitor interest based on citation analysis (inbound and outbound), dynamically review other owners' portfolios, and set up watches and updates.

In various example embodiments, the portfolio management tool generates portfolio analytics based on input data received from at least one government source (e.g., PAIR data) and at least one internal system (e.g., data from a docketing system). In some instances, additional data may be used to supplement the PAIR data and the docketing data. A template load may be performed on a periodic basis (e.g., weekly, monthly, quarterly, annually, etc.) based on a client's needs for dynamic information. For example, the tool may automatically load a template spreadsheet of input data at a predetermined time. The received data may be combined and used in generating portfolio analytics for a matter, portfolio, portfolio slice, or family.

Prosecution Analytics

Various prosecution analytics tools may be implemented using the system described above. Some of the tools are described below. In various example embodiments, a software tool to collect and present prosecution analytics may be used with patent management system 102. For example, a dashboard may be used to display various metrics (e.g., prosecution metrics) for a particular matter in a patent portfolio, for slices of the portfolio, or for an entire portfolio. For each matter, the dashboard may include docket dates as well as patent analytics.

In various example embodiments, analytics may include success rate(s) of responses based on the following:
  a. Probability a response will result in allowance or other event;
    i. Responses of different types, e.g. non-final, final, after-final;
    ii. Based on class/subclass;
    iii. Based on examiner;
    iv. Based on art unit;
    v. Based on number of prior responses;
    vi. Based on how long the case has been in active prosecution;
  b. Analytics—Based on USPTO statistics or Attorney data or Attorney Organization data;
    i. Probabilities of each case—USPTO vs. Attorney vs. Attorney Org;
    ii. Compare both cases;
  c. Analytics—Based on Owner of Patent/Invention;
  d. Analytics—Based on type of owner—e.g., small or large entity;
  e. Analytics—Based on Prior Art Owners;
  f. Analytics—Based on length of claim;
  g. Analytics—Based on number of words added to claim;
  h. Analytics—Based on length of arguments;
  i. Analytics—Based on type of rejection;
  j. Analytics—Based on effective date of prior art; and
  k. Analytics—Based on keyword/key phrase overlap between prior art and application specifications In some example embodiments, additional analytics are displayed to a user based on analytics in a PAIR-like system (sometimes referred to as PAIR Plus): statistics for examiner or supervisor; statistics for art unit; statistics for class/subclass; or analytics on the prior art.

In various example embodiments, prosecution analytics are generated from PAIR and combined with information in an existing file management (e.g., docketing) system. The analytics may be combined to generate portfolio prosecution metrics. Success rates may be checked based on results (e.g., correlate to attorneys and examiners).

In various example embodiments, a tool may be used to scrape PAIR references into prior art in matters. In some example embodiments, it may automatically cross-cite.

In some example embodiments, a tool may be used to: 1. Read PAIR; 2. See what new references add to prior art; 3. Examine the office action to find the grounds for rejection near the reference from the list.

In various example embodiments, a tool may present a claim chart matrix in which there is one column per PTO action; top of column each applied reference is listed in rows and denoted, for example, A, B, and C; each row below is claim and code for rejection type and reference.

In some example embodiments, a prosecution analytics software tool may scrape data from an office action into a portfolio. The patent claims may be entered in the "matters" list, and references may be entered in the "references" list. In some example embodiments, the art may be auto analyzed. In one example embodiment, a wizard may be provided to analyze the art. The tool may put links to pertinent law/rules. Analytics may be generated for each reference and show era of references. In some example embodiments, the software tool may send a link to the portfolio to an attorney.

In various example embodiments, a tool may, for any given patent, show a forward citation timeline, where the tool may include:
  i. a timeline with a bar for each year the patent is forward cited (based on filing date of the forward cited patent);
  ii. each bar has a segment for each patent for that year (e.g., two segments for two forward cites in a year); and
  iii. each segment is "heat map" color coded based on—
    1) if citation was "applied" and
    2) keyword overlap in technical field, abstract, claims.

In some example embodiments, the tool may show a forward citation, where the tool may place all forward cites along the x-axis and expand the graph downwardly for forward cites of the forward cites. In some example embodiments, this creates a two dimensional chart. In certain example embodiments, the forward cites of forward cites could be added in the same way as the forward cites to show growth in activity in an area.

Reference Management

In various example embodiments, tools for prior art management are used in patent management system 102. In an example embodiment, in a matter management system (e.g., patent management system 102), there is a cross-citation control panel for citing prior art between cases. In various example embodiments, the control panel:
  i. shows all cases to "send" art to, "receive" art from, or both;
  ii. allows a user to set rules for sending or receiving based on:
    a. Number of times art has hopped already from one matter to another as a cited reference to get to the end matter;
    b. Type of citation—(e.g., 102(*b*), 103(*a*), etc.);
  iii. Cases to send to or receive from can be automatically populated by family matters or other matters.

For each reference, the tool may also display a citations pathway that shows:
  a. Where the reference started;
  b. What the reference flowed through;

In various example embodiments, a prior art management portfolio may be created that has the following features:
  a. Loading Matters (pending or issued patent applications) into special "prior art management" portfolios;
  b. Art automatically flows between Matters in a portfolio;

c. Art flows between portfolios via Matters listed in more than one portfolio;
d. Art is kept as a list in a Portfolio;
e. arbitrary cases can be added; the cases are not required to be in the same patent family or related cases;
f. Art displayed in each Matter can be filtered by:
  i. Cross-cited art (art arriving from other Matters);
    1. Number of hops to get to list;
    2. Type of rejection (e.g., 102(*b*), 103(*a*), etc.);
    3. Other analytics—(see e.g., prior art analytics);
    4. New art added to Portfolio;
g. Art can be added to Portfolio, in the Prior Art (called "references") list;
  i. This art is not cross-cited to other Matters in other portfolios until it is first added to a Matter to be cited or as cited;
  ii. This art is displayed for each Matter to be considered, as "new art" not yet cross-cited In various example embodiments, PAIR Plus may include:
a. Pair data;
b. Uncited art cross-reference;
c. Links to cases beyond PAIR;
d. Scanned documents;
e. Art analysis;
f. Art highlights;
g. Analytics with Actions;
h. Foreign cases;
i. Docket Dates for Matter—calculated by PAIR PLUS;
j. PAIR Process Options—process options for any given point in a case
k. Foreign PAIR;
l. Aggregate of U.S. and foreign PAIR In various example embodiments, PAIR Plus may also automatically proof claims, scan amendments, assemble most recent claims, compare to issued patent, scan prior art, make a list of prior art, and compare it to the issued patent. Differences may be determined between the filed specification and issued specification. The differences may be presented to a user for review.

Prior Art Analytics

In various example embodiments, a tool for analytics of prior Art includes:
a. Automatic keyword/key phrase differentiation;
  i. Create pool of keyword/key phrases for prior art and for pending application;
  ii. Note differences in keywords/key phrases;
b. Automatic prior art ranking based on keyword/key phrase overlap;
  i. Art with most keyword/key phrase overlap is highest ranked;
  ii. Allow manual addition of synonyms to enhance analysis;
c. Prior art timeline graphs;
  i. Show timeline with dates of prior art vs. application;
  ii. Show timeline of all patents or applications in class/subclass in comparison to pending application;
d. Keyword/key phrase timeline graphs;
  i. Show timeline of when a keyword/key phrase of application first appeared in prior art;
  ii. Could be table/chart with keywords/key phrases listed by order of appearance by year, with representation of each year; and
e. Dominance of owners by keyword/key phrase—show which owners own most art with matching terminology (also for payment analytics).

In various example embodiments, an analytics tool may be used to determine prior art overlap. For example, competitor overlap for single patent, portfolio, or family may be include:
a. prior art citation overlap;
b. overlap of prior art cited against Target Company's patent or portfolio, and prior art cited against Competitor Company or Companies, identified by user;
c. an analytic result may include a list of prior art cited against both the Target and the Competitors;
d. an analytic result may include list of companies that own prior art cited against Target and Competitors (e.g., show the number of references cited against both owned by Target).

In various example embodiments, a process:
1) looks at a US patent and if it shows a reference was applied, gets name of company it was cited against and highlights that company as a target for the applied reference;
2) for applied references, crawls PAIR and OCRs or otherwise reverse-engineers the reason the reference was cited, and pulls comments by PTO or attorney; and
3) takes note if the reference was a § 102 or § 103 reference. Then, in various embodiments, the process does the same for foreign references of PCT search. For example, after determining if an applied reference was a 102/103 a tool may determine the name of the applied reference from the face of the patent and then look for text "102" or "103" near the reference in the OCRed text, or similar or other references in foreign counterpart applications.

An output may include a chart with headings of Prior Art Reference, # Cited against Target, and # Cited against Competitor 1, 2, and 3, with example entries:
Reference A, [x], [y, z, a . . . ]
Reference B, [e], [b, c, d]

In various example embodiments, a tool is used for prior art and forward reference citation analysis. The tool may generate a continuing stream of "watch results" for a single patent (or a group of patents). In an embodiment, an inventor or company may set up a watch to see if their patent is being cited by later-issued patents; such cites may not occur for a long time, if at all. The tool helps produce a steady stream of watch results, on a daily/weekly/monthly/yearly basis. The tool may for:
a. Forward cites of prior art:
  i. take the pool of all prior art cited on patent;
  ii. watch for forward cites of any of this art;
  iii. report these forward cites;
b. Forward cites of applied prior art only:
  i. take pool of applied art cited on patent (USPTO puts asterisk on these);
  ii. watch for forward cites;
  iii. report forward cites;
c. Forward cites of patent being watched;
  i. flag as prior art;
d. Forward cites of forward cites:
  i. analyze the forward cites of patent being watched;
  ii. report any forward cites of those references;
e. forward cites of forward cites of prior art.

In various embodiments, the display of these results can be dynamically determined based on the number of results available by:
a. suppressing presentation of more remotely relevant watch results if there are plenty of more pertinent watch results; or, b. list results in descending (or ascending) order of perceived pertinence:
   i. forward cites of watched patent;
   ii. forward cites of applied art;
   iii. forward cites of forward cites;
   iv. forward cites of any prior art reference.

The tool may filter watch results from the company that owns the patent—so if the owner of the watched patent cites back to it, the tool may provide an option to ignore those results.

In various example embodiments, a prior art date analyzer is used to:
   a) Pull, perhaps using a patent number, priority dates from PAIR or other source for a U.S. patent/patent application; and
   b) apply prior art rules to determine a likely effective date of a reference.

In some example embodiments, an office action workroom tool is used for analyzing cited prior art. The analytics may include:
   1) owners of art,
   2) timing of art—timeline view,
   3) timeline of art in art unit/class-subclass,
   4) notable inventors, and
   5) keyword overlap—unique keywords for case under rejection.

In an embodiment, the prior art has been prepared (e.g., using OCR) for search. Then, a list of keywords may be run against the cited prior art. In an embodiment, the tool may generate a spreadsheet output with keywords mapped to paragraphs with analysis functions built in spreadsheet or may generate a spreadsheet with capabilities built into a web interface. The capabilities may be used to find which paragraphs or documents have certain combinations of keywords (a user may pick the combination of keywords). Also, a user may search for and map concepts to cited art that are not shown. Prior art rejections may be mapped to specific paragraphs of document and shown in a workroom or in a spreadsheet. Examiner statistics may also be part of the office action workroom, or examples of other rejections by examiner. Other rejections on the same references, or reference history, may be shown as well.

In various example embodiments, a tool for analyzing cited prior art may be used for forward and backward citation coverage list analysis. In some example embodiments, the tool may, for all patents of a first owner or patents in a class for an owner:
   1) determine a list of all the other owners of patents or applications that own a patent that has been cited against the first owner, and how many for each;
   2) determine a list of all the other owners of patents or applications that own a patent that one or more of the patents of the first owner have been cited against (e.g., forward cites), and how many for each;
   3) determine and/or display the above (e.g., based on year), for example, in a chart with owners in rows and each year in a column; and
   4) determine biggest gainers/losers (e.g., by year).

In various example embodiments, a prior art analytics tool may have features of:
   1. Multi-level forward/backward citation search and presentation; or
   2. Synonym/antonym FTO.

Docketing Management

In various example embodiments, the PAIR Plus tool may include a docket verification-docket built in. For example:
   a) PAIR or portions thereof may be scraped or copied;
   b) in particular, transaction log or log of office actions;
   c) a docket engine that may be part of the tool;
   d) the docket engine may determine a set of docket dates—response due dates etc.,
   e) due dates may also be for foreign filing or prior art cross citation;
   f) those dates are associated with or embedded into a PAIR document;
   g) user may download the PAIR document and the due dates are either on a PDF or on an Excel or XML, or other form with document;
   h) or, user can synchronize their Outlook calendar with PAIR due dates;
   i) If the tool does not know the date, the tool may flag that and add to calendar or list of exceptions as an exception that needs to be looked at;
   j) or, there may be a PAIR docket system that users may subscribe to and get a docket that is driven directly off of PAIR—(e.g., the tool can check things off as done once filed in PAIR); or the tool can docket a date that is not a response date (e.g., foreign filing or as noted above, IDS cross cites);
   k) the PAIR docket can also check other related matters, and docket for prior art cross-citation if system sees references cited in related case.

In various example embodiments, to obtain some of the data above the tool may scrape or download PTO actions from foreign patent offices (either selectively or in bulk), OCR to get electronic data or reformat the downloaded electronic data, provide the electronic data to a user/operator of a docket system, and provide an import mechanism for the docket system, either as a BOT or through an API, to load docket information.

In various example embodiments, another tool of PAIR Plus may include automatic OCR of all PAIR documents and provide Word, PDF, or plain text versions of PTO documents to PAIR Plus users. In various example embodiments, using automatic text analysis, the tool may extract details/types of PTO actions as well as references, which is then added to the data set for the patent and delivered in PAIR Plus. In an embodiment, PAIR Plus looks similar to the traditional USPTO site, but with extra metadata.

User Interfaces

In various embodiments, for the tools discussed herein, one or more user interfaces (hereinafter also "UI(s)") may be used to present portfolio analytics and to determine which services a user may elect. For example
   1) a user may load a list of U.S. patent/application cases into a portfolio manager,
   2) each patent/application may have the following button options:
      a) sign up/select option to find foreign equivalents or U.S. family, and load if desired,
      a-1) sign up for title guard—a tool monitors title changes,
      b) sign up for maintenance fee payment alerts—a tool monitors for either payments due and/or send an alert if payment not made,
      c) a tool offers to make payment if one is due—this is done with multiple payment options;
      d) sign up for basic citation alerts—any forward cite,
      e) sign up for advanced citation alert—a tool looks at forward citations of related patents like citation of an applied or unapplied prior art reference, or a forward cite of a forward cited patent, or a forward cite of a sibling patent,
      e-1) sign up for PTO PAIR alerts, e-2) sign up to look for cites to the patent in pending applications, f) sign up for advanced metrics—a package of advanced analytics metrics, g) sign up for Internet watch for patent—set parameters to generate web hits that are related to the patent, h) sign up for troll/patent trading activity alert—a tool detects how many patents in the same class/subclass or in other related group have changed owners in a time period.

Figure 4:
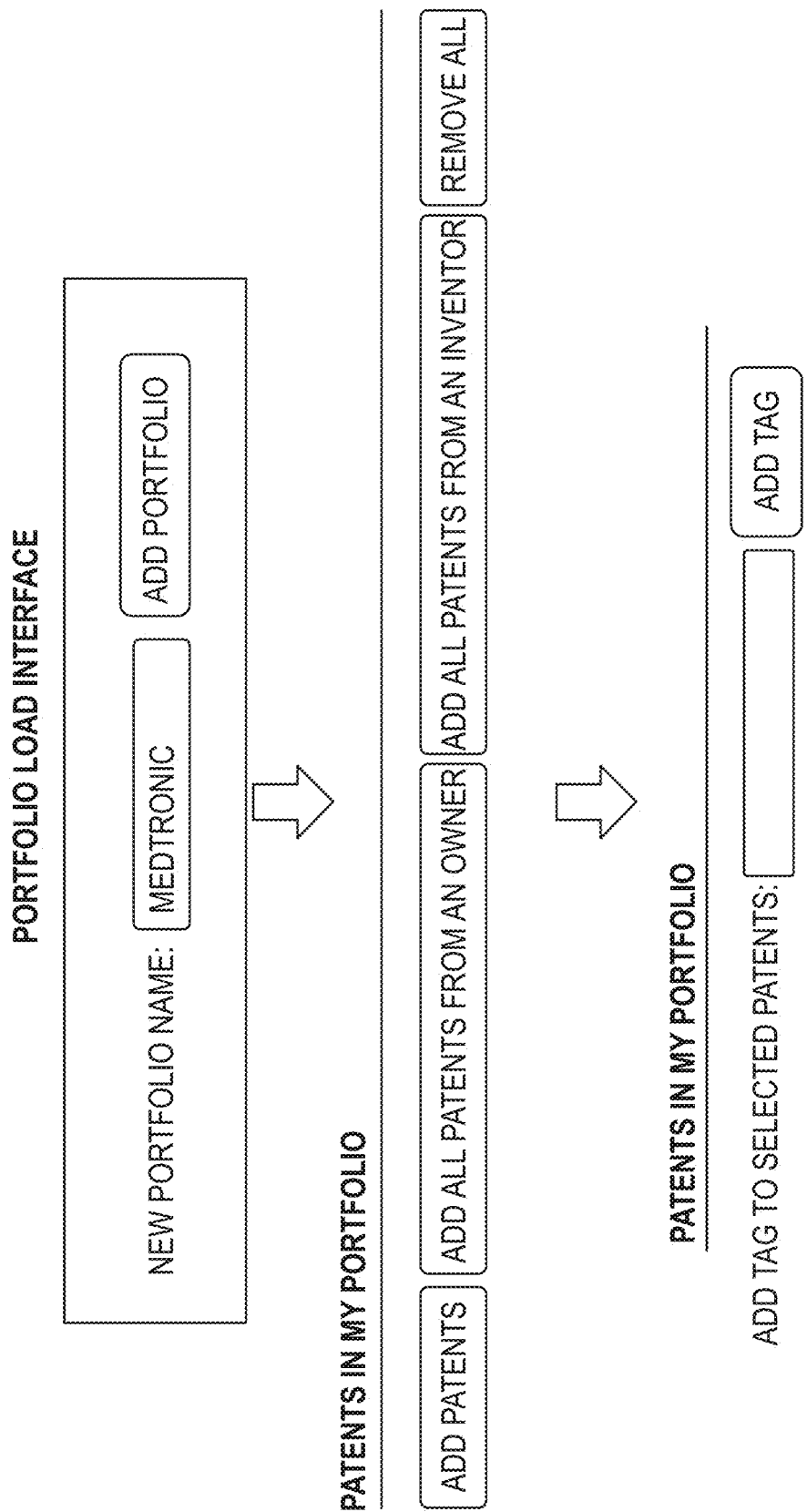

In certain example embodiments, a portfolio load interface is used to define a portfolio. FIG. 4 illustrates an example portfolio load interface, the portfolio load interface presents one or more input areas (e.g., text input fields, user selectable UI elements, etc.) When creating a portfolio, a user may enter a new portfolio name in a text input field and select (e.g., click on) the element "Add Portfolio" to request the patent portfolio management system to generate a portfolio. The user may select to add individual matters (e.g., patents, filed applications, unfiled applications, etc.) using the "Add Patents" UI element. The user may specify the matter(s) to be added to the portfolio by number, name, or any other identification method. Alternatively, the user may add all matters owned by a particular owner or assignee by selecting the "Add all Patents from and Owner" UI element. Upon selecting this UI element, the user may specify the name or any other identification of the owner whose matters are to populate the respective portfolio. Alternatively, a segment of a portfolio may be defined to include a slice of a particular portfolio (e.g., a subset of matters of the total number of patents/applications in a portfolio). In some example embodiments, a portfolio slice may include one or more matters in a particular technology class. Portfolio segments may be defined by a client's strategic business unit or may be provided as a functional ontology identified by the client. Upon the user making a selection with respect to the method of populating the portfolio, the portfolio management system may populate the generated portfolio based on the user's selection. The user may also create a portfolio that includes the patents and applications of a competitor.

As illustrated in FIG. 4, the portfolio load interface allows the user to remove one or more matters from a portfolio. For example, upon selecting a portfolio name, based on the appropriate permissions, a user may remove all matters from a portfolio by selecting the "Remove All" UI element. The portfolio load interface also allows the user to tag one or more matters in a portfolio based on a law firm name, product, or any number of strategic reasons.

FIG. 5 illustrates a main portfolio interface used to present the matters in a portfolio, according to some example embodiments. As illustrated in FIG. 5, the matters may be displayed in a list of matters. For example, the user may select from a drop-down menu the "Medtronic" portfolio. Upon receiving an indication of the user's selection of portfolio name from the list of portfolio names displayed in the drop-down menu, the portfolio management system may display the results (e.g., the matters) corresponding to the selected portfolio name in the main portfolio UI.

The portfolio management system may allow the user to interact with one or more UIs to view comprehensive data that pertains to a patent asset or portfolio (e.g., boilerplate analytics), or to view only portions of data that the user is interested in at a particular time. As such, the user may designate what data is important to him by interacting with the various tools of the system using the system's UI(s). To receive only relevant data, the user may select to refine or filter the displayed results by using one or more UI elements, as discussed below. Upon receiving a request to apply a user-selected filter to a particular set of data (e.g., a portfolio), the system may selectively display a subset of the particular set of data based on the filter selected by the user. For example, if the user selects a UI element that says, "show only issued patents", the patent management system may only display data that corresponds to issued patents in the particular portfolio.

The list of matters may be displayed as a continuous list or may be split into pages. If the list of displayed matters is split into pages, the user may select one of the pages to view a portion of the list of matters. In addition to the list of matters, the main portfolio UI may, for example, display the total number of U.S. applications filed, total number of U.S. applications pending, total number of U.S. patents granted, and the date of the most recent publication. The displayed items may be grouped by category, such as "Publications/Patents in My Portfolio" or "Unpublished Applications in My Portfolio".

The information displayed for each patent or application in the portfolio (or portfolio slice) may include a hyperlink (e.g., the publication/patent number) for each patent or application for obtaining additional information related to the particular patent or application. The additional information may be displayed in the same portion of the UI as the Main Portfolio information or in a separate section of the UI.

Upon the user selecting the down arrow button of the "Display results" drop-down menu, the portfolio management system may display a list of portfolios or portfolio slices, as shown in FIG. 6. The "Display results" drop-down menu, in certain example embodiments, also allows a user to select the portfolio of a competitor.

The user may then select, for example, the portfolio slice called "Medtronic Spine" from the list of displayed portfolio/portfolio slice names. Upon receiving an indication of the user's selection of a portfolio slice, the portfolio management system displays the matters included in the selected portfolio slice. In the example main portfolio UI illustrated in FIG. 7, the "Medtronic Spine" portfolio slice represents a subset of all the matters included in the "Medtronic" portfolio. In other words, the UI allows the user to refine or filter the matters displayed for further analysis according to one or more criteria. In this example, by selecting the "Medtronic Spine" portfolio slice, the user requested that the display of results be limited based on the particular portfolio slice name.

In another example, the user may limit the results displayed based on unpublished applications, as illustrated in FIG. 8. To illustrate this example, no actual unpublished information related to Medtronic Inc. was used.

FIG. 9 illustrates other examples of refining or filtering criteria. Upon receiving an indication of the user selected the "Refine & filter" UI element (e.g., a link), the portfolio management system may present the user with one or more selectable criteria/filters from which the user may choose which criteria to apply in filtering the portfolio data for further display. The user may refine the list of matters to be displayed by issue or publication date. In some example embodiments, the UI allows the user to specify a range of dates by presenting input fields where the user can input a start (e.g., a "from") date and an end (e.g., "to") date. In other example embodiments, the user may specify the issue or publication dates of the matters using a calendar tool included in the UI. The user may refine or filter the portfolio results by type of matter (e.g., patents, filed applications, unfiled applications, all matters, etc.), patent status (e.g., in-force, expired, or all), class, title, inventor name, serial number, patent or publication number, abstract content, tag name (e.g., by law firm name or client-provided ontology). As illustrated in the UI below, the data presented may also be sorted based on filing date, publication date, publication number, or number of forward cites.

FIG. 10 depicts an example list of portfolio results filtered by publication date.

FIG. 11 illustrates an example list of portfolio results filtered by law firm tag. Similar to other illustrations herein, FIG. 11 contains de-identified data.

The UI allows a user to drill down to the details of a particular matter (e.g., drill down from the portfolio level to the details at the patent level) by either specifying the number of the matter, as discussed above, or by selecting a particular matter from the list of matters included in a portfolio displayed in the UI by the portfolio management system. FIG. 12 depicts a detail of the main portfolio UI including a rectangle surrounding U.S. Patent Application No 2008/0208,020 to highlight the user's selection of this application.

Upon receiving an indication of the user's selection of U.S. Patent Application No 2008/0208,020, the portfolio management system displays additional details for the respective application, as illustrated in FIG. 13. The additional information pertaining to the particular patent or application displayed to the user may include a "Download as PDF" selection element allowing a user to request downloading of the patent or application in PDF form, the issued date if a granted patent, the filing date, the serial number, and the status of the patent or application.

The user may further be allowed to select between patent analytics provided for the particular patent or application, or the PTO File (PAIR) data. The UI illustrates some of the functionality of the patent management system that allows the user to identify at which stage the particular patent is in the prosecution process, and to access PAIR data, portfolio data, and portfolio analytics all in one place.

Figure 14:
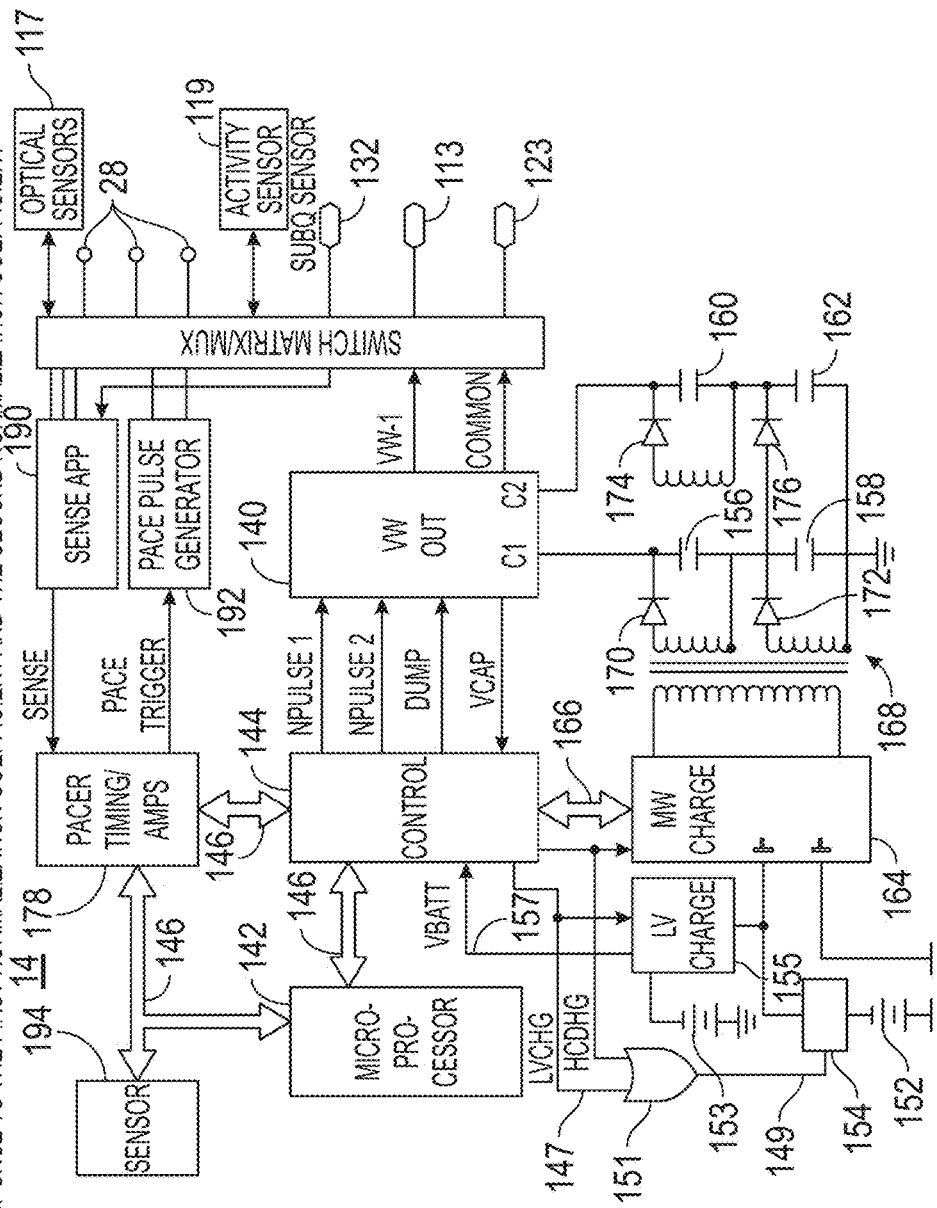

As depicted in FIG. 14, for a matter selected by the user, the portfolio management system may display in the UI the abstract of the matter, the first (or primary) drawing from the matter, or the first claim, or a combination thereof. The display of the abstract, first claim, or drawing may allow the user to understand the scope of the matter in the broadest sense.

Figure 15:
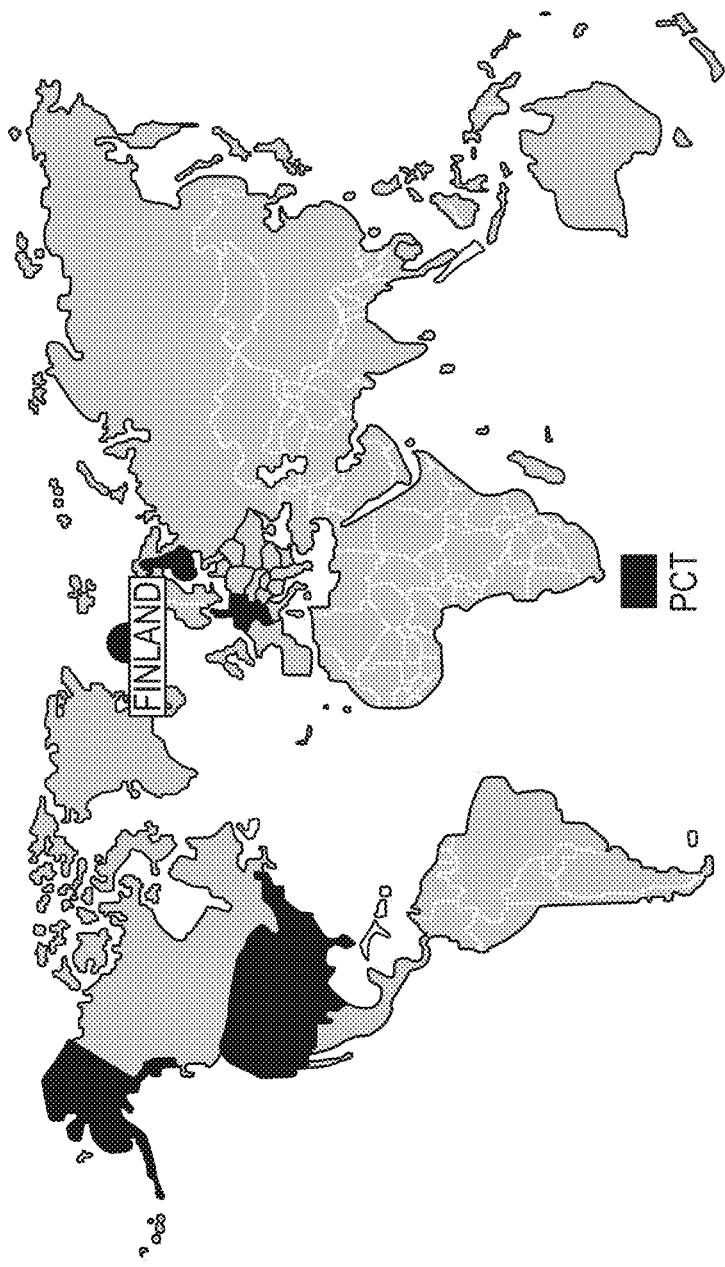
Figure 16:
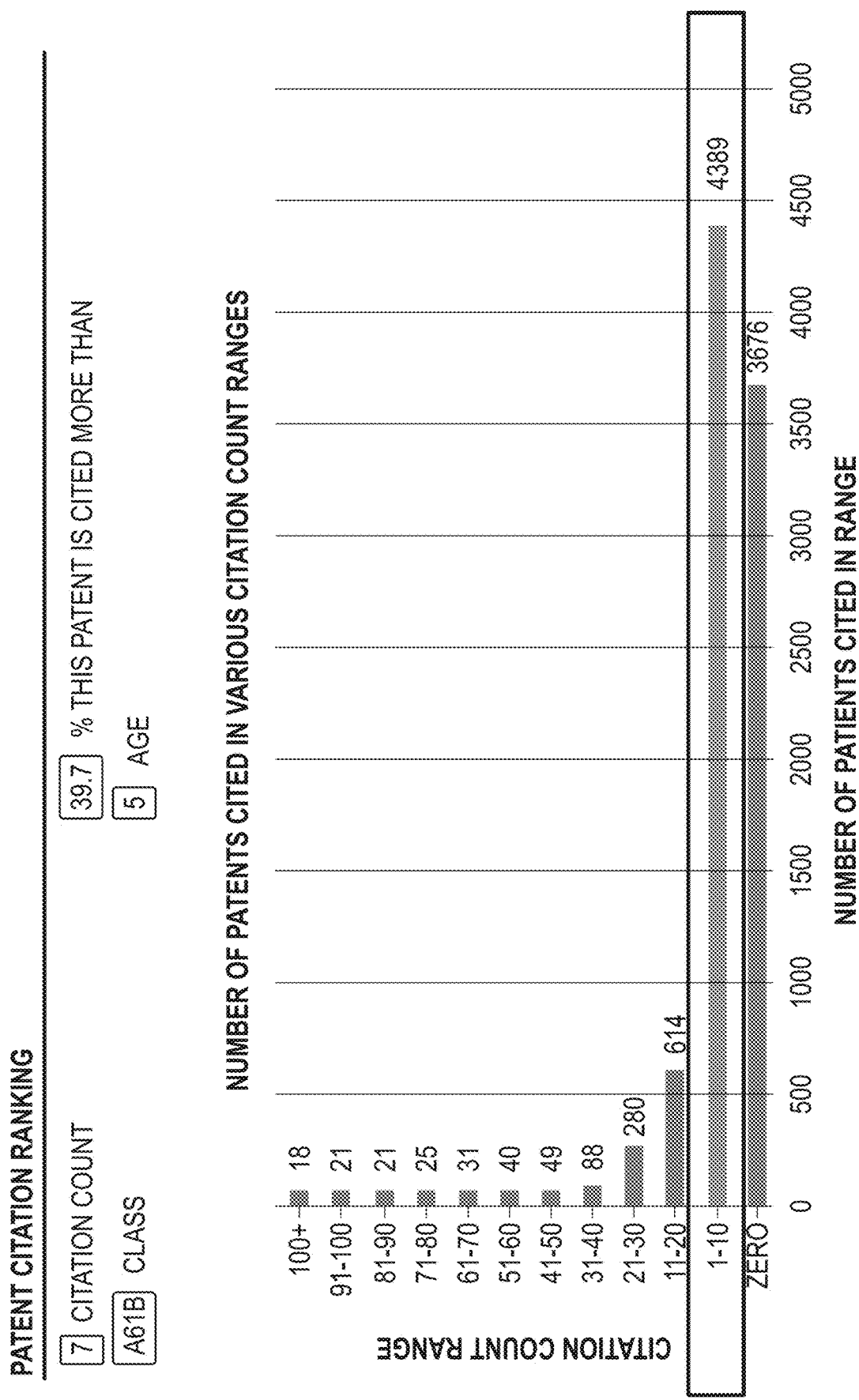

In some example embodiments, the patent analytics are displayed by default in response to a user selecting a matter (to obtain patent level details). As part of the patent level analytics, the patent portfolio system may display a metric that measures the importance of the particular portfolio item. The importance of the respective patent or application may be determined based on the size of the US family of patents and/or applications, the international coverage, the patent longevity, the forward citations, or a combination thereof. Also as part of the patent level analytics, the portfolio management system may display:

1) related applications (e.g., the family information of the respective patent/application). As illustrated in FIG. 15, the family information may be presented using a map of the world that indicates in which countries patent have issued or applications have been filed. The family information may also be displayed as part of a list. Each item in the list may be a matter identified by, for example, a publication number, a country, a kind, a title, etc.
2) the name of the patent owner;
3) the international classification;
4) the inventor's name;
5) the cited art displayed as a list of patents and applications;
6) the cited art displayed as a graph illustrating which patent owner's patent or application was cited, in what year, and the number of counts of cited art of a particular owner was cited in a particular year. This displaying of citations analysis allows a user to understand what art may have been considered relevant by the Examiners at any particular time during the prosecution of the respective patent or application;
7) the patent citation ranking (to illustrate how the respective patent compares to other cited patents) based on the citation count, technology class/category, percentage this patent is cited more than its counterparts, or age of patent, as shown in FIG. 16;
8) forward cites;
9) maintenance fees, including due dates and fees, and late payment grace periods and surcharges;
10) any added tags;
11) other patents or applications by the owner of the respective patent or application; and
12) other resources, such as a link that allows the user to view the respective patent or application on an external website (e.g., Google Patents).

In some example embodiments, the relevance of the patent may be illustrated using one or more graphs displayed in a UI that provides details for a particular patent. For example, a graph (e.g., a pie chart) of the distribution of the total number of patents among the patent owners in a class (a user may determine who the top assignees in the class) may be displayed in the UI, as shown in the illustration below. In another example, as shown in FIG. 17, a graph may indicate priority dates (e.g., the filing years during which patents of the particular classification were filed, the number of patents filed per year, and an indication of the year when the respective patent or application was filed. This may be useful for monetization or licensing of patents because it helps the user understand the position of the respective patent in relation to other patents in the classification.

Upon receiving an indication of the user selecting to view the PTO file, the system displays PAIR data. As discussed above, the patent management system and its UIs may allow a user to access a variety of internal patent data (e.g., docketing information), external data (e.g., PAIR information), and patent and patent portfolio analytics from one place. As illustrated in FIG. 18, a user may obtain information that identifies the particular patent or application (e.g., application number, filing date, type, etc.) and the response level from the examining office. Examples of other data that may be displayed in a drill down to PAIR data are information that identifies the examiner, the art unit, confirmation number, attorney docket number, class/subclass, first named inventor and a list of transaction history items, each item including a date the transaction occurred and a transaction description.

In some example embodiments, the UI displays high-level analytics of a portfolio. High-level analytics provide a layered-level look of the portfolio as the user examines a portfolio of the user's company, a portfolio slice, or a competitor's portfolio/portfolio slice.

Under the Details section, the UI displays a list of statistics for the portfolio/portfolio slice. One such statistic is the total citation count. Because the total citation count of a portfolio may indicate how rich and robust the portfolio is, this statistic allows a user to understand the depth of a particular portfolio faster and with more certainty. Other statistics that may be presented to the user under the Details section are the Expired assets count and the Abandoned assets count.

Figure 19:
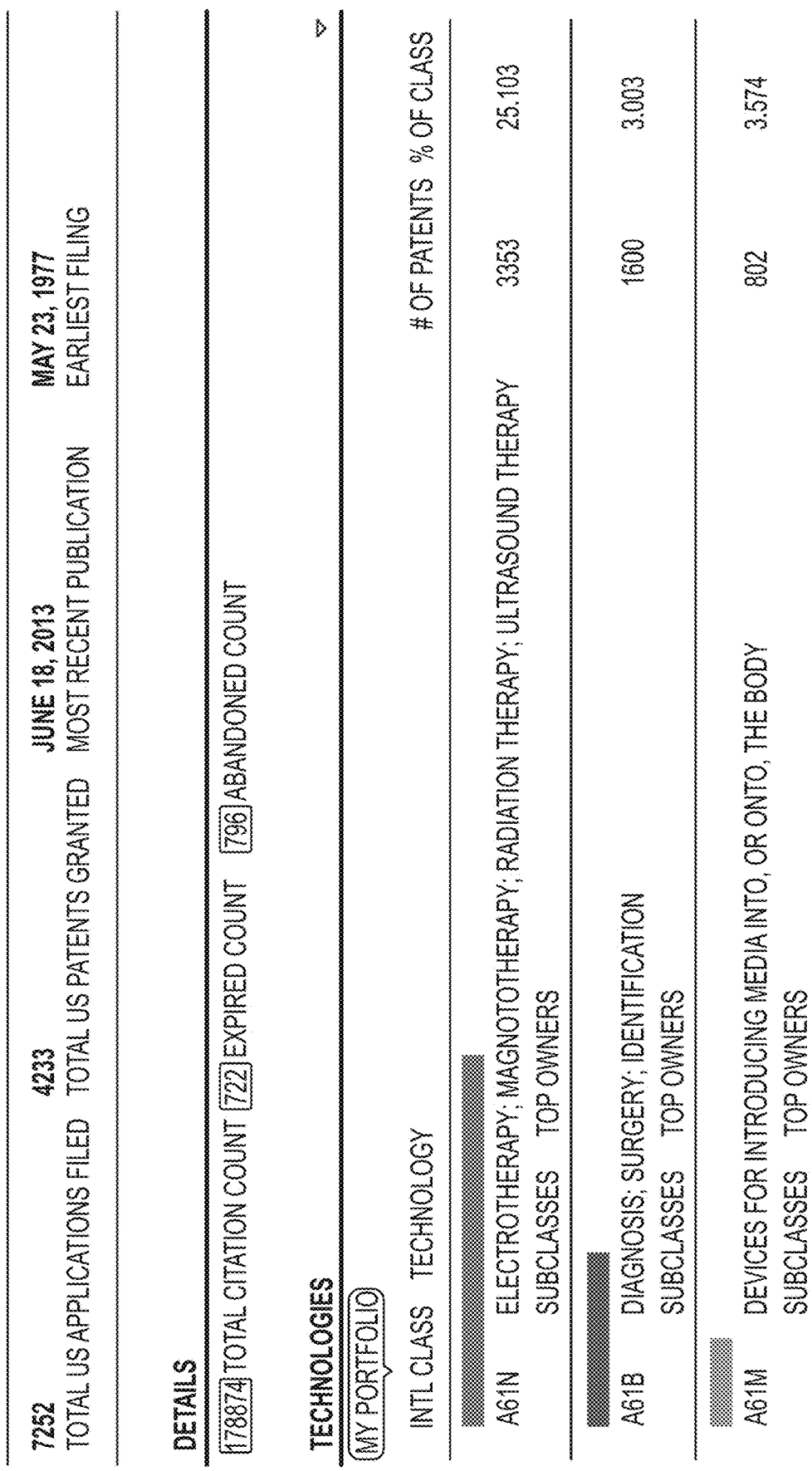

Under the Technologies section, a list of classifications for the assets in the portfolio is displayed, as illustrated in FIG. 19.

For each classification, the patent portfolio management system displays the number of patents the owner has that are part of the particular classification and their percentage of the classification as a whole. Each class may be displayed as subdivided into subclasses or by top owners, as illustrated in FIG. 20.

As discussed above, a user may drill down into each category by selecting the subcategory link or the top owners link. For example, upon receiving an indication that the user selected the top owners link, the portfolio management system may display the list of top owners for that particular category, as shown in FIG. 21. The UI shows, for each owner, the number of patents owned and the owner's rank in the particular technology class as compared to other owners in the respective technology class.

Figure 22:
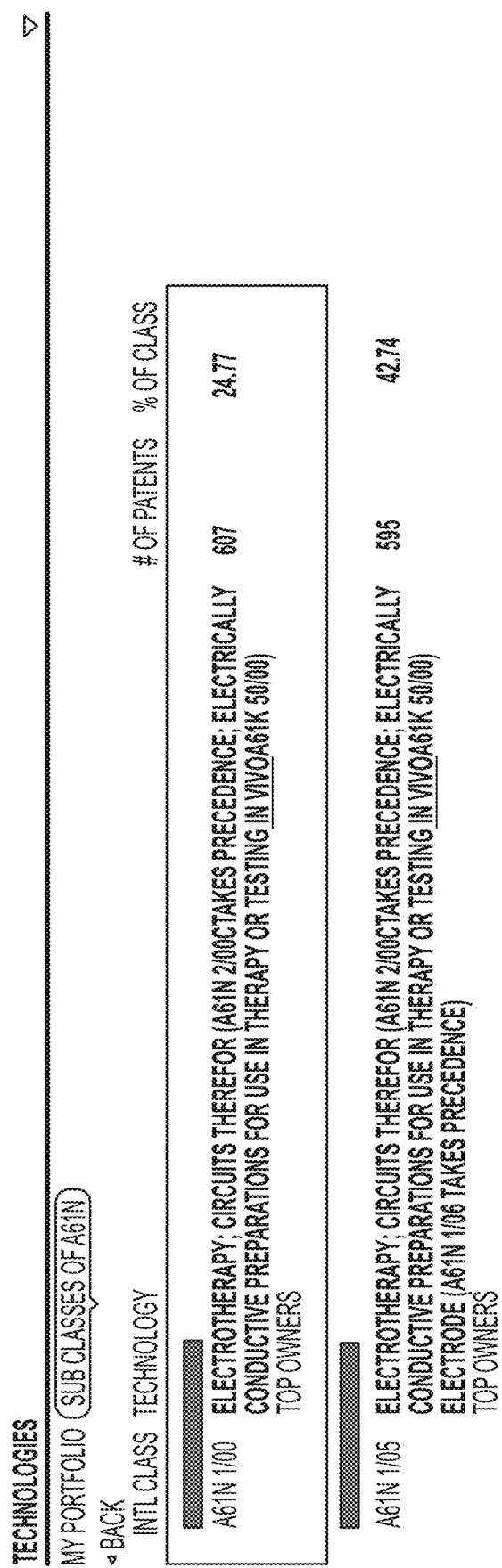

Similarly, as shown in FIG. 22, a user can drill down from a class to a subclass to view how many patents/applications an owner has in a particular subclass and what percentage of the total patents/applications in the subclass the particular owner's patents/applications have. Also, by selecting the Top Owners link for a particular subclass, the user may be presented with the list of top owners in the respective subclass of patents/applications, as shown in FIG. 21. The ability to view classifications, subclasses, and top owners using the same UI may be helpful to a user in matching classifications with products/product lines or in performing competitive analysis.

As illustrated in FIG. 23, the high-level analytics portion of the UI may also display the top cites by portfolio (e.g., the portfolio patents cited the most). The most cited patents in a portfolio may be presented in a list. Each entry in the list identifies a particular top cited patent by patent number, title, and filing date. The UI also displays, for each listed top cited patent, the issue date, the classification, and the citation count. The number of citations of a patent may be an indication of the patent's value to an organization. In other words, if a patent is highly cited, the patent may have a higher value in the portfolio as compared to other patents in the portfolio.

The high-level analytics portion of the UI may also display the top inventors by portfolio. As illustrated in FIG. 24, the high-level analytics UI may rank the inventors by number of patents. The UI may also list each inventor's address. A user may identify Research and Development (R&D) centers based on inventor addresses. The user may also identify who the top contributors are to the product line of an organization.

By receiving an indication that the user selected (e.g., clicked on) a link representing the name of a top inventor, the portfolio management system may display additional information for the particular inventor, as illustrated in FIGS. 25 and 26. The patent portfolio management system may display a list of patents/applications by the particular inventor and additional information for each patent, such as year of issue or publication, a title, and a citation count. The system may also display a list of technology classifications in which the inventor has patents and the number of patents by the respective inventor for each technology classification, as well as the current/prior address of the inventor. Based on the inventor's prior patent assignment, the system may display the inventor's work history (e.g., prior employers of the inventor). From the position of an in-house counsel, the system is a very useful tool to keep track of inventors who may leave the employ of the portfolio owner. It is also beneficial to in-house counsel to know where their inventors take new jobs for the purpose of protecting the intellectual property of their organization.

In some example embodiments, the patent management system allows a user to select to "follow" a particular inventor by selecting the "Following" element of the UI. This allows the user to set up a watch for activities by inventor, as illustrated in FIG. 25. The user may request a notification of changes in status related to the particular inventor. Examples of changes in status may be a new invention, the publication of an application by the inventor, the granting of a patent of the inventor, or the inventor changing jobs.

Figure 27:
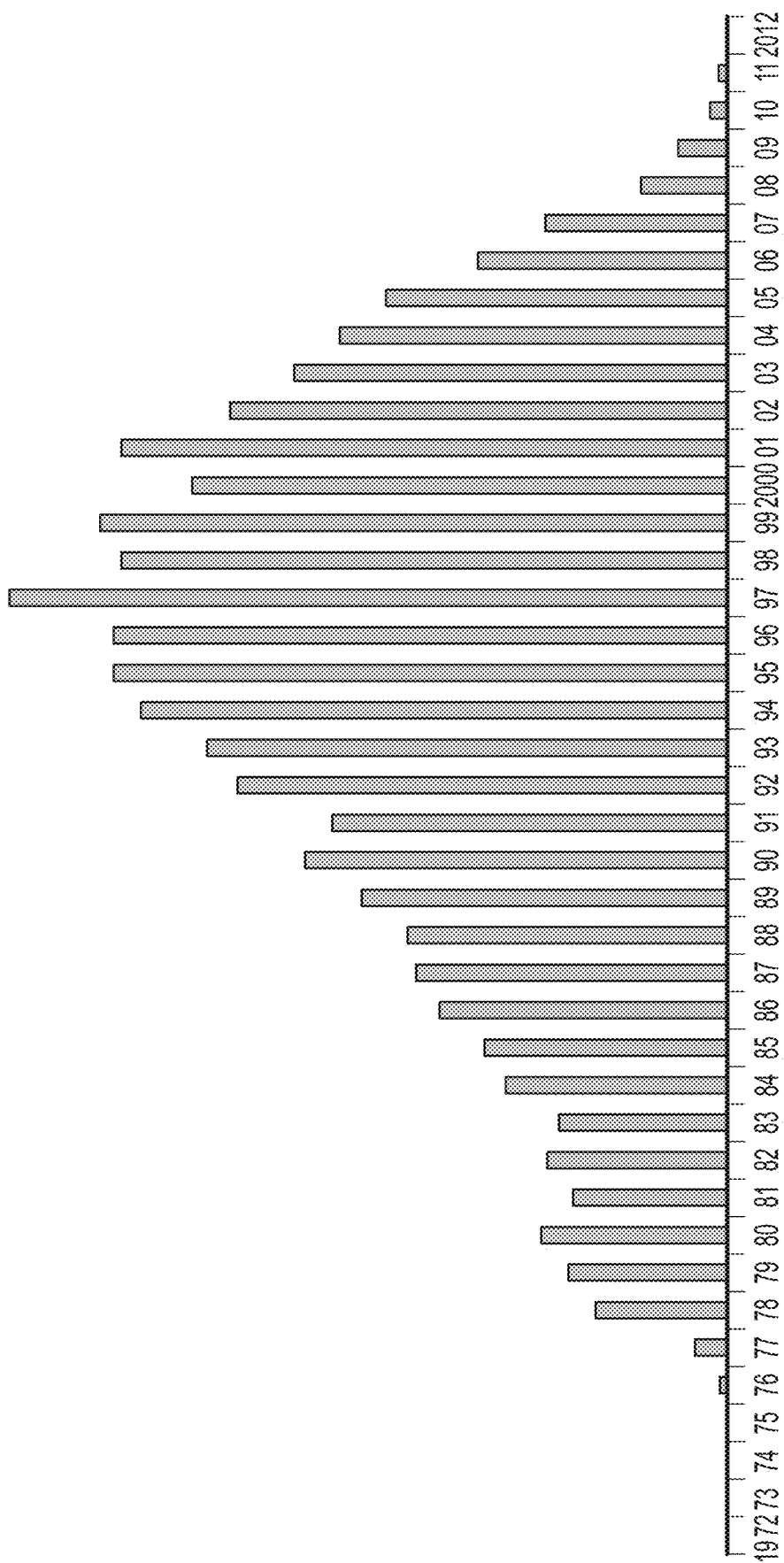

The patent portfolio management system may also display in the UI high-level citations including backward citations and forward citations. Backward citation allows a user of the UI to view the art cited against a patent/portfolio, trends related to priority, what references were cited during the prosecution process, and self-citation. Forward citation allows a user of the UI to see who the other owners are in a particular market, who cited the patents/applications of an organization, and self-citation. The backward citation and forward citation information is useful for monetization, competitive analysis, and acquisition purposes. The backward citation and forward citation information may be presented graphically or numerically (e.g., by the numbers), as illustrated in FIGS. 27 and 28. The citation information is presented in a manner that allows a user to incorporate easily the presented data into other reports that a user may want to create.

Figure 29:
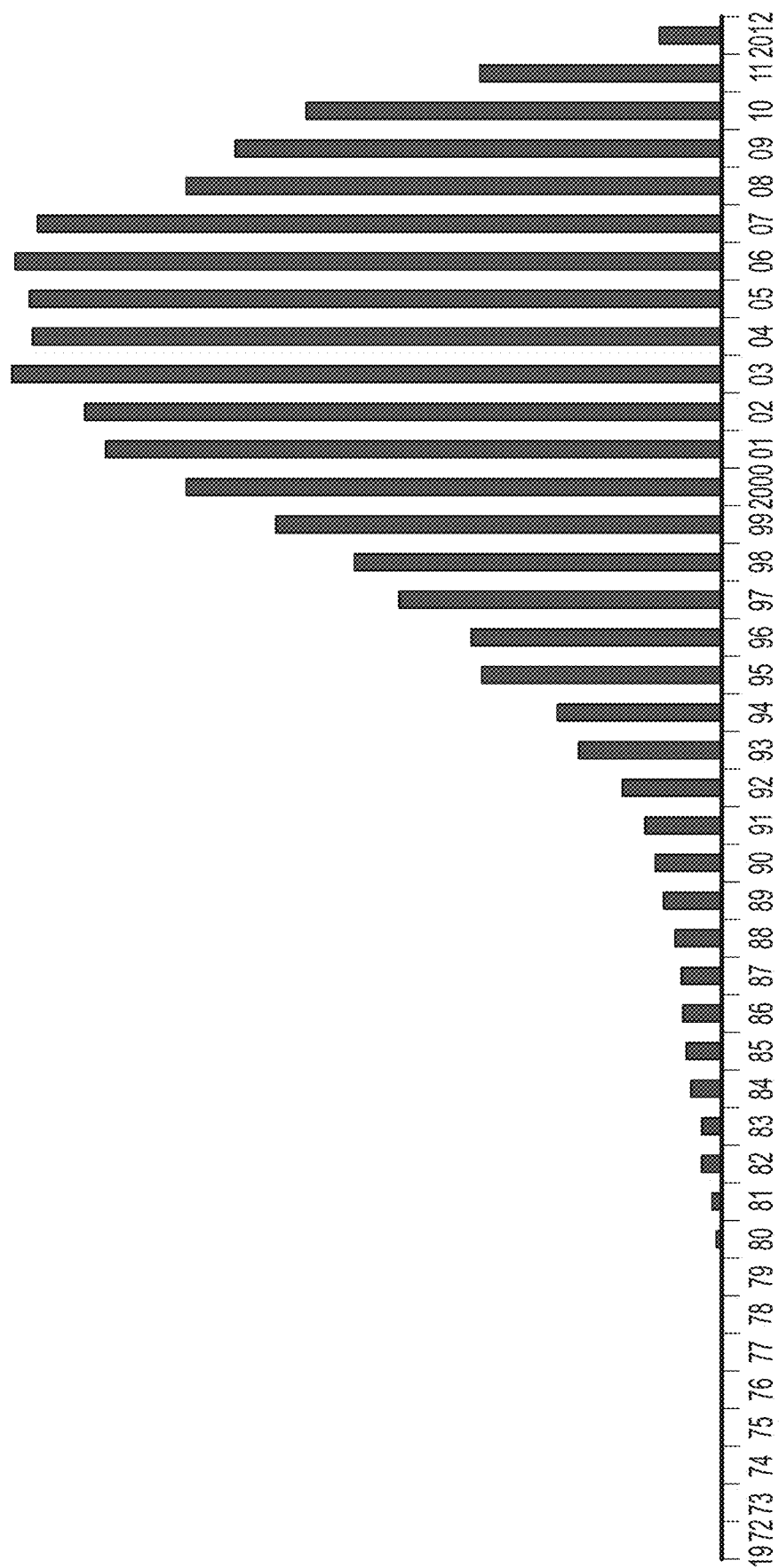

FIGS. 29 and 30 show forward citations graphically and numerically. By selecting the "x" corresponding to an entry in the numerical representation of the forward citations, the portfolio management system may exclude the self-citations from the citation analytics (e.g., from the count of forward citations) presented to a user. As such, the user may view all the citation analytics excluding the self-citations.

Figure 31:
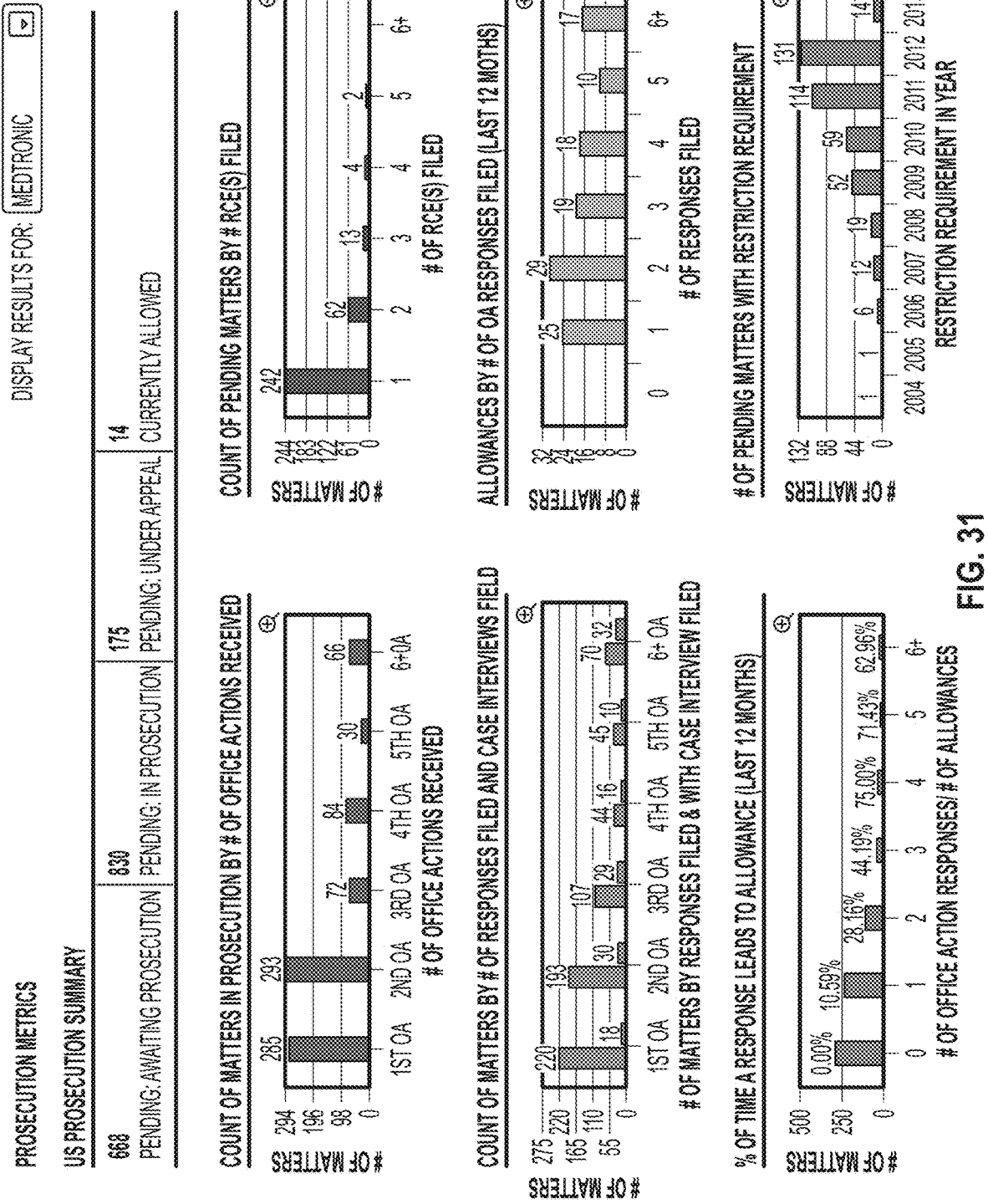

The portfolio management system (e.g., the high-level analytics tool of the portfolio management system) may present prosecution metrics in a prosecution metrics UI. The prosecution metrics UI allows the user to obtain a statistical analysis of the status of prosecution at the portfolio level (e.g., the portfolio's state of affairs based on all of its assets) at a point in time. The prosecution metrics may be presented in a prosecution summary, as shown in FIG. 31.

The prosecution summary may include information about (e.g., the count of) the matters that are pending awaiting prosecution, pending in prosecution, pending under appeal, or currently allowed. The prosecution summary may also display prosecution metrics such as 1) the count of matters in prosecution by number of office actions received,
2) the count of matters by number of responses filed and case interviews filed,
3) the percentage of time a response leads to allowance (e.g., last twelve months),
4) the count of pending matters by number of RCE(s) filed
5) allowance by number of office action responses filed (e.g., last twelve months), or
6) the number of pending matters with restriction requirements.

Figure 32:
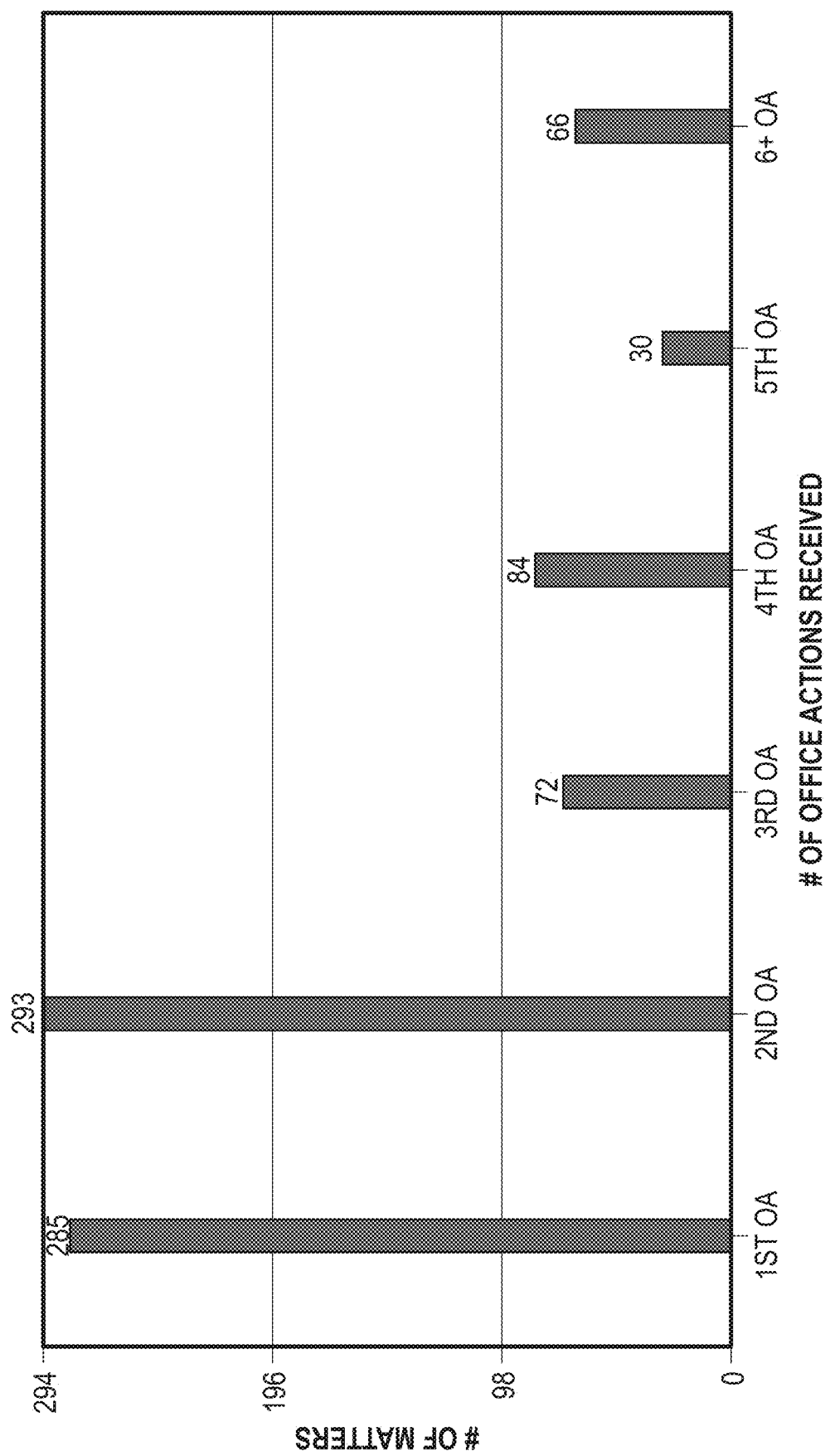

FIG. 32 illustrates a graphic representation of the count of matters in prosecution by the number of office actions received.

Upon receiving an indication that the user selected one of the columns representing the number of matters grouped by a particular number office action, the portfolio management system may display a list of the matters in the corresponding group of matters. For example, if the user clicks on the leftmost column representing the matters that are at the stage of the first office action, the portfolio management system may display the corresponding matters by the numbers, as shown in FIG. 33.

Similarly, in response to the user selecting to view the matters that have received six or more office actions (e.g., by clicking on the rightmost column marked "6+OA" to represent matters with six or more office actions), the portfolio management system may display a list of the corresponding matters, as illustrated in FIG. 34. The ability to identify, group, and present all the applications with a particular (e.g., high) number of office actions or RCE(s) received may be helpful to a user in understanding whether the respective applications are of increased value to the owner or are "stuck" applications (e.g., applications that have not been allowed after a pre-determined number of office actions).

Figure 35:
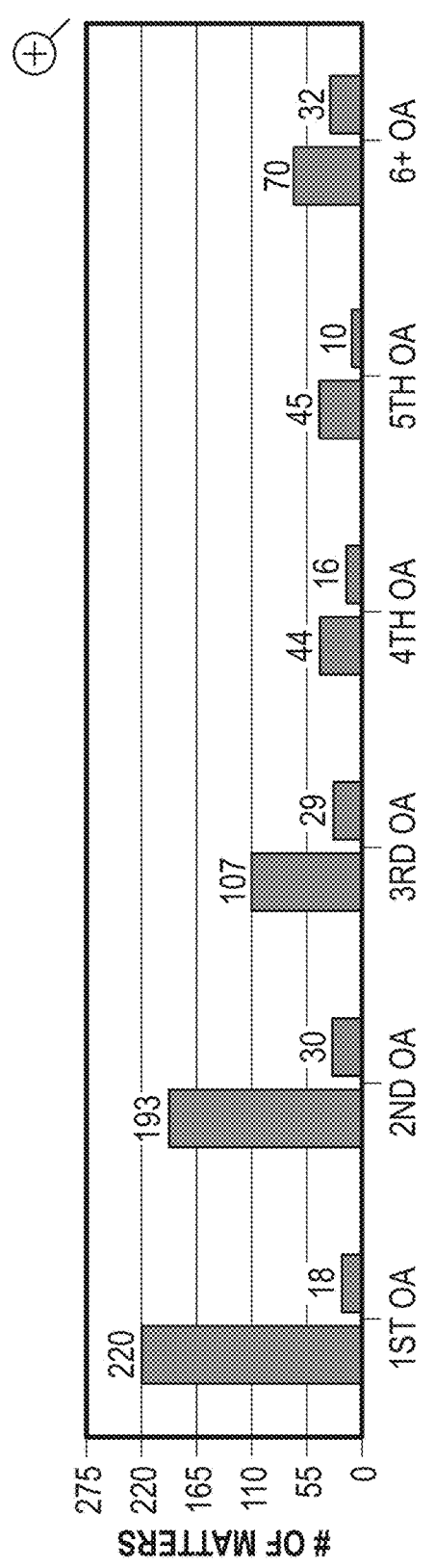

The prosecution metric that shows a graph of the number of responses filed in response to a particular number office action and the number of case interviews filed may indicate the success of the office action responses in cases that had examiner interviews based on the particular office action, as illustrated in FIG. 35.

Upon receiving an indication of the user selecting a particular column representing a number of applications in the graph, the system may display the corresponding list of applications by the numbers, as shown in FIG. 36.

Figure 37:
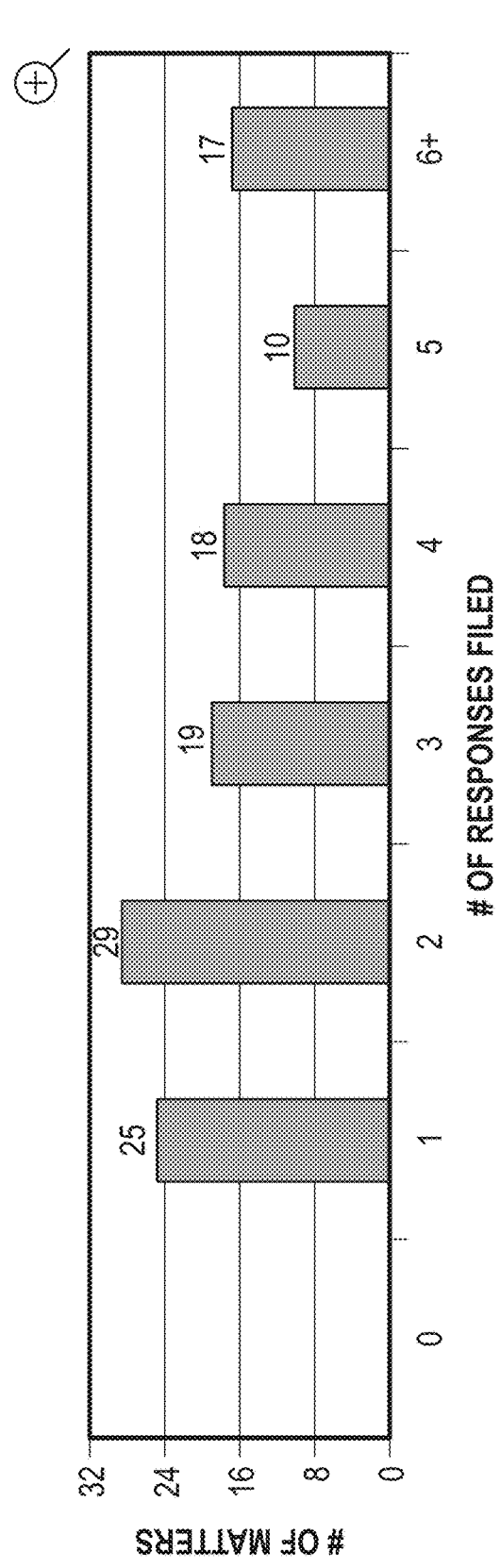

The prosecution metrics tool may display in the UI a graph of successful office action responses grouped by the number of responses filed, as illustrated in FIG. 37. For example, in this case, no matters were allowed before a first office action. However, after a first office action, twenty-five matters received notices of allowance.

By selecting, for example, the column that corresponds to one office action, the user may view the patents/applications allowed after the first office action, as shown in FIG. 38.

Figure 39:
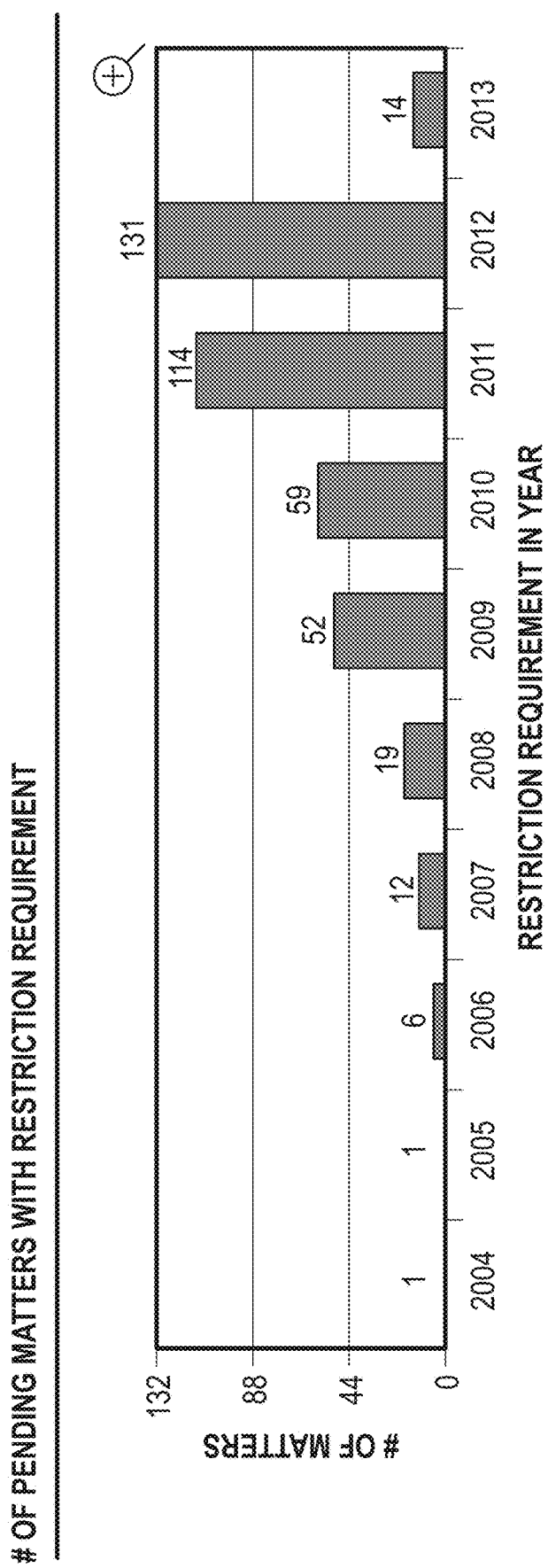

Another prosecution metric that may displayed in the prosecution summary UI is the restriction requirement metric. As illustrated in FIG. 39, the number of matters that received restriction requirements is graphically displayed by year. This graphical representation may also illustrate a trend toward more restriction requirements being issued in recent years.

Other prosecution metrics that may be displayed in the UI (e.g., in the prosecution summary section of the UI) may be time metrics that display the time between disclosure of the invention and the assignment, the time between the assignment and the filing of the application, and total time from the disclosure to the granting of the patent. In addition to time metrics, the portfolio management system may provide efficiency metrics that measure the efficiency (or inefficiency) of various actors during the patent prosecution process, such as patent examiners, art units, or law firms. The portfolio management system may also provide additional tools such as financial calculators (e.g., to calculate flat rate pricings for law firms).

Figure 40:
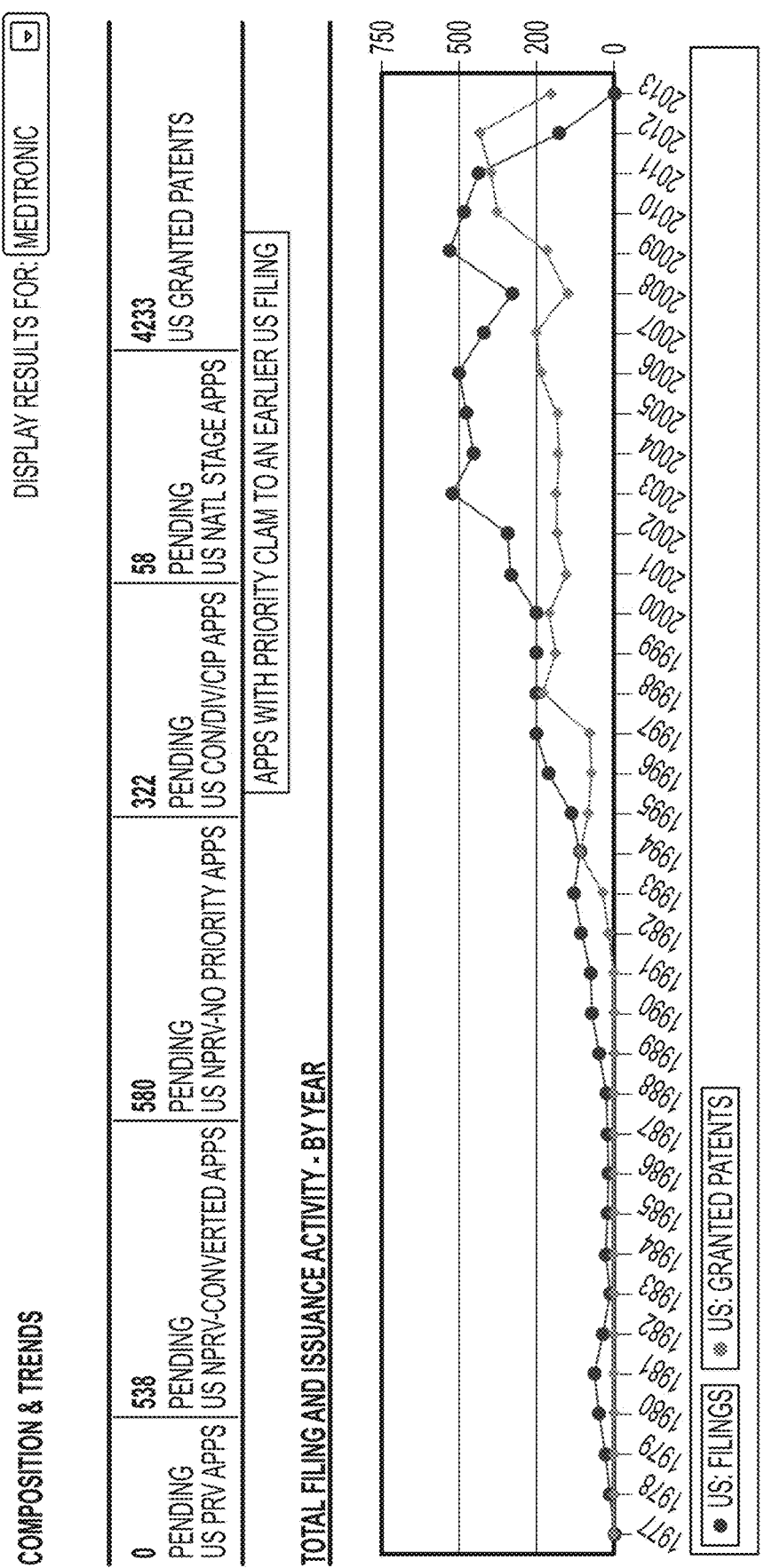

In some example embodiments, the portfolio management system includes a tool for determining portfolio composition trends. The portfolio composition trends may be displayed in a line graph in a portfolio composition section of the UI, as illustrated below. This area of the UI shows the composition of the portfolio over time. Tags may be added or removed, as necessary. For example, as illustrated in FIG. 40, one graph shows the number of filed applications by year, and another graph shows the number of issued applications by year.

Figure 41:
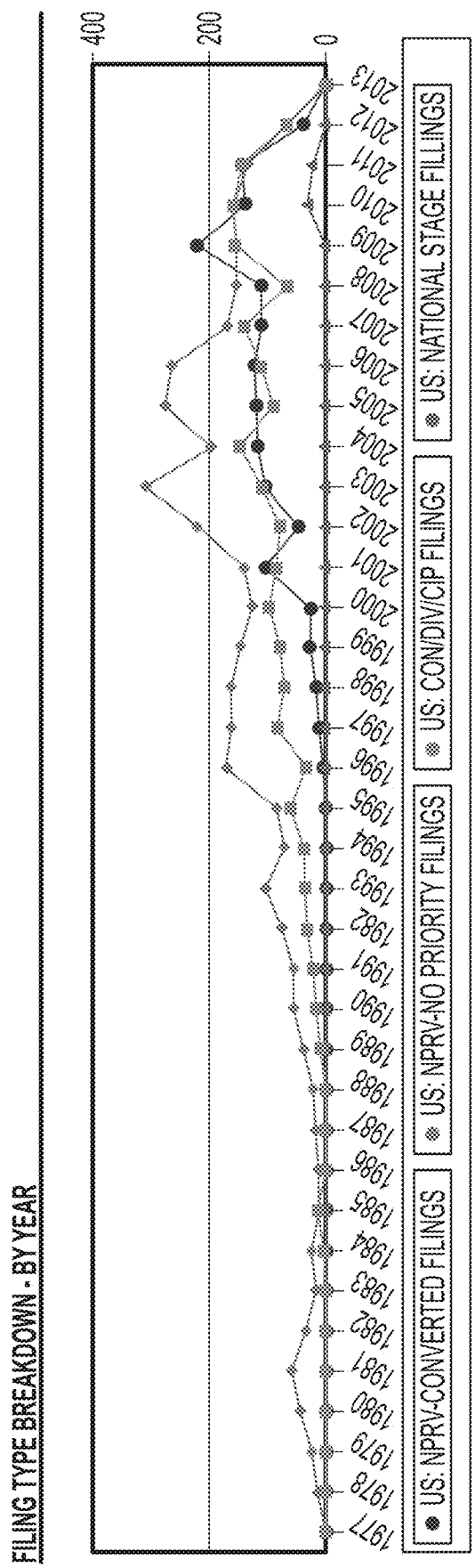

The graphs illustrated in FIG. 41 indicate the number of different types of filings, such as U.S. non-provisional converted filings, U.S. non-provisional no priority filings, U.S. continuation/divisional/continuation-in-part (CIP) filings, or U.S. National stage filings.

Figure 42:
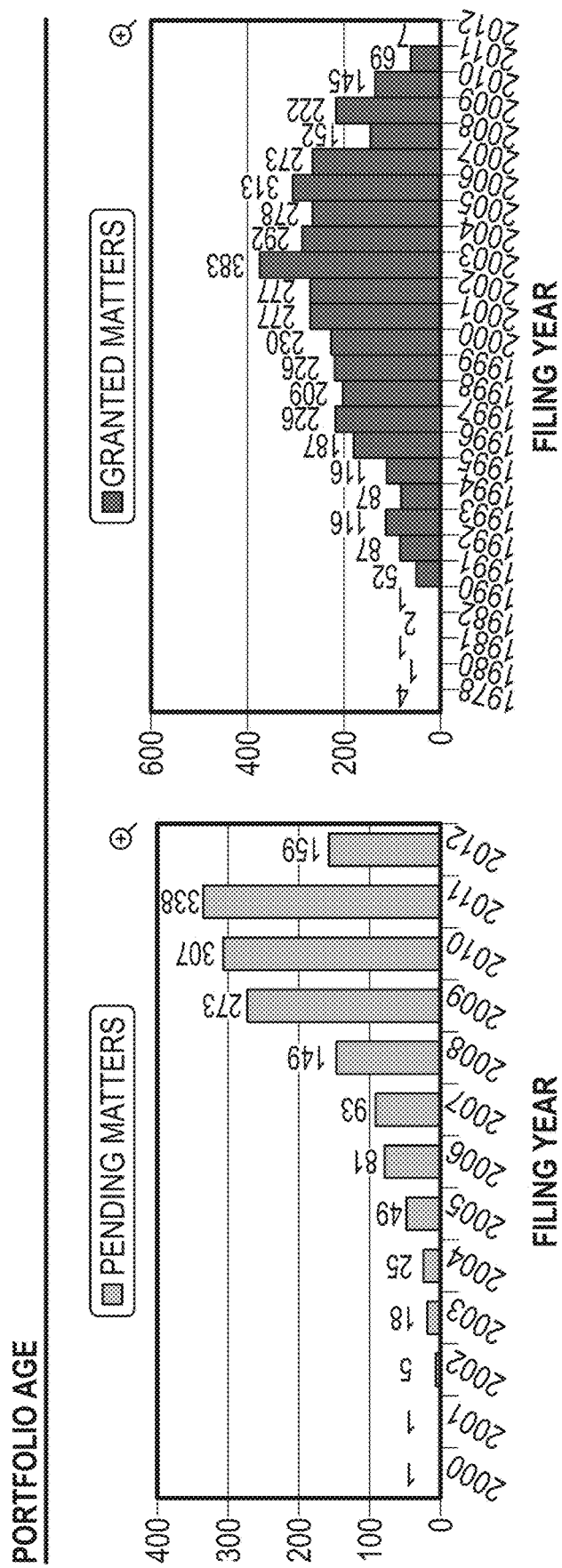

Also shown are graphs indicating the age of the pending matters and the age of the granted matters, as illustrated FIG. 42. A user may find these graphs helpful in understanding organizational efficiencies, for example, for purposes of acquisitions and divestitures of assets in a portfolio.

Figure 43:
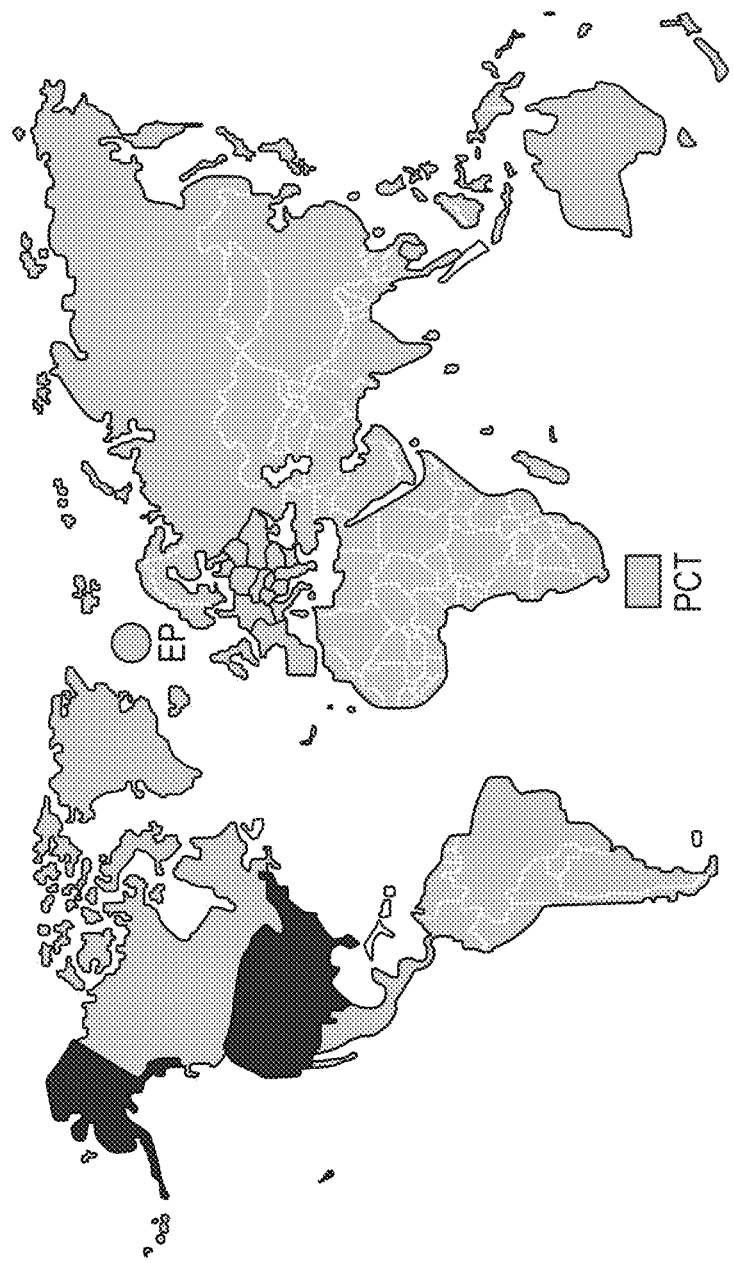

A map tool of the portfolio management system may illustrate, as shown in FIG. 43, the global distribution of the portfolio by, for example, highlighting the countries in which patents have been obtained or applications have been filed. By selecting a map area that corresponds to a particular country, the user may request that the system display information about the patent assets available (e.g., filed) in the selected country. In response to the user's request, the system may, for example, list the patents issued/application filed in the respective country (and relevant analytics discussed above).

Figure 44:
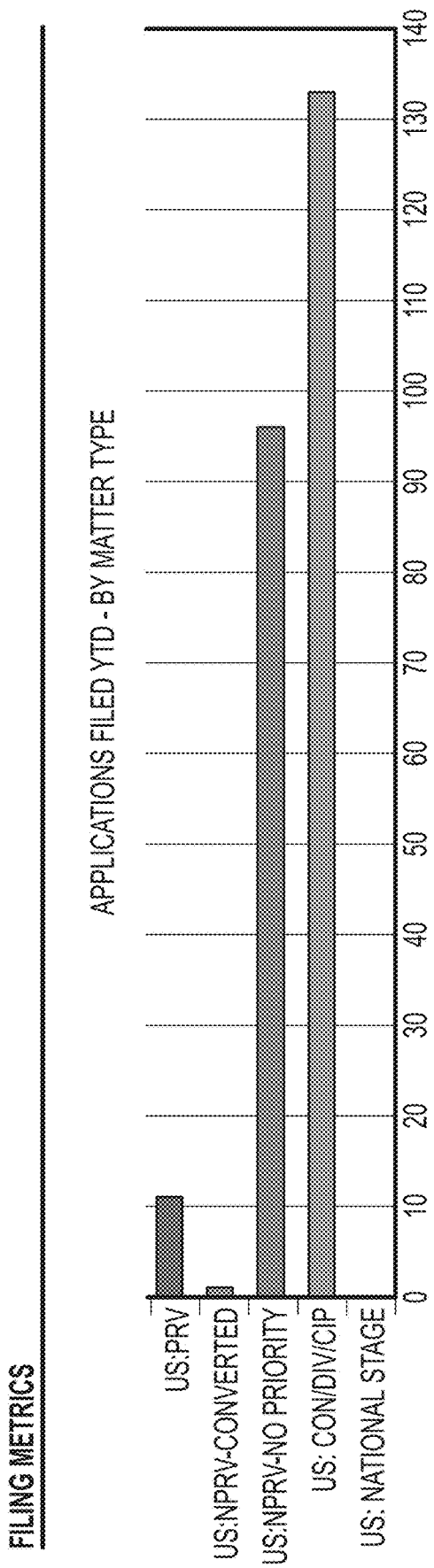

A tool of the portfolio management system may generate year to date metrics to be displayed in a year to date section of the UI. As shown in FIG. 44, the year to date metrics may comprise data about applications filed year to date, such as the number of U.S. provisional applications, U.S. non-provisional converted applications, U.S. non-provisional no-priority applications, U.S. continuation/divisional/CIP applications, U.S. National Stage applications.

As illustrated in FIG. 45, the year to date metrics may include data about various prosecution metrics, such as the number of RCE(s) filed, the number of appeals filed, the number of U.S. patents granted, or the number of abandoned U.S. applications. The patent portfolio management system is not limited to generating metrics for the U.S. patent assets in a portfolio, but may generate metrics for any patent asset in a portfolio, including those filed/granted in other countries.

In some example embodiments, the patent portfolio management system may compare patent portfolios of two or more owners. A user of portfolio management system, using the UI section for comparing portfolios (shown in FIG. 45), may add the name of an owner whose portfolio may be used to generate a comparison to another (selected) portfolio. In some example embodiments, the user may identify the owner's name to be added to the comparison list by doing a search for the respective name (as shown in FIG. 45).

Upon receiving an indication of the user's selection of an owner's name to be added to the comparison list, the patent management system may display the comparison list in a UI section for comparing owners, as illustrated in FIG. 46. The comparison list displays a number of portfolio owners' names, a graphic indication of each owner's portfolio position in the market based on the number of patent assets owned, the number of patents/applications for each listed owner, and whether the respective owner's portfolio is the primary portfolio, against which the other listed portfolios may be compared.

Figure 47:
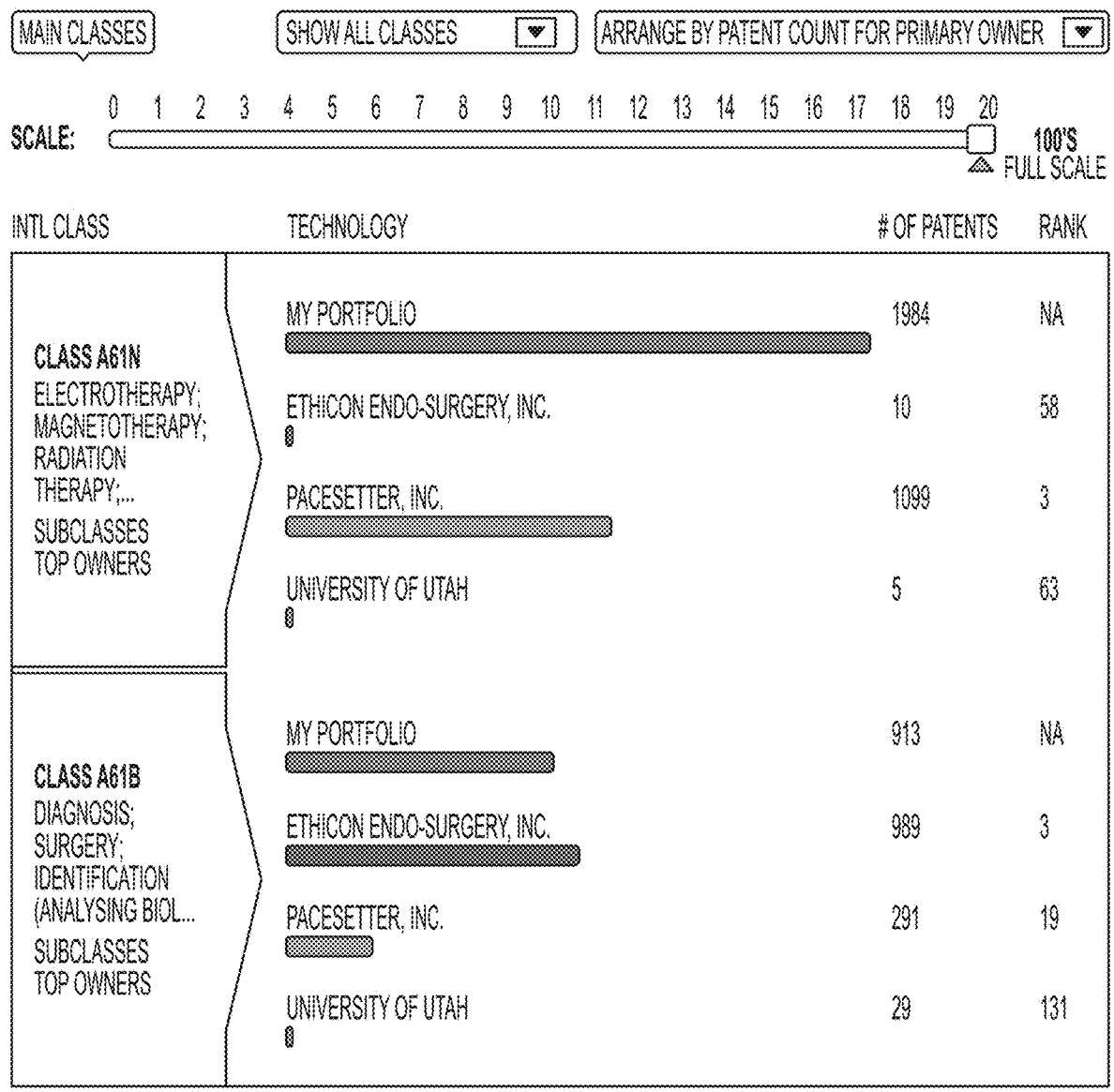

The comparison of two or more portfolios (or portfolio slices) may be done by classification codes, as shown in FIG. 47. The comparison results also include the number of patents each compared portfolio has in the particular classification and the rank number of the portfolio in the particular classification. The user may select to view the comparisons in all classes in which the primary portfolio has patent assets or only the comparisons in a subset of the classes.

The patent portfolio management system may transmit an alert or notification to a user based on a watch set up by the user. The notification may alert the user to a variety of changes observed (or deduced, determined, or identified) by the portfolio management system or any of its tools. The portfolio management system may send notifications about:
1) PAIR updates (e.g., a new office action has been issued), as shown in FIG. 48;
2) patent/application status update, as shown in FIG. 49;
3) inventor status changes (e.g., changed employment or a publication by the inventor), as shown in FIG. 50;
4) patent owner status updates, as shown in FIG. 51;
5) competitor updates (e.g., launched a new product);
6) technology areas updates by class or subclass, as shown in FIG. 52;
7) events that pertain to an organization's high value patent assets (e.g., patent granted); or
8) events that pertain to a competitor's high value patent assets, as shown in FIG. 53.

The portfolio management system may assist the inside counsel of an organization in managing the organization's outside counsel. The dashboard UI may be accessed using a browser or from an application of a mobile device. The UI of the portfolio management system provides both comprehensive views that include different levels of detail and concise views for portfolios, portfolio slices, and individual portfolio assets. The portfolio management system may also provide updates and alerts based on user-selected criteria to better monitor and manage patent portfolios. In some example embodiments, the portfolio management system may provide visual, auto-tagging or email alerts for Patent-Buddy®—or user-defined criteria that would alert the user when a patent, concentration of patents or prosecution activities, or citation activities of a patent owner exceed a preset or calculated value. For example, the portfolio management system issues a "Red Zone" threshold alert when a patent matter individually or collectively as a defined group, exceeds a limit of three Office Actions. In another example, the portfolio management system may notify a user when a competitor has filed one or more applications in a technology area based on one or more criteria specified by the user (e.g., the name of the competing entity, the threshold value for the number of applications filed, or the period of time specified for monitoring the competing entity). These notifications may be used to alert both a firm's prosecution counsel and a PatentBuddy® user analyzing a patent or portfolio.

Further, upon receiving these alerts, the user may use the dashboard to view and analyze the change(s) to the patent, patent portfolio, or prosecution activities that served as basis for the alert(s) transmitted to the user. The dashboard may present a visual representation of a particular aspect of the portfolio reaching a pre-defined threshold value by, for example, tagging, highlighting, or otherwise delineating/emphasizing the changes that triggered the alert to be sent to the user. The evaluation of the change to the portfolio may be visually communicated to the user by being represented, for example, in a graphical, schematic, diagrammatic, gradation, or numerical form. The evaluation of changes to a patent, concentration of patents or prosecution activities, or citation activities may be performed based on the data of a dashboard or of a plurality of dashboards that are, for example, maintained by an organizational system as part of a network of dashboard that are secure and independent of each other.

In addition to presenting the data illustrative of a change to a patent, concentration of patents or prosecution activities, or citation activities, the dashboard may provide the user with a call to action. The call to action may vary in its degree of compulsion. For example, the dashboard may provide a suggestion with respect to an action the user may take based on the type of change that triggered the alert to the user. In another example, the dashboard may request that the user review the change detected with respect to the patent, concentration of patents or prosecution activities, or citation activities and engage in an action (e.g., undertake a particular activity) in response to the change.

Moreover, the dashboard may be a lead generator (e.g., may be used during a sales process). When a portfolio or identified patent owner meets a criterion (e.g., the patent owner owns a particular minimum number of patents or the new assignments value changes by a particular minimum number) that organization is identified as a possible sales lead/contact/target for another organization. A sales sheet may automatically be generated and populated with data that may be relevant during a sales call. The portfolio management system may transmit the sales sheet to a person responsible for making a sales call along with an alert that notifies the person of the change detected with respect to the patent, concentration of patents or prosecution activities, or citation activities.

In addition, certain portions of the data that pertains to the portfolio or a slice of the portfolio of the target organization may be marked so that they may be analyzed by a dashboard user as part of a prosecution or portfolio management activity performed for the benefit of the other organization. Thus, in addition to triggering a notification about a change to a competitor's patent, portfolio, or prosecution activity to a dashboard user, the portfolio management system tags the dashboard information that reflects the change and identifies (e.g., suggests) certain activities that the user can engage in with respect to the user's portfolio in response to the change pertaining to the competitor's portfolio. For example, if a competitor amended certain claims in a patent application, the dashboard may obtain PAIR data for the competitor, identify the changes, present the competitor's claims including highlighted amendments to the dashboard user, and suggest that the dashboard user evaluate one or more of the dashboard user's claims in light of the changes made by the competitor.

Figure 54:
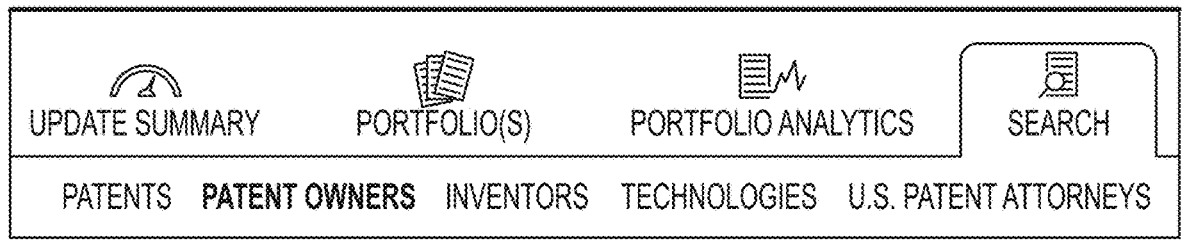
FIG. 54 illustrates sample aspects of a user interface for creating a new patent portfolio related to a patent owner, according to some example embodiments.

FIG. 54 illustrates sample aspects of a user interface for creating a new patent portfolio related to a patent owner, according to some example embodiments. In some embodiments, a patent owner profile may be displayed. In some embodiments, a user interface control, such as the "Expand Analytics" button, may be displayed along with the patent owner profile; activating (e.g., clicking) this control may cause the patent portfolio management system 102 to create a new patent portfolio and add to the newly created patent portfolio all of the patents and patent applications associated with the patent owner.

In some embodiments, the patent portfolio management system 102 may automatically assign a name to the newly created patent portfolio. For example, the patent portfolio management system 102 may append "-Analytics" or some other string to the name of the patent owner, and assign the resulting string as the name of the newly created patent portfolio. In some embodiments, the patent portfolio management system 102 may prompt the user for a name for the newly created patent portfolio.

In some embodiments, after the new patent portfolio has been created and associated with the patents and patent applications for the patent owner, the user is able to access relevant analytics for the newly created patent portfolio. In some embodiments, the relevant analytics for the newly created patent portfolio may be generated upon the creation of the patent portfolio; in some embodiments, relevant analytics for the newly created patent portfolio may be generated upon the first attempt to access the relevant analytics (e.g., "just-in-time" or "lazy-load") for the newly created patent portfolio.

Figure 55:
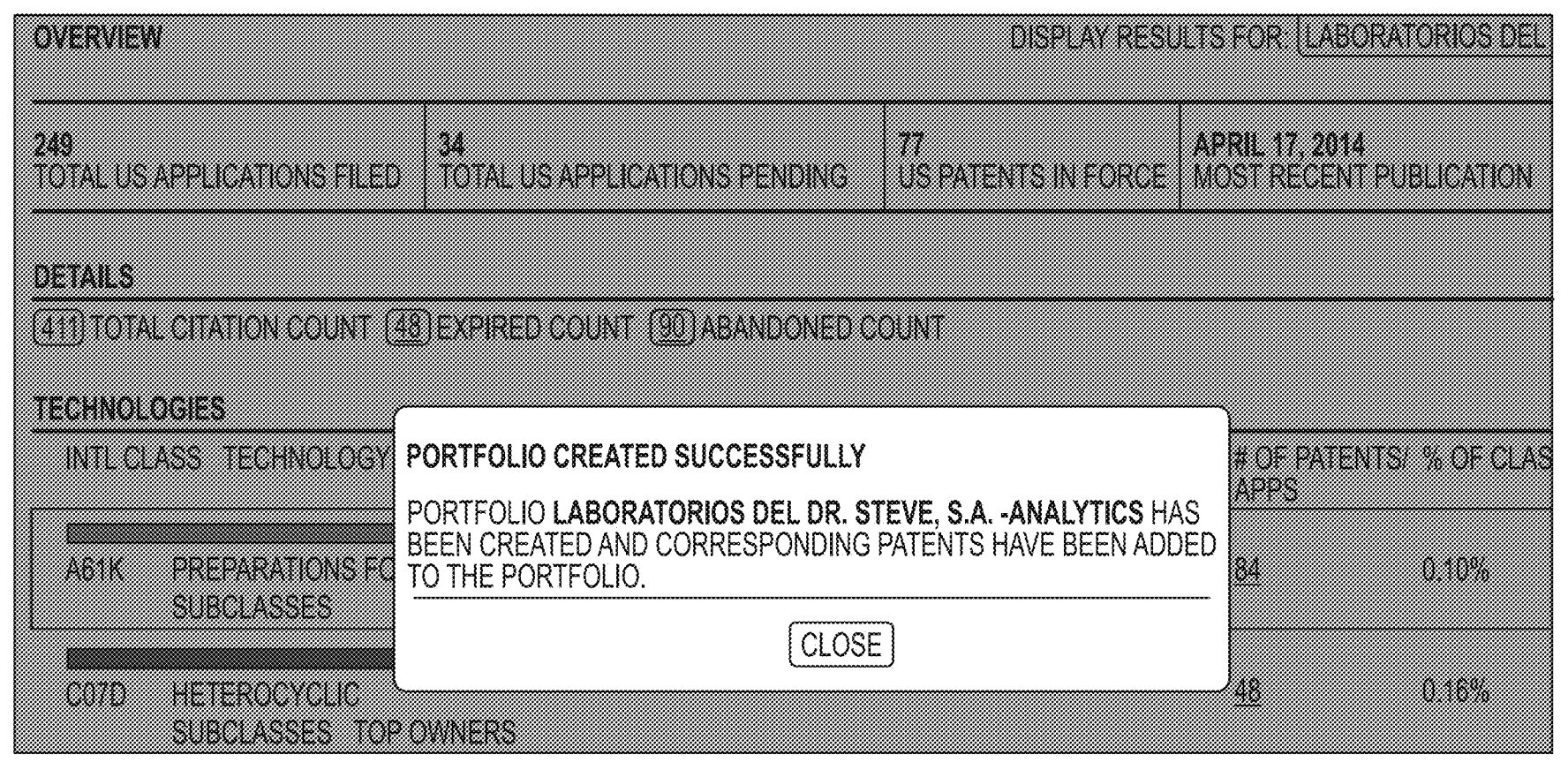

FIG. 55 illustrates a sample confirmation message confirming the creation of a new patent portfolio related to a patent owner, according to some example embodiments. In some embodiments, after clicking the "Close" button, the user may be able to access relevant analytics for the newly created patent portfolio.

FIG. 56 illustrates sample aspects of a user interface for creating a portfolio related to an inventor, according to some example embodiments. In some embodiments, an inventor profile may be displayed. In some embodiments, a user interface control, such as the "Expand Analytics" button, may be displayed along with the inventor profile; activating (e.g., clicking) this control may cause the patent portfolio management system 102 to create a new patent portfolio and add to the newly created patent portfolio all of the patents and patent applications associated with the inventor.

In some embodiments, the patent portfolio management system 102 may automatically assign a name to the newly created patent portfolio. For example, the patent portfolio management system 102 may append "-Analytics" or some other string to the name of the inventor, and assign the resulting string as the name of the newly created patent portfolio. In some embodiments, the patent portfolio management system 102 may prompt the user for a name for the newly created patent portfolio.

In some embodiments, after the new patent portfolio has been created and associated with the patents and patent applications for the inventor, the user is able to access relevant analytics for the newly created patent portfolio. In some embodiments, the relevant analytics for the newly created patent portfolio may be generated upon the creation of the new patent portfolio; in some embodiments, relevant analytics for the newly created patent portfolio may be generated upon the first attempt to access the relevant analytics (e.g., "just-in-time" or "lazy-load") for the newly created patent portfolio.

Figure 57:
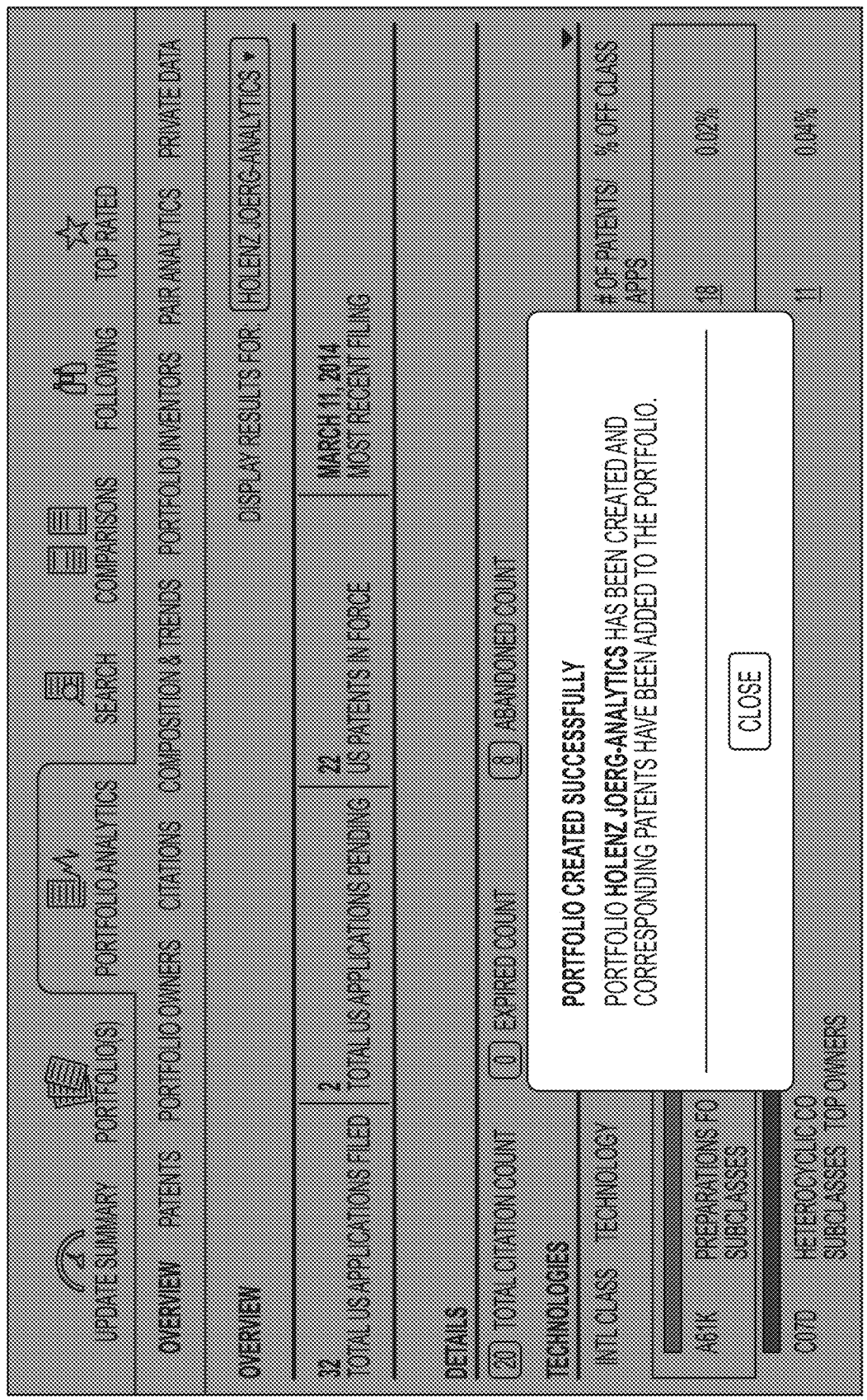
FIG. 57 illustrates a sample confirmation message confirming the creation of a new patent portfolio related to an inventor, according to some example embodiments.

FIG. 57 illustrates a sample confirmation message confirming the creation of a new patent portfolio related to an inventor, according to some example embodiments. In some embodiments, after clicking the "Close" button, the user may be able to access relevant analytics for the newly created patent portfolio.

Figure 58:
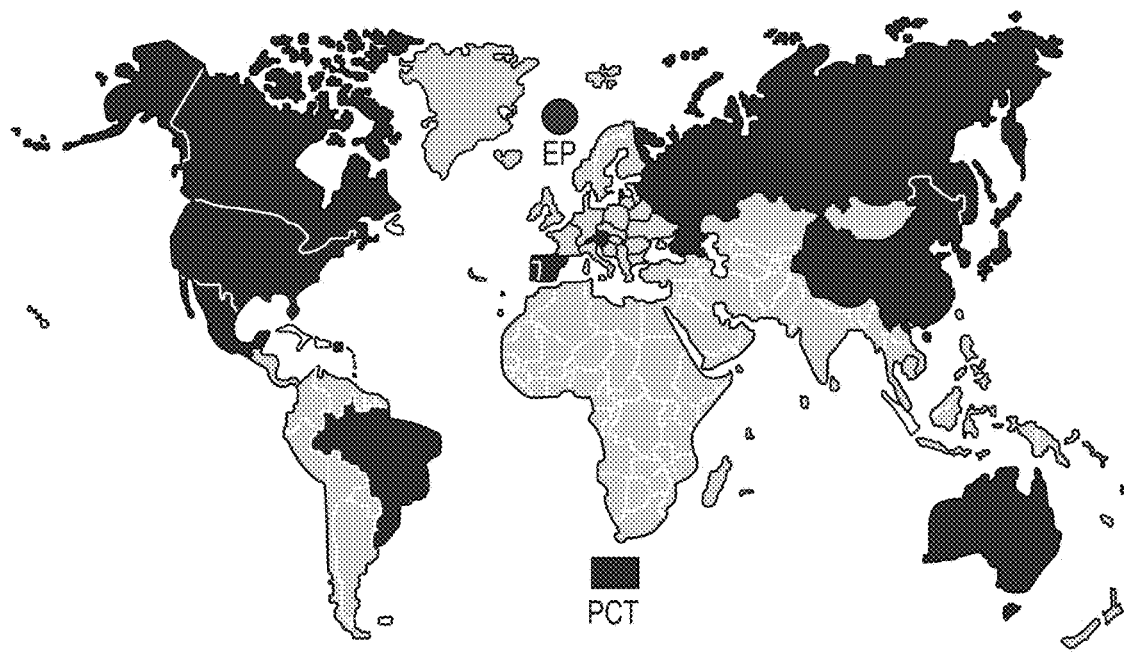
FIG. 58 illustrates sample aspects of a user interface for creating a new patent portfolio related to a patent, according to some example embodiments.

FIG. 58 illustrates sample aspects of a user interface for creating a portfolio related to a patent, according to some example embodiments. In some embodiments, a patent profile may be displayed. In some embodiments, a user interface control, such as the "US Family Analytics" button, may be displayed along with the patent profile; activating (e.g., clicking) this control may cause the patent portfolio management system 102 to create a new patent portfolio and add to the newly created patent portfolio all of the U.S. patents and U.S. patent applications associated with the patent.

In some embodiments, activating the user interface control may cause the patent portfolio management system 102 to add to the newly created patent portfolio related patents and related patent applications from one or more regions, such as PCT, EPO, or individual countries. In some embodiments, the patent portfolio management system 102 may prompt the user to indicate from which region(s) the related patents and the related patent applications should come.

In some embodiments, the patent portfolio management system 102 may automatically assign a name to the newly created patent portfolio. For example, the patent portfolio management system 102 may append "-Family", "-US Family", or some other appropriately named string to an identifier of the patent, and assign the resulting string as the name of the newly created patent portfolio. In some embodiments, the patent portfolio management system 102 may prompt the user for a name for the newly created patent portfolio.

In some embodiments, after the new patent portfolio has been created and associated with the relevant patents and patent applications for the patent, the user is able to access relevant analytics for the newly created patent portfolio. In some embodiments, the relevant analytics for the newly created patent portfolio may be generated upon the creation of the new patent portfolio; in some embodiments, relevant analytics for the newly created patent portfolio may be generated upon the first attempt to access the relevant analytics (e.g., "just-in-time" or "lazy-load") for the newly created patent portfolio.

Figure 59:
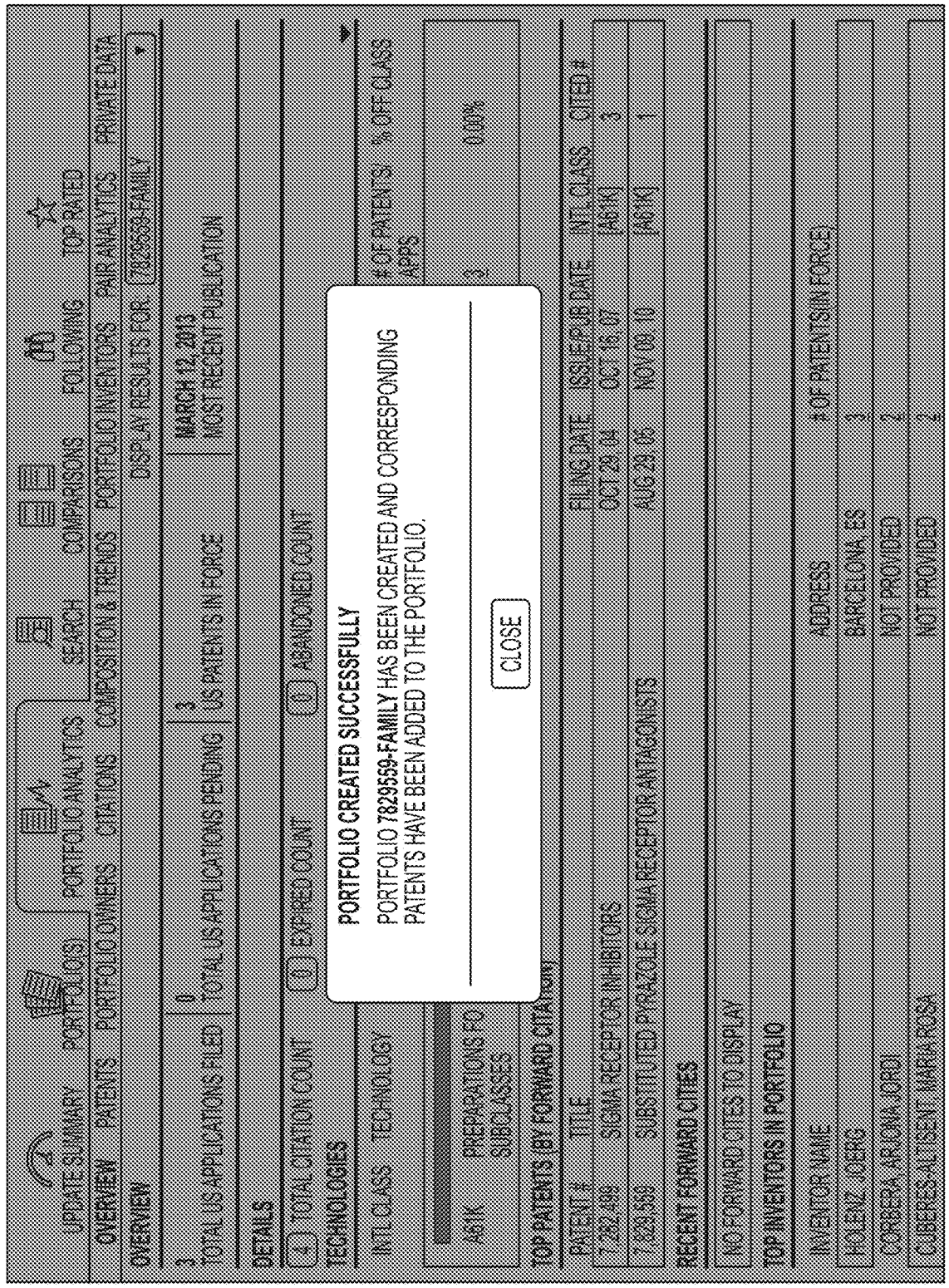
FIG. 59 illustrates a sample confirmation message confirming the creation of a new patent portfolio related to a patent, according to some example embodiments.

FIG. 59 illustrates a sample confirmation message confirming the creation of a new patent portfolio related to a patent, according to some example embodiments. In some embodiments, after clicking the "Close" button, the user may be able to access relevant analytics for the newly created patent portfolio.

Figure 60:
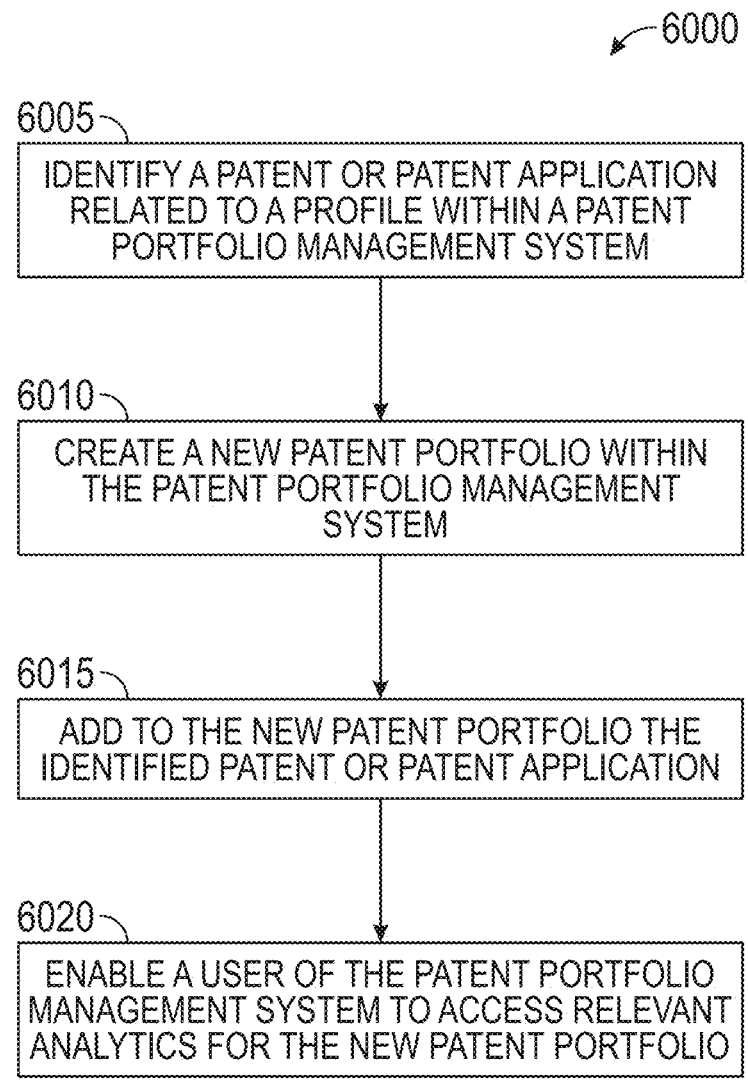
FIG. 60 is a flow diagram of an example of a method for creating a new patent portfolio related to a profile within a patent portfolio management system, according to some example embodiments.

FIG. 60 is a flow diagram of an example of a method 6100 for creating a new patent portfolio related to a profile within a patent portfolio management system, according to some example embodiments. A patent or patent application related to a profile within a patent portfolio management system is identified (operation 6005). A new patent portfolio is created within the patent portfolio management system (operation 6010). The identified patent or patent application is added to the new patent portfolio (operation 6015). A user of the patent portfolio management system is enabled to access relevant analytics for the new patent portfolio (operation 6020).

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In some embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. In some example embodiments, the modules referred to herein may comprise processor-implemented modules.

Similarly, the methods described herein may be at least partially processor-implemented. For example, at least some of the operations of a method may be performed by one or more processors or processor-implemented modules. The performance of certain operations may be distributed among the one or more processors, not only residing within a single machine, but also those deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed for execution on one computer or on multiple computers; multiple computers may be located at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 61:
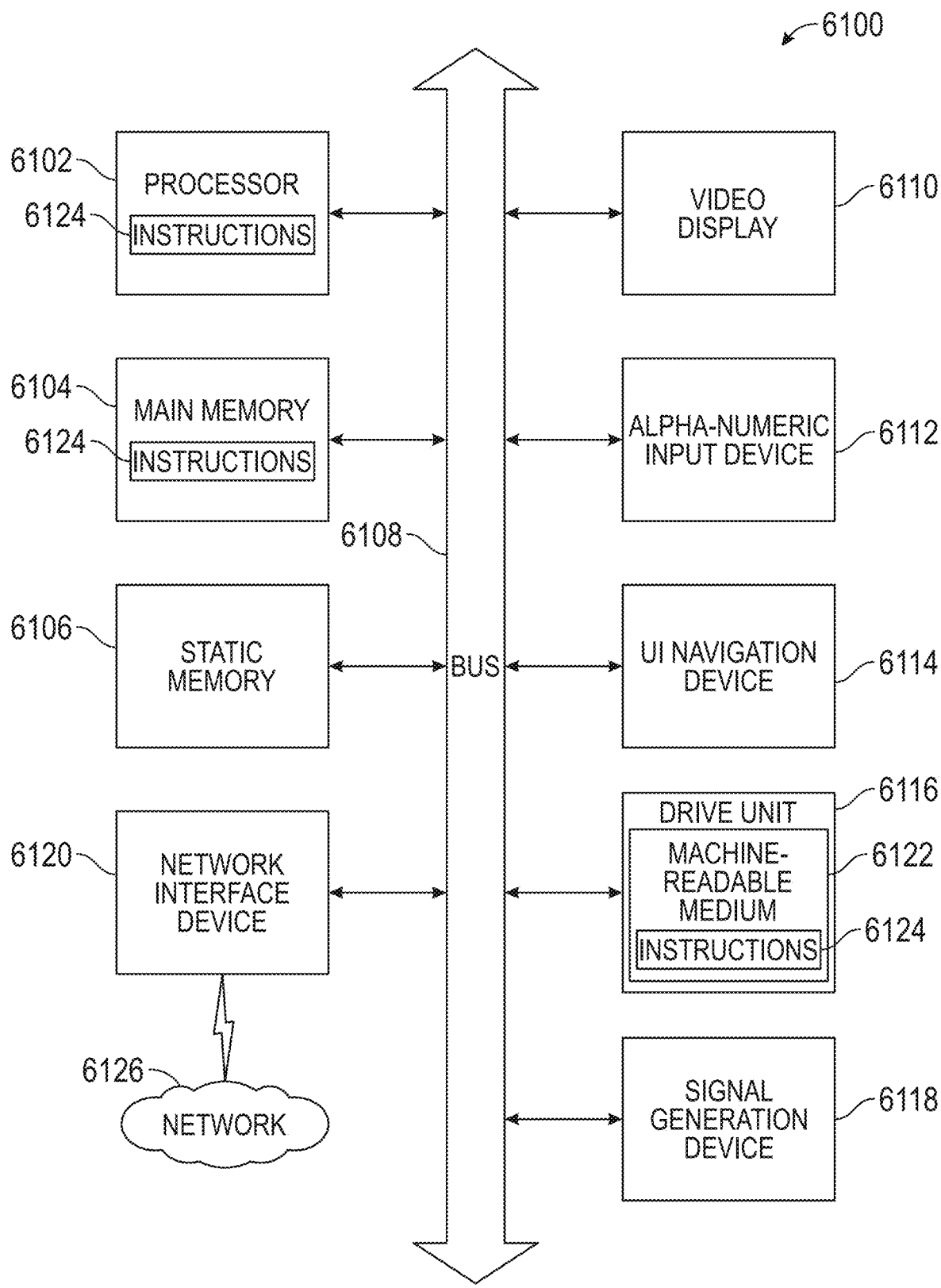
FIG. 61 is a block diagram of machine in the example form of a computer system, within which a set instructions for causing the machine to perform any one or more of the methodologies discussed herein may be executed.

FIG. 61 is a block diagram of machine in the example form of a computer system 6100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 6100 includes a processor 6102 (e.g., a central processing unit (CPU), a graphics processing unit (GPU) or both), a main memory 6104 and a static memory 6106, which communicate with each other via a bus 6108. The computer system 6100 may further include a video display unit 6110 (e.g., a liquid crystal display (LCD) or a cathode ray tube (CRT)). The computer system 6100 also includes an alphanumeric input device 6112 (e.g., a keyboard), a user interface (UI) navigation device 6114 (e.g., a mouse), a disk drive unit 6116, a signal generation device 6118 (e.g., a speaker) and a network interface device 6120.

Machine-Readable Medium

The disk drive unit 6116 includes a machine-readable medium 6122 on which is stored one or more sets of instructions and data structures (e.g., software) 6124 embodying or utilized by any one or more of the methodologies or functions described herein. The instructions 6124 may also reside, completely or at least partially, within the main memory 6104 and/or within the processor 6102 during execution thereof by the computer system 6100, the main memory 6104, and the processor 6102, also constituting machine-readable media.

Although the machine-readable medium 6122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks, among others.

Transmission Medium

The instructions 6124 may further be transmitted or received over a communications network 6126 using a transmission medium. The instructions 6124 may be transmitted using the network interface device 6120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES & EXAMPLES

The following examples pertain to further embodiments.

Example 1 may include subject matter (such as a method, means for performing acts, or a non-transitory machine-readable medium including instructions that, when performed by a machine cause the machine to performs acts) comprising: identifying at least one patent or patent application related to a profile within a patent portfolio management system; creating a new patent portfolio within the patent portfolio management system; adding to the new patent portfolio the identified at least one patent or patent application related to the profile; and enabling a user of the patent portfolio management system to access relevant analytics for the new patent portfolio.

In Example 2, the subject matter of Example 1 may include, wherein the profile is based on a patent owner.

In Example 3, the subject matter of any of Examples 1-2 may include, wherein the profile is based on an inventor.

In Example 4, the subject matter of any of Examples 1-3 may include, wherein the profile is based on a patent.

Example 5 may include, or may optionally be combined with the subject matter of any one of Examples 1-4 to include, subject matter (such as a device, apparatus, or a system) comprising: at least one module, executing on one or more computer processors, to: identify at least one patent or patent application related to a profile within the patent portfolio management system; create a new patent portfolio within the patent portfolio management system; add to the new patent portfolio the identified at least one patent or patent application related to the profile; and enable a user of the patent portfolio management system to access relevant analytics for the new patent portfolio.

In Example 6, the subject matter of Example 5 may include, wherein the profile is based on a patent owner.

In Example 7, the subject matter of any of Examples 5-6 may include, wherein the profile is based on an inventor.

In Example 8, the subject matter of any of Examples 5-7 may include, wherein the profile is based on a patent.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to limit voluntarily the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for creating a new patent portfolio by a portfolio management system, the method comprising:
   generating a world map display element with indications of countries where at least one patent of the new patent portfolio has issued or at least one patent application of the new patent portfolio has been filed;
   identifying, for each country where the at least one patent has issued or the at least one patent application has been filed, a set of prior art documents related to the at least one patent or the at least one patent application for the respective country;
   identifying, for the respective set of prior art documents of each country, a set of prior art keywords;
   identifying a set of matter keywords for the at least one patent or the at least one patent application;
   determining, for each country, a set of unique keywords based on keywords appearing uniquely in the set of matter keywords compared to the respective set of prior art keywords;
   displaying, in a user interface element, an image of the world map display element, wherein countries on the map are highlighted corresponding to the indications, and wherein for each highlighted country the respective set of unique keywords is displayed; and
   in response to receipt of user input via a user interface, creating a country specific patent portfolio corresponding to the respective country including the at least one patent that has issued for that country or the at least one patent application that has been filed for that country and the respective set of unique keywords.

2. The method of claim 1, further comprising:
   in response to creation of the new patent portfolio, identifying at least one patent or patent application related to a profile within the patent portfolio management system;
   automatically assigning a name for the new patent portfolio using a profile identifier and at least one of a patent owner name, an inventor name, or a region name;
   creating the new patent portfolio with the automatically assigned name within the patent portfolio management system; and
   adding the identified at least one patent or patent application related to the profile to the new patent portfolio.

3. The method of claim 2, wherein the profile is based on an inventor or a patent owner.

4. The method of claim 2, wherein the profile is based on a patent.

5. The method of claim 1, wherein creating the new patent portfolio further comprises generating analytics to be included in the new patent portfolio.

6. The method of claim 5, further comprising:
   automatically generating the analytics upon selection of a second user interface element.

7. The method of claim 2, further comprising generating, for display, a confirmation graphical user interface including an indication of creation of the new patent portfolio and the automatically assigned name.

8. A patent portfolio management system comprising:
   at least one processor; and
   memory including instructions that, when executed by the at least one processor, cause the at least one processor to perform operations to:
   generate a world map display element with indications of countries where at least one patent of a new patent portfolio has issued or at least one patent application of the new patent portfolio has been filed;
   identify, for each country where the at least one patent has issued or the at least one patent application has been filed, a set of prior art documents related to the at least one patent or the at least one patent application for the respective country;
   identify, for the respective set of prior art documents of each country, a set of prior art keywords;
   identify a set of matter keywords for the at least one patent or the at least one patent application;
   determine, for each country, a set of unique keywords based on keywords appearing uniquely in the set of matter keywords compared to the respective set of prior art keywords;
   display, in a user interface element, an image of the world map display element wherein countries on the map are highlighted corresponding to the indications, and wherein for each highlighted country the respective set of unique keywords is displayed; and
   in response to receipt of user input via a user interface, create a country specific patent portfolio corresponding to the respective country including the at least one patent that has issued for that country or the at least one patent application that has been filed for that country and the respective set of unique keywords.

9. The patent portfolio management system of claim 8, further comprising instructions that, when executed by the at least one processor, cause the at least one processor to perform operations to:
   in response to creation of the new patent portfolio, identify at least one patent or patent application related to a profile within the patent portfolio management system;
   automatically assign a name for the new patent portfolio using a profile identifier and at least one of a patent owner name, an inventor name, or a region name;
   create the new patent portfolio with the automatically assigned name within the patent portfolio management system; and
   add the identified at least one patent or patent application related to the profile to the new patent portfolio.

10. The patent portfolio management system of claim 9, wherein the profile is based on an inventor or a patent owner.

11. The patent portfolio management system of claim 9, wherein the profile is based on a patent.

12. The patent portfolio management system of claim 8, wherein the instructions to create the new patent portfolio include instructions to generate analytics to be included in the new patent portfolio.

13. The patent portfolio management system of claim 12, further comprising instructions to:
    automatically generate the analytics upon selection of a second user interface element.

14. The patent portfolio management system of claim 9, further comprising instructions to generate, for display, a confirmation graphical user interface including an indication of creation of the new patent portfolio and the automatically assigned name.

15. A non-transitory machine-readable medium comprising instructions that, when executed by one or more processors of a machine, cause the machine to perform operations comprising:
    generating a world map display element with indications of countries where at least one patent, of a new patent portfolio in a patent portfolio management system, has issued or at least one patent application of the new patent portfolio has been filed;
    identifying, for each country where the at least one patent has issued or the at least one patent application has been filed, a set of prior art documents related to the at least one patent or the at least one patent application for the respective country;
    identifying, for the respective set of prior art documents of each country, a set of prior art keywords;
    identifying a set of matter keywords for the at least one patent or the at least one patent application;
    determining, for each country, a set of unique keywords based on keywords appearing uniquely in the set of matter keywords compared to the respective set of prior art keywords;
    displaying, in a user interface element, an image of the world map display element, wherein countries on the map are highlighted corresponding to the indications, and wherein for each highlighted country the respective set of unique keywords is displayed; and
    in response to receipt of user input via a user interface, creating a country specific patent portfolio corresponding to the respective country including the at least one patent that has issued for that country or the at least one patent application that has been filed for that country and the respective set of unique keywords.

16. The non-transitory machine-readable medium of claim 15, further comprising instructions that, when executed by the one or more processors of the machine, cause the machine to perform operations comprising:
    in response to creation of the new patent portfolio, identifying at least one patent or patent application related to a profile within the patent portfolio management system;
    automatically assigning a name for the new patent portfolio using a profile identifier and at least one of a patent owner name, an inventor name, or a region name;
    creating the new patent portfolio with the automatically assigned name within the patent portfolio management system; and
    adding the identified at least one patent or patent application related to the profile to the new patent portfolio.

17. The non-transitory machine-readable medium of claim 16, wherein the profile is based on an inventor or a patent owner.

18. The non-transitory machine-readable medium of claim 16, wherein the profile is based on a patent.

19. The non-transitory machine-readable medium of claim 15, wherein the instructions for creating the new patent portfolio include instructions for generating analytics to be included in the new patent portfolio.

20. The non-transitory machine-readable medium of claim 19, wherein the instructions causing the machine to perform operations further comprises:
    automatically generating the analytics upon selection of a second user interface element.

* * * * *